(12) United States Patent
Chow et al.

(10) Patent No.: US 11,163,930 B2
(45) Date of Patent: Nov. 2, 2021

(54) SECURE LOGIC LOCKING AND CONFIGURATION WITH CAMOUFLAGED PROGRAMMABLE MICRO NETLISTS

(71) Applicant: Rambus Inc., San Jose, CA (US)

(72) Inventors: Lap Wai Chow, South Pasadena, CA (US); Bryan J. Wang, South Lake Tahoe, CA (US); James P. Baukus, Westlake Village, CA (US); Ronald P. Cocchi, Huntington Beach, CA (US)

(73) Assignee: RAMBUS INC., San Jose, CA (US)

( * ) Notice: Subject to any disclaimer, the term of this patent is extended or adjusted under 35 U.S.C. 154(b) by 0 days.

(21) Appl. No.: 16/905,724

(22) Filed: Jun. 18, 2020

(65) Prior Publication Data

US 2021/0004515 A1 Jan. 7, 2021

Related U.S. Application Data

(60) Continuation of application No. 16/056,268, filed on Aug. 6, 2018, now Pat. No. 10,691,860, which is a
(Continued)

(51) Int. Cl.
*G06F 21/14* (2013.01)
*G06F 30/392* (2020.01)
(Continued)

(52) U.S. Cl.
CPC ............ *G06F 30/392* (2020.01); *G06F 21/14* (2013.01); *G06F 30/39* (2020.01); *G06F 30/394* (2020.01);
(Continued)

(58) Field of Classification Search
CPC ...... G06F 30/392; G06F 30/39; G06F 30/394; G06F 30/34; G06F 21/00; G06F 21/10;
(Continued)

(56) References Cited

U.S. PATENT DOCUMENTS

| 4,903,262 A | 2/1990 | Dissosway et al. |
| 5,444,686 A | 8/1995 | Dunlavy |

(Continued)

FOREIGN PATENT DOCUMENTS

| EP | 2362574 A1 | 8/2011 |
| WO | WO-2013-131065 A1 | 9/2013 |
| WO | WO-2015-038587 A1 | 3/2015 |

OTHER PUBLICATIONS

Extended European Search Report dated Feb. 16, 2016 for EP Application No. 13755054.7. 12 pages.
(Continued)

*Primary Examiner* — Seokjin Kim
(74) *Attorney, Agent, or Firm* — Gates & Cooper LLP

(57) ABSTRACT

The camouflage technique described herein introduces programmed configuration inputs to Micro Netlists, creating Programmable Micro Netlists (PMNLs). PMNLs are a group of camouflaged and non-camouflaged cells that may be configured to perform one of several possible logic functions. They retain all the protective properties of non-programmable MNLs, but also allow for secure post-manufacture configuration of their aggregate logic function.

20 Claims, 49 Drawing Sheets

Related U.S. Application Data continuation-in-part of application No. 15/791,260, filed on Oct. 23, 2017, now Pat. No. 10,476,883, and a continuation-in-part of application No. 15/675,418, filed on Aug. 11, 2017, now Pat. No. 10,574,237, said application No. 15/791,260 is a continuation-in-part of application No. 14/382,539, filed as application No. PCT/US2013/028761 on Mar. 1, 2013, now Pat. No. 9,800,405, said application No. 15/754,418 is a continuation-in-part of application No. 13/940,585, filed on Jul. 12, 2013, now Pat. No. 9,542,520, which is a division of application No. 13/370,118, filed on Feb. 9, 2012, now Pat. No. 8,510,700, which is a continuation-in-part of application No. 12/578,441, filed on Oct. 13, 2009, now Pat. No. 8,418,091, which is a continuation-in-part of application No. 12/380,094, filed on Feb. 24, 2009, now Pat. No. 8,151,235.

(60) Provisional application No. 62/542,049, filed on Aug. 7, 2017, provisional application No. 61/606,260, filed on Mar. 2, 2012.

(51) Int. Cl.
  *H01L 27/02* (2006.01)
  *H03K 19/17736* (2020.01)
  *H01L 27/118* (2006.01)
  *G06F 30/39* (2020.01)
  *G06F 30/394* (2020.01)
  *G06F 30/34* (2020.01)

(52) U.S. Cl.
  CPC .... *H01L 27/0207* (2013.01); *H01L 27/11807* (2013.01); *H03K 19/17736* (2013.01); *G06F 30/34* (2020.01)

(58) Field of Classification Search
  CPC ..... G06F 21/12; G06F 21/14; H01L 27/0207; H01L 27/11807; H03K 19/11736
  See application file for complete search history.

(56) References Cited

U.S. PATENT DOCUMENTS

| | | |
|---|---|---|
| 5,636,133 A | 6/1997 | Chesebro et al. |
| 5,783,846 A | 7/1998 | Baukus et al. |
| 5,809,281 A | 9/1998 | Steele et al. |
| 5,821,582 A | 10/1998 | Daum |
| 5,866,933 A | 2/1999 | Baukus et al. |
| 5,930,663 A | 7/1999 | Baukus et al. |
| 5,940,504 A | 8/1999 | Griswold |
| 5,946,478 A | 8/1999 | Lawman |
| 5,973,375 A | 10/1999 | Baukus et al. |
| 6,064,110 A | 5/2000 | Baukus et al. |
| 6,075,381 A | 6/2000 | LaBerge |
| 6,104,639 A | 8/2000 | Hayashi et al. |
| 6,117,762 A | 9/2000 | Baukus et al. |
| 6,294,816 B1 | 9/2001 | Baukus et al. |
| 6,305,000 B1 | 10/2001 | Phan et al. |
| 6,351,172 B1 | 2/2002 | Ouyang |
| 6,459,629 B1 | 10/2002 | Clark et al. |
| 6,467,074 B1 | 10/2002 | Katsioulas et al. |
| 6,574,609 B1 | 6/2003 | Downs et al. |
| 6,613,661 B1 | 9/2003 | Baukus et al. |
| 6,740,942 B2 | 5/2004 | Baukus et al. |
| 6,748,579 B2 | 6/2004 | Dillon et al. |
| 6,774,413 B2 | 8/2004 | Baukus et al. |
| 6,791,191 B2 | 9/2004 | Chow et al. |
| 6,815,816 B1 | 11/2004 | Clark et al. |
| 6,893,916 B2 | 5/2005 | Baukus et al. |
| 6,897,535 B2 | 5/2005 | Chow et al. |
| 6,919,600 B2 | 7/2005 | Baukus et al. |
| 6,924,552 B2 | 8/2005 | Baukus et al. |
| 6,940,764 B2 | 9/2005 | Clark et al. |
| 6,944,843 B2 | 9/2005 | Bansal |
| 6,948,147 B1 | 9/2005 | New et al. |
| 6,979,606 B2 | 12/2005 | Chow et al. |
| 7,008,873 B2 | 3/2006 | Chow et al. |
| 7,009,443 B2 | 3/2006 | Illegems |
| 7,010,607 B1 | 3/2006 | Bunton |
| 7,042,752 B2 | 5/2006 | Okuda |
| 7,049,667 B2 | 5/2006 | Chow et al. |
| 7,170,317 B2 | 1/2007 | White |
| 7,217,977 B2 | 5/2007 | Chow et al. |
| 7,217,997 B2 | 5/2007 | Wyland |
| 7,279,936 B2 | 10/2007 | Gliese et al. |
| 7,328,419 B2 | 2/2008 | Vuong et al. |
| 7,383,521 B2 | 6/2008 | Smith et al. |
| 7,454,323 B1 | 11/2008 | Bain |
| 7,461,249 B1 | 12/2008 | Pearson et al. |
| 7,500,215 B1 | 3/2009 | Massabki et al. |
| 7,539,875 B1 | 5/2009 | Manferdelli et al. |
| 7,698,718 B2 | 4/2010 | Dellow et al. |
| 7,707,405 B1 | 4/2010 | Gilman et al. |
| 7,733,121 B2 | 6/2010 | Phoon et al. |
| 7,801,308 B1 | 9/2010 | Hang |
| 7,844,936 B2 | 11/2010 | Melzner |
| 7,895,548 B2 | 2/2011 | Lin et al. |
| 8,111,089 B2 | 2/2012 | Cocchi et al. |
| 8,122,246 B2 | 2/2012 | Matsushita |
| 8,168,487 B2 | 5/2012 | Clark, Jr. et al. |
| 8,417,965 B1 | 4/2013 | Sundararajan et al. |
| 9,032,501 B1 | 5/2015 | Martin et al. |
| 9,437,555 B2 | 9/2016 | Thacker, III |
| 9,479,176 B1 | 10/2016 | Eble, III et al. |
| 9,532,097 B1 | 12/2016 | Chen et al. |
| 2002/0007456 A1 | 1/2002 | Peinado et al. |
| 2002/0026531 A1 | 2/2002 | Keane et al. |
| 2002/0096744 A1 | 7/2002 | Chow et al. |
| 2002/0096776 A1 | 7/2002 | Chow et al. |
| 2003/0159140 A1 | 8/2003 | Candelore |
| 2003/0194086 A1 | 10/2003 | Lambert |
| 2004/0000928 A1 | 1/2004 | Cheng et al. |
| 2004/0061186 A1 | 4/2004 | Chow et al. |
| 2004/0064351 A1 | 4/2004 | Mikurak |
| 2004/0103377 A1 | 5/2004 | Eaton et al. |
| 2004/0130349 A1 | 7/2004 | Morgenshtein et al. |
| 2004/0144998 A1 | 7/2004 | Chow et al. |
| 2004/0166942 A1 | 8/2004 | Muir |
| 2005/0093572 A1 | 5/2005 | Sun et al. |
| 2005/0140389 A1 | 6/2005 | Gliese et al. |
| 2005/0161748 A1 | 7/2005 | Chow et al. |
| 2005/0230787 A1 | 10/2005 | Chow et al. |
| 2006/0048132 A1 | 3/2006 | Chen et al. |
| 2006/0075374 A1 | 4/2006 | McElvain |
| 2006/0129502 A1 | 6/2006 | Pastusiak et al. |
| 2006/0155990 A1 | 7/2006 | Katsube et al. |
| 2007/0180233 A1 | 8/2007 | Matsushita |
| 2007/0180464 A1 | 8/2007 | Dellow et al. |
| 2007/0180496 A1 | 8/2007 | Fransdonk |
| 2007/0261015 A1 | 11/2007 | Morgenshtein et al. |
| 2008/0003980 A1 | 1/2008 | Voss et al. |
| 2008/0005577 A1 | 1/2008 | Rager et al. |
| 2008/0095365 A1 | 4/2008 | Cocchi et al. |
| 2008/0189549 A1 | 8/2008 | Hughes |
| 2008/0216038 A1 | 9/2008 | Bose |
| 2008/0237644 A1 | 10/2008 | Tripathi |
| 2008/0282208 A1 | 11/2008 | Anderson et al. |
| 2008/0306874 A1 | 12/2008 | White |
| 2009/0063756 A1 | 3/2009 | Asipov |
| 2009/0157552 A1 | 6/2009 | Schnell et al. |
| 2009/0193507 A1 | 7/2009 | Ibrahim |
| 2009/0208004 A1 | 8/2009 | Kawai et al. |
| 2009/0210348 A1 | 8/2009 | Klein |
| 2009/0307780 A1 | 12/2009 | Dubhashi et al. |
| 2009/0323971 A1 | 12/2009 | Munguia et al. |
| 2009/0326964 A1 | 12/2009 | Garg et al. |
| 2010/0153731 A1 | 6/2010 | Duc et al. |
| 2010/0195824 A1 | 8/2010 | Lin et al. |
| 2010/0217972 A1 | 8/2010 | Lohiniva et al. |
| 2010/0218158 A1 | 8/2010 | Chow et al. |
| 2010/0231263 A1 | 9/2010 | Fish et al. |

(56) References Cited

U.S. PATENT DOCUMENTS

| | | |
|---|---|---|
| 2010/0250955 A1 | 9/2010 | Trevithick et al. |
| 2010/0274972 A1 | 10/2010 | Babayan et al. |
| 2010/0301903 A1 | 12/2010 | Cocchi et al. |
| 2011/0004945 A1 | 1/2011 | Kurokawa |
| 2011/0010779 A1 | 1/2011 | Nakagawa |
| 2011/0055585 A1 | 3/2011 | Lee |
| 2011/0113392 A1 | 5/2011 | Chakraborty et al. |
| 2011/0138472 A1 | 6/2011 | Nikitin et al. |
| 2011/0148457 A1 | 6/2011 | Abramovici |
| 2011/0213976 A1 | 9/2011 | Ryou et al. |
| 2011/0286599 A1 | 11/2011 | Tuyls et al. |
| 2012/0042168 A1 | 2/2012 | Yuan et al. |
| 2012/0042170 A1 | 2/2012 | Curtin et al. |
| 2012/0054841 A1 | 3/2012 | Schultz et al. |
| 2012/0131349 A1 | 5/2012 | Layson et al. |
| 2012/0131681 A1 | 5/2012 | Layson et al. |
| 2012/0264427 A1 | 10/2012 | Adatia et al. |
| 2012/0292390 A1 | 11/2012 | Yu et al. |
| 2013/0061291 A1 | 3/2013 | Hegg et al. |
| 2013/0111522 A1 | 5/2013 | Tatem et al. |
| 2013/0145173 A1 | 6/2013 | Shablygin et al. |
| 2015/0113278 A1 | 4/2015 | Cocchi et al. |
| 2015/0278419 A1 | 10/2015 | Yang et al. |
| 2016/0004808 A1 | 1/2016 | Feng et al. |
| 2016/0197616 A1* | 7/2016 | Cocchi ............ H03K 19/17768 326/41 |
| 2017/0012952 A1 | 1/2017 | Cocchi et al. |
| 2018/0232479 A1* | 8/2018 | Sinanoglu ............ G06F 30/327 |

OTHER PUBLICATIONS

Final Office Action dated Jun. 13, 2019 for U.S. Appl. No. 15/675,418. 6 pages.

International Search Report and Written Opinion dated May 23, 2013 for PCT Application No. PCT/US2013/028761.

Non-Final Office Action dated Feb. 6, 2019 for U.S. Appl. No. 16/056,268.

Non-Final Office Action dated Nov. 1, 2018 for U.S. Appl. No. 15/675,418. 10 pages.

Notice of Allowance dated Sep. 9, 2019 for U.S. Appl. No. 15/675,418. 8 pages.

Partial Supplementary European Search Report dated Oct. 28, 2015 for EP Application No. 13755054.7. 7 pages.

PCT International Search Report & Written Opinion dated Mar. 29, 2018 for PCT Application No. PCT/IB2018/050124.

PCT International Search Report and Written Opinion dated Jan. 16, 2018 for PCT Application No. PCT/US2017/052304.

Rosenblatt, B., "The New Technologies for Pay TV Content Security", Dec. 5, 2011, pp. 1-28, XP002689399, http://irdeto.com/docutments/New_Technologies_for_Pay_TV_Content_Security.pdf. 27 pages.

* cited by examiner

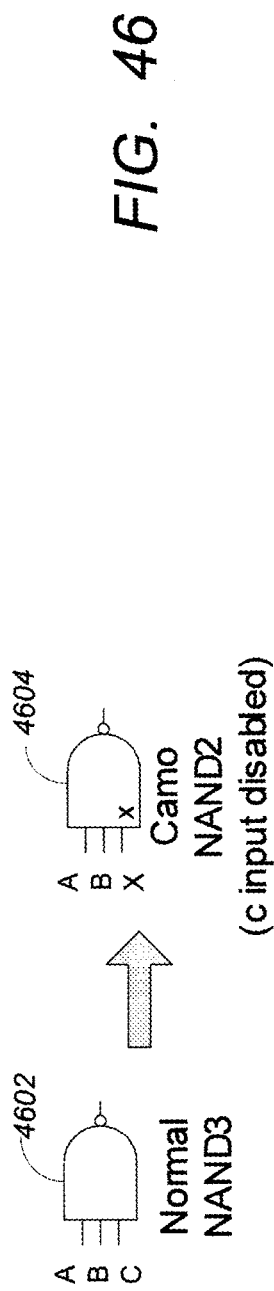

SECURE LOGIC LOCKING AND CONFIGURATION WITH CAMOUFLAGED PROGRAMMABLE MICRO NETLISTS

CROSS-REFERENCE TO RELATED APPLICATIONS

This application is a continuation of U.S. patent application Ser. No. 16/056,268, filed Aug. 6, 2018, and entitled "SECURE LOGIC LOCKING AND CONFIGURATION WITH CAMOUFLAGED PROGRAMMABLE MICRO NETLISTS," by Lap Wai Chow, Bryan J. Wang, James P. Baukus, and Ronald P. Cocchi, which application claims benefit of U.S. Provisional Patent Application Ser. No. 62/542,049, filed Aug. 7, 2017, and entitled "SECURE LOGIC LOCKING AND CONFIGURATION WITH CAMOUFLAGED PROGRAMMABLE MICRO NETLISTS," by Lap Wai Chow, Bryan J. Wang, James P. Baukus, and Ronald P. Cocchi, both of which applications are hereby incorporated by reference herein.

This application is also a continuation-in-part (CIP) of:

U.S. patent application Ser. No. 15/675,418, filed Aug. 11, 2017, and entitled "PHYSICALLY UNCLONABLE CAMOUFLAGE STRUCTURE AND METHODS FOR FABRICATING SAME," by Ronald P. Cocchi et al., which application is a continuation-in-part of U.S. patent application Ser. No. 13/940,585, filed Jul. 12, 2013, and entitled "METHOD AND APPARATUS FOR CAMOUFLAGING A PRINTED CIRCUIT BOARD," by Lap Wai Chow, James P. Baukus, Bryan J. Wang, and Ronald P. Cocchi, now issued as U.S. Pat. No. 9,542,520;

which application is a divisional application of U.S. patent application Ser. No. 13/370,118, filed Feb. 9, 2012, and entitled "METHOD AND APPARATUS FOR CAMOUFLAGING A PRINTED CIRCUIT BOARD," by Lap Wai Chow, James P. Baukus, Bryan J. Wang, and Ronald P. Cocchi, now issued as U.S. Pat. No. 8,510,700;

which application is a continuation-in-part of U.S. patent application Ser. No. 12/578,441 filed Oct. 13, 2009 entitled "METHOD AND APPARATUS FOR CAMOUFLAGING A STANDARD CELL BASED INTEGRATED CIRCUIT," by Lap Wai Chow, James P. Baukus, Bryan J. Wang, and Ronald P. Cocchi, now issued as U.S. Pat. No. 8,418,091;

which application is a continuation-in-part of U.S. patent application Ser. No. 12/380,094, filed Feb. 24, 2009 and entitled "METHOD AND APPARATUS FOR CAMOUFLAGING A PRINTED CIRCUIT BOARD," by Lap Wai Chow, James P. Baukus, Bryan J. Wang, and Ronald P. Cocchi, now issued as U.S. Pat. No. 8,151,235;

all of which applications are hereby incorporated by reference herein.

This application is also a continuation-in-part of U.S. patent application Ser. No. 15/791,260, filed Oct. 23, 2017, and entitled "SIGNALING CONDITIONAL ACCESS SYSTEM SWITCHING AND KEY DERIVATION," by Ronald P. Cocchi et al, which application is a continuation-in-part of U.S. patent application Ser. No. 14/382,539, filed Sep. 2, 2014, and entitled "BLACKBOX SECURITY PROVIDER PROGRAMMING SYSTEM PERMITTING MULTIPLE CUSTOMER USER AND IN FIELD CONDITIONAL ACCESS SWITCHING," by Ronald P. Cocchi, et al, issued Oct. 24, 2017 as U.S. Pat. No. 9,800,405, which application is a National Stage Entry of International Patent Application PCT/US2013/028761, filed Mar. 1, 2013 and entitled "entitled "BLACKBOX SECURITY PROVIDER PROGRAMMING SYSTEM PERMITTING MULTIPLE CUSTOMER USE AND IN FIELD CONDITIONAL ACCESS SWITCHING," by Ronald P. Cocchi et al., which application claims benefit of U.S. Provisional Patent Application Ser. No. 61/606,260, entitled "BLACKBOX SECURITY PROVIDER PROGRAMMING SYSTEM PERMUTING MULTIPLE CUSTOMER USE AND IN FIELD CONDITIONAL ACCESS SWITCHING," by Ronald P. Cocchi et al., filed Mar. 2, 2012;

all of which application are hereby incorporated by reference herein.

BACKGROUND

1. Field

The present disclosure relates to application specific integrated circuits (ASICs) and methods of their manufacture, and in particular to such ASICs that resist reverse engineering using camouflage technology.

2. Description of the Related Art

Integrated Circuit (IC) designs are vulnerable to intellectual property (IP) theft from reverse engineering, unauthorized cloning and over-production, and device corruption due to Trojan insertion. The risks to the IC industry have been steadily increasing as reverse engineering capabilities increase, and as worldwide IC production capabilities consolidate into a small number of entities. Circuit Camouflage technology is an effective way to defend silicon IP against these risks.

Circuit camouflage technology encompasses the design and use of camouflaged logic gates whose logical function is difficult to determine using conventional reverse engineering techniques. The mask layers used in this style of camouflaged gate have a physical design which mimics that of a conventional logic gate of the primary standard cell library used to design the IC, but the camouflaged gate's actual logic function differs from that of the mimicked logic gates. Hence, the camouflaged logic cells are designed such that their actual logic function is not apparent to a reverse engineer who is delayering and analyzing the silicon device. In fact, the camouflaged cell's layout suggests one logic function, but in reality, its logic function is something altogether different.

A camouflaged circuit contains a number of camouflaged gates among a much higher number of normal gates. A netlist extracted with conventional reverse engineering techniques would include functional discrepancies when compared to the genuine silicon device (without the camouflaged circuits), with the number of discrepancies proportional to the number of camouflaged gates used in the circuit. However, the number and location of the camouflaged gate instances is not apparent to the reverse engineer when looking at the delayered silicon images and/or the extracted netlist, making functional discrepancies very difficult to resolve.

Camouflaged logic cells and traditional logic cells may be organized into small micro-circuits, called Micro Netlists (MNLs), which appear to perform one aggregate function but in fact perform a different function. Such techniques and their products are described, for example, in L. W. Chow, et al., "Camouflaging a standard cell based integrated circuit," US Patent 20100213974, L. W. Chow, et al., "Method and apparatus for camouflaging a standard cell based integrated circuit," US Patent 20100218158, L. W. Chow, et al., "Method and apparatus for camouflaging a standard cell based integrated circuit with micro circuits and post processing," US Patent 20120139582, and L. W. Chow, et al., "Method and apparatus for camouflaging a standard cell based integrated circuit," US Patent 20130191803, which are all hereby incorporated by reference herein.

MNLs are instantiated and connected throughout the design to be protected, and MNL outputs are merged with functional outputs. Because of the camouflaged nature of the cells used in the design, a reverse engineer is likely to extract an incorrect functional netlist due to misinterpretation of camouflaged cells within the MNLs and the larger integrated circuit design. However, MNLs do not allow for secure post-manufacture configuration of their logical function. Hence, they cannot be configured or reconfigured to perform different logical functions, limiting their applicability in multi-use or reconfigurable circuit designs.

What is needed is camouflaged circuit designs that allow for post-manufacture configuration of their logical function and a method for fabricating such designs. This disclosure describes camouflaged circuit designs and methods for fabricating such designs that satisfy this need.

SUMMARY

To address the requirements described above, this document discloses a camouflaged ASIC and a method for fabricating same. One embodiment is evidenced by a camouflaged application specific integrated circuit (ASIC), comprising: core logic having a first plurality of interconnected functional logic cells and a programmable micro netlist (PMNL) comprising. The PMNL comprises a second plurality of interconnected functional logic cells that together comprise a logical input and a programming input, the PMNL performing a PMNL function, the programming input communicatively coupleable to a non-volatile memory to receive configuration programming data from the non-volatile memory to configure the PMNL to perform the PMNL function. At least one of the first plurality of functional logic cells and the second plurality of logic cells comprise an uncamouflaged functional logic cell performing a first functional logic cell function and having a first physical layout, and a camouflaged functional logic cell performing a second functional logic cell function that has a second physical layout substantially indistinguishable from the first physical layout. The combined first plurality of interconnected functional logic cells, the PMNL, and the configuration programming data perform one or more ASIC logical functions. In one embodiment, the PMNL further comprises a storage element, communicatively coupled to the program input to accept and store the configuration programming data received by the non-volatile memory.

Another embodiment is evidenced by a method of fabricating an application specific integrated circuit (ASIC), comprising: defining core logic having a first plurality of interconnected functional logic cells that perform one or more ASIC logical functions including a subset of the first plurality of interconnected functional logic cells for performing a programmable micro-netlist (PMNL) function, defining a PMNL for performing the PMNL function, and substituting the PMNL for the subset of the first plurality of interconnected functional logic cells for performing the PMNL function.

The PMNL comprises a second plurality of interconnected functional logic cells that together comprise logical inputs and a programming input to configure the PMNL to perform the PMNL function, the programming input communicatively coupleable to a non-volatile memory to receive configuration programming data from the non-volatile memory to configure the PMNL to perform the PMNL function.

Also, at least one of the first plurality of functional logic cells and the second plurality of logic cells comprise: an uncamouflaged functional logic cell performing a first functional logic cell function and having a first physical layout; and a camouflaged functional logic cell performing a second functional logic cell function and having a second physical layout substantially indistinguishable from the first physical layout. Further, the combined first plurality of interconnected functional logic cells, the PMNL, and the configuration programming data perform one or more ASIC logical functions. In one embodiment, the method further comprises defining a storage element, communicatively coupled to the program input to accept and store the configuration programming data received by the non-volatile memory.

Still another embodiment is evidenced by an application specific integrated circuit (ASIC), produced by performing a process comprising the steps of: defining core logic having a first plurality of interconnected functional logic cells that perform one or more ASIC logical functions including a subset of the first plurality of interconnected functional logic cells for performing a PMNL function; defining a programmable micro netlist (PMNL) for performing the PMNL function, and substituting the PMNL for the subset of the first plurality of interconnected functional logic cells for performing the PMNL function.

The PMNL comprises a second plurality of interconnected functional logic cells that together comprise logical inputs and a programming input to configure the PMNL to perform the PMNL function, the programming input communicatively coupleable to a non-volatile memory to receive configuration programming data from the non-volatile memory to configure the PMNL to perform the PMNL function.

Further, at least one of the first plurality of functional logic cells and the second plurality of logic cells comprise an uncamouflaged functional logic cell performing a first functional logic cell function and having a first physical layout and a camouflaged functional logic cell performing a second functional logic cell function and having a second physical layout substantially indistinguishable from the first physical layout. Also, the combined first plurality of interconnected functional logic cells, the PMNL, and the configuration programming data perform one or more ASIC logical functions.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIG. 46 is a diagram illustrating an exemplary two-input NAND gate active camouflaged cell with passive modification;

FIG. 47 is a diagram of a composite camouflaged AND2 gate comprising a normal AND3 gate communicatively coupled to a passive camouflaged cell with an output tied to high.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

This disclosure describes a system and method that allows third parties to provide set top boxes with advanced security features that (1) allow the signing of a customer's public key, (2) allow programming of chips with secret keys at chip manufacturing facility and (3) provide service providers a method to independently allocate those secret keys to security vendors when the CE device is in the field.

Blackbox Security Provider Programming System Permitting Multiple Customer Use and In Field Conditional Access Switching

Architectural Entities

Figure 1A:
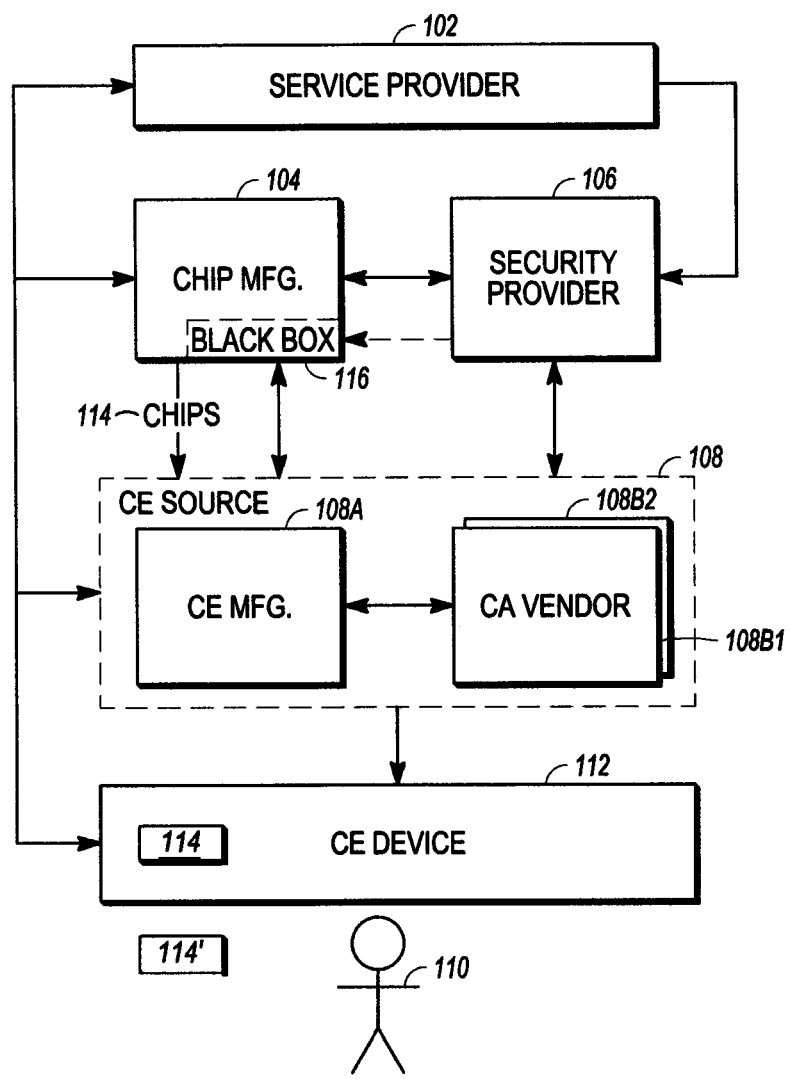
FIG. 1A is a diagram of selected architectural entities described in this disclosure.

FIG. 1A is a diagram of selected architectural entities described in this disclosure. They include a service provider 102, a chip manufacturer 104, a security provider 106, a third party vendor(s) 108 and subscriber(s) 110. The service provider 102 transmits media programs and information to consumer electronics (CE) device(s) 112 that are deployed to subscribers 110. The CE device 112 presents the media programs to the subscribers 110. The CE device 112 can include devices such as set-top boxes (STBs) integrated receiver/decoders (IRDs) portable CE devices such as cellphones or personal data assistants (PDAs), laptop computers, tablet computers, and desktop computers. Any device with the required processing and memory capacity having the proper programming or hardware can be used as a CE device. An exemplary IRD is disclosed in U.S. Pat. No. 6,701,528, which is hereby incorporated by reference herein.

To assure that only authorized subscribers 110 receive the media programs and information, the CE devices 112 perform security functions that are implemented at least in part using hardware processing/memory devices 114 (hereinafter alternatively referred to as chips) that are produced by chip manufacturer 104. For example, the transport module of the IRD disclosed in U.S. Pat. No. 6,701,528, is typically implemented by a chip.

Figure 1B:
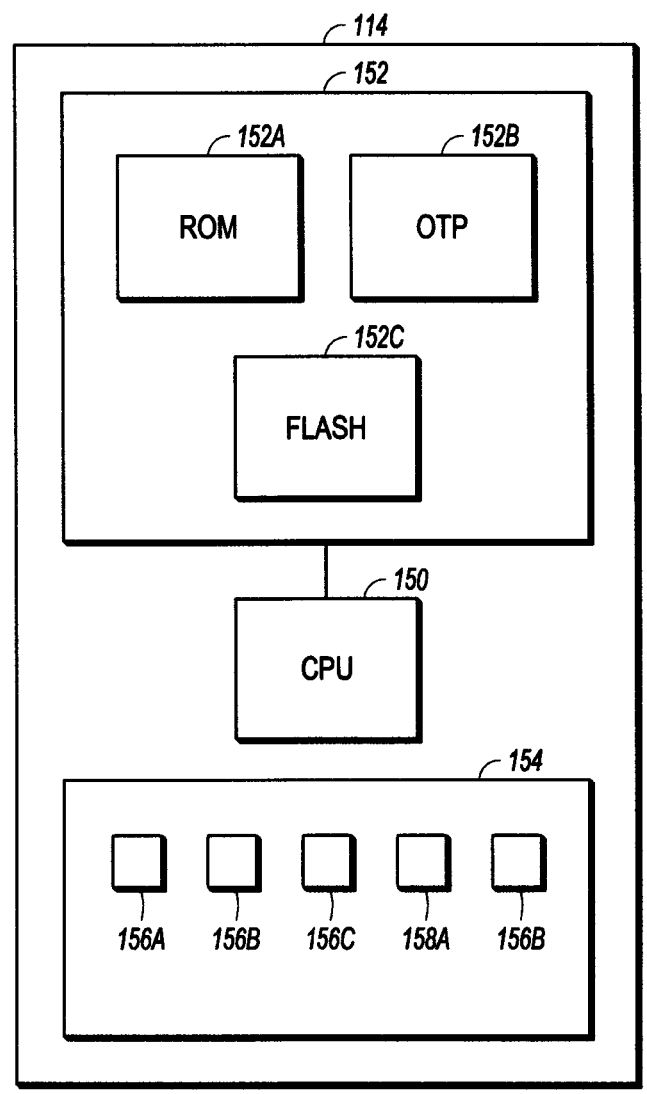
FIG. 1B is a diagram of an exemplary chip.

FIG. 1B is a diagram of an exemplary chip 114. The chip 114 comprises memory 152 communicatively coupled to a processor or CPU 150. The memory 152 stores instructions and/or data such as keys that are used to implement the conditional access functionality of the CE device 112. The memory 152 may include read only memory (ROM) 152A, one-time-programmable memory (OTP) 152B, and flash memory 152C. The chip 114 may also comprise a configuration portion 154, which may include a series of fuses 156A-156C and/or flags 158A-156B. The flags 158 may also be reflected by values in the memory 152. The fuses 156 are irreversibly activated by the chip manufacturer 104 to implement particular chip 114 functionality. For example, activation of fuse 156A may activate a triple data encryption standard (DES) functional capability of the chip 114, while fuse 156B may activate an RSA encryption functionality.

The CE devices 112 are manufactured by a CE source 108. In one embodiment, the CE source 108 is defined to include a particular CE manufacturer 108A that is responsible for the manufacture of a CE device 112 having hardware and software capable of implementing the CA functions allocated to the CE device 112 by a particular CA vendor 108B, which provides the instructions and data (for example, software and keys) that are used by the CA device 112 hardware to implement the CA functions required for the CA system used by the service provider 102. A particular CE source 108 is identified by a particular CE manufacturer's 108A product used with a particular CA system from CA vendor 108B used with the CE device 112. For purposes of the discussion below, when the same CE device 112 is used with the instructions and data (or smart card implementing some or all of the instructions and data) from two different CA vendors 108B, this represents two distinct CA sources 108

In one embodiment, the CE device 112 hardware is capable of performing the CA functions allocated to the CE device 112 for multiple CA vendors 108B at the same time. For example, a first CA vendor 108B1 (CA vendor 1) may define a CA system that allocates a first set of CA functions to the CE device 112, and a second CA vendor 108B2 (CA vendor 2) may define a second CA system that allocates a second set of CA functions at least partially different than the first set of functions to the CE device 112. The CE device 112 may support both CA systems by storing instructions and data that allow the CE device hardware to perform the CA functions allocated to the CE device 112 in both the first CA system and the second CA system. Thus, using the CA functionality provided by both the first CA vendor 108B1 and the second CA vendor 108B2, the fielded CE device 112 may be capable of performing the CA functions needed to receive and decrypt media programs and data transmitted by two different service providers 102 (for example, DIRECTV AND ECHOSTAR).

The CE device 112 hardware may also support the replacement or substitution of one set of allocated CA functions for another set of allocated functions. For example, rather than support both the first set and the second set of allocated CA functions, the CE device 112 hardware may be configured such that a first set of allocated CA functions is automatically disabled when the second set of allocated CA functions are enabled. This would allow, for example, a receiver initially configured to receive media programs from a first service provider 102 to be deconfigured from receiving such programs, and to instead receive media programs from a second service provider 102. Or, the first service provider 102 could desire a change its content protection services from its initial CA vendor 108B1 to those provided by a second CA vendor 108B2.

In another embodiment, the CE device source 108 may also include one or more CA vendors 108B that are architectural entities separate from the CE manufacturer 108A. For example, the CE device 112 may employ a smart card 114' (for example, as shown by the access card of FIG. 2 of U.S. Pat. No. 6,701,528) or other removable security device having security functions defined by the CA vendor 108B. The CA vendor 108B may manufacture and provide this security device 114' to the CE manufacturer 108A for ultimate provision to the subscriber(s) 110 with the CE device 112.

The CE source 108 may accept chips 114 from the chip manufacturer 104 and install them into the CE device 112. As described below, the present invention allows the chips 114 to be a standard design, yet uniquely and remotely programmable so as to be useful for CE devices 112 from different CE manufacturers 108A, and that can perform the allocated CA functionality for multiple CA systems enabled by different CA vendors 108B and used by different service providers 102.

In one embodiment, the chips 114 are programmed via use of a black box 116 provided by a third party security provider 106. The black box 116, as the name implies, is a device that performs a transformation of data such as code or keys, without revealing how the transformation is performed or disclosing the data. The use of the black box 116 in this instance, allows the security provider 106 to program instructions and/or data into the chip 114 at the chip manufacturer's facility and under the control of the chip manufacturer 104 without exposing that information and/or data itself to the chip manufacturer 104.

Data from the security provider 106 or the service provider 102 may also be programmed into the chip 114 at the CE source 108 or the subscriber 110 location using the techniques described below.

Customer Product Differentiator Field

A customer product differentiator, somewhat analogous to a customer number, is used by the security provider 106 and/or the chip manufacturer 104 to identify a customer specific configuration of a specific chip 114 for the functions to be performed by the CE Device 112 from a particular CE Source 108. The customer product differentiator (CPD 202) may be assigned to a particular CE Source 108 or service provider 102, for example, PANASONIC, DIRECTV or ECHOSTAR. Further, a single service provider 102 or CE source 108 may have different CPDs for products that are used in different markets if those products require chips that implement different security functions. In one embodiment, the customer product differentiator comprises a bit customer product differentiator (CPD 202) represented by a 32 bit field.

Figure 2:
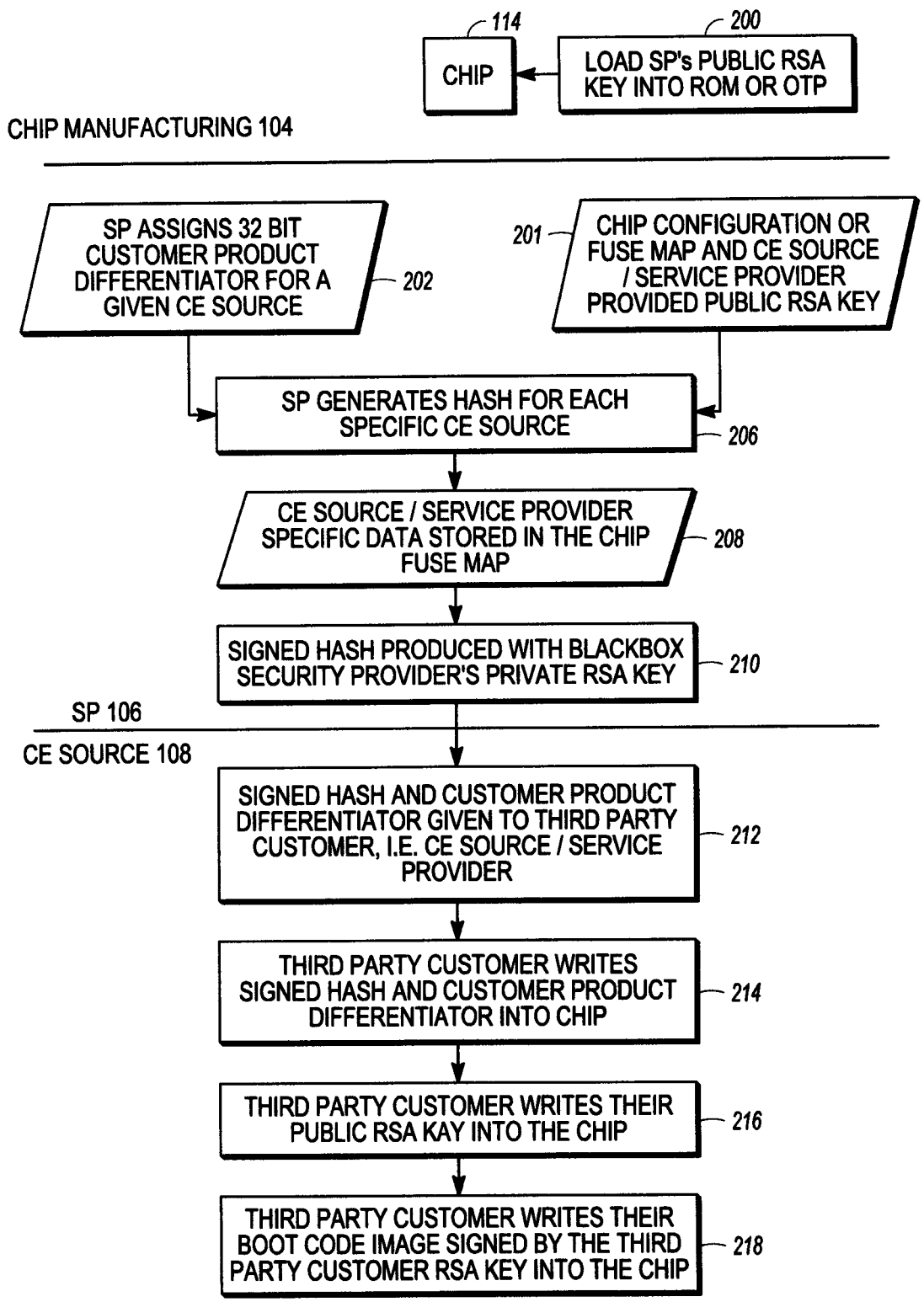
FIG. 2 illustrates the customer product differentiator field and signed hash block used to verify third party customer input data for fielded SOCs.

FIG. 2 is a diagram illustrating the use of the CPD 202. A customer product differentiator or CPD field 202 is generated and used with a signed hash block 210 to verify CE source 108 input data before that data is used in fielded chips 114 (i.e. deployed in fielded CE devices 112 installed at subscriber 110 locations). The security provider 106 uses the CPD 202 field as part of an input to fix chip 114 security data received from the CE source 108 (such as a specific flash-based CE source 108 public RSA key) to a given value. Optionally to further increase security, the address location for a flash-based third-party public RSA key and/or the CPD 202 can also be used fix input data for a given CE source 108 and incorporated into the signed hash block 210.

This process can be implemented as follows. In block 200', the public RSA key 200 of the security provider 106 is stored in ROM 152A at the mask level or OTP 152B using the black box 116. Customer-specific data 208 is generated by combining the CPD 202 with a public key 201 of the CE source 108 and optional chip configuration information, as shown in block 206.

Chip configuration information may vary according to the CA functions to be implemented by the chip 114 in the CE device 112. For example, a particular chip 114 may have the ability to implement a plurality of encryption/decryption schemes, depending on the setting of internal flags of the activation of internal fuses 156. The chip 114 configuration information may describe the enabled functionality of the chip 114 by indicating, for example, which flags are set and/or which fuses 156 are activated.

Typically, the above combination operation 206 is performed by the security provider 106. In one embodiment, the CPD field 202 is assigned by the security provider 106 and the combining operation of block 206 is a hash operation. The result is CE source 108 data 208 that is unique and specific to that CE source 108 and customer product. This data may be stored in a map which controls the activation of fuses 156.

In block 210', the customer-specific data 208 generated above is signed with a private key of the security provider 106 $Kpr_{sp}$. In blocks 212 and 214, this signed combination and the customer product differentiator or CPD 202 is provided to the CE source 108. The CE source 108 writes the signed customer data 208 and the customer product differentiator or CPD 202 to a memory 152 of the chip 114. The customer data 208 signed with the security provider's 106 private RSA key is also securely stored at the CE source 108 site for use in the generation of future customer operations.

In blocks 216-218, the CE source 108 writes their CE source public key ($Kpu_{CE}$) into a memory 152 of the chip 114 and also writes an image of the CE device 112 boot code signed by the private key of the CE source 108 into memory 152c of the chip 114. Boot code comprises coded instructions that are verified and executed automatically when a CE device 112 is powered up.

The chip 114 is thereafter installed into the customer device 112 by the CE manufacturer 108A, and provided to the subscriber 110 for use. When the customer device 112 and chip 114 are powered up, a boot code is verified 314, then executed by the chip 114, as further described with reference to FIG. 3.

Continuing with the operations illustrated in FIG. 2, the security provider 106 generates the signed hash block over the customer-specific data using the chip 114 configuration (provided in block 201'), the CE source's public RSA key, and the CPD field 202. The CE source 108 can store the signed hash CPD field 202 in one time programmable (OTP) memory 152B location of the chip 114 as shown in block 214, however, the CPD 202 could reside in flash memory for example in cases where there is not enough OTP or the chip 114 does not support OTP. If the CE source 108 or other entity were to alter the CPD field 202 or the CE source's public RSA key, then the RSA signature validation described below and illustrated in blocks 310 and 312 using the security provider's 106 signed hash block 308 would fail and the chip 114 will not completely execute the boot code instructions, and will chip 114 and CE device 112 will be otherwise unusable. This is further described below.

The security provider's public RSA key 200 is embedded in Read Only Memory (ROM) 152A or One Time Programmable memory (OTP) 152B within the chip 114 as described below with reference to FIG. 3. This serves as the hardware root of trust in the chip 114.

Boot ROM Signature Check

U.S. Patent Publication 2007/0180464, entitled "Method and System for Restricting use of Data in a Circuit," (hereby incorporated by reference herein) discloses a method for checking the signature of boot code stored in ROM. These techniques can be extended to support code protection as discussed herein.

The security provider 106 supplies a 2048 bit RSA public key that is stored in a ROM 152A of the chip 114 or an OTP bank 152B within the chip 114, as shown in block 200'.

An Elliptical Curve Cryptography (ECC) key could also be used to perform asymmetric cryptographic operations in a similar manner to which is described below using RSA. Public key storage in a ROM 152A of the chip 114 is preferred and is the most secure location because it cannot be changed in the field, however, storage as data in the OTP 152B still provides a hardware root of trust. This can be implemented by programming the chip 114 using the black box 116 provided by the security provider 106 during chip 114 manufacturing.

The chip 114 may also include boot code that is used upon power up to boot or start the chip 114. In one embodiment, this boot code is signed by the CE source's private key, before storage in the chip 114 so as to permit later validation before further processing as described below.

Figure 3:
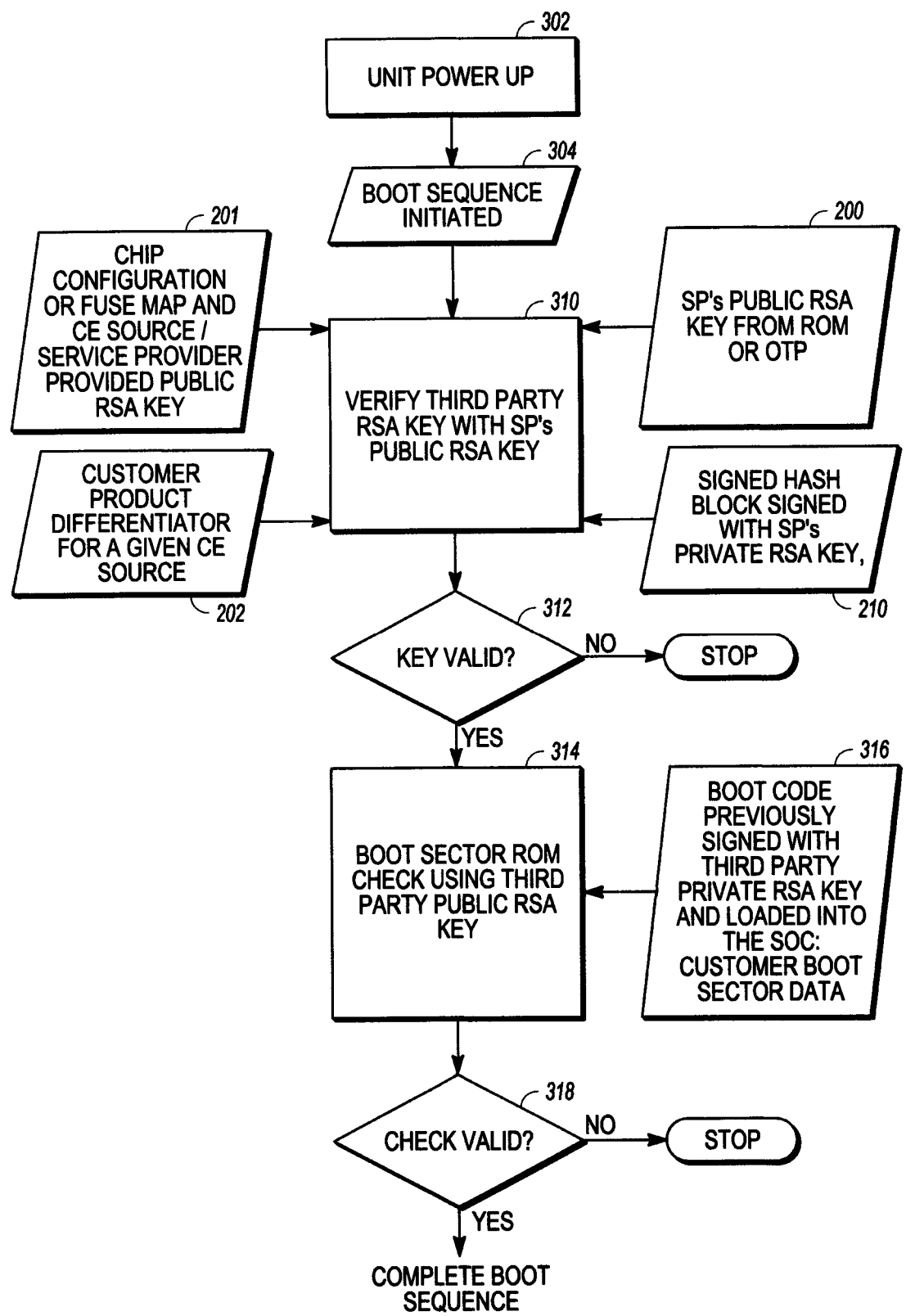
FIG. 3 illustrates the Boot ROM signature check over the code section enabling insertion of a CA vendor Public RSA key in a fielded SOC.

FIG. 3 is a diagram presenting an exemplary embodiment of how the boot code image can be verified before it is executed by the chip 114. When the CE device 112 is powered up, a boot sequence is initiated by the chip 114, as shown in blocks 302 and 304. Next, the public key of the second entity (in this case, the CE source 108) is verified.

Recall that the signed hash (which was generated with the CE source's public RSA key and the CPD) was stored in block 214 and the CE Source's public key was stored in the chip 114 in block 216'. That hash can be recomputed in the chip 114 using the CPD 202 that was stored in the chip 114 in block 214, the CE Source public RSA key stored in the chip in block 216', and the chip configuration data. Further, the signature over the hash, i.e. the signed hash, stored in block 214 can be verified using the security provider's 106 public key 200 which is retrieved from the ROM 152A or OTP 152B of the chip 114. The hash will only be equivalent to the recomputed hash if the CE source's public RSA key written in block 216' is equivalent to the CE source's public RSA key used to generate the hash in block 206 are equivalent.

If the comparison indicates that the CE source's public key is not valid, processing stops and the chip 114 will fail to exit the reset mode. If the comparison indicates that the CE source's public key is valid, processing is passed to block 314 where the boot sequence is verified using the verified CE source's public key.

If the boot sequence is verified, the boot code image is verified as shown in blocks 314-318 and the boot code is executed. If the boot sequence is not verified, chip 114 will again fail to exit the reset mode and will be non-operational.

In the above operations, a hardware security co-processor built into the chip 114 can read the CE source's public RSA key 200 (which was stored in block 216') from memory such as a flash location in the chip 114 and use it to verify the stored signature for the customer application code that has been calculated over the entire section of customer application code to be downloaded for execution. The chip 114 memory location from which the security provider's 106 public RSA key 200 is read may be fuse 156 locked to a specific ROM 152A or OTP 152B key by the chip manufacturer 104, that is, at electronic wafer sort or when sensitive immutable data is stored in the chip 114 by the black box 116 provided to the chip manufacturer 104 by the security provider 106. In one embodiment, once the location of the security provider's 106 public RSA key 200 has been selected, it cannot be changed in the field. This security provider 106 public RSA key is used as the chip's hardware root of trust in code signing, thereby, enabling use of at CE source 108 or CA vendor 108B public RSA key.

The main processor 150 of the chip 114 incorporated into the CE device 112 may be held in a reset mode until the boot code check of blocks 314-318 is completed, thereby, eliminating the possibility of executing unknown user or malicious boot code.

Typically, the chip 114 must support the ability to extend the public ROM/OTP keys held by the security provider 106 to CE source 108-defined RSA keys by checking a signed hash stored in the chip 114. This enables a first entity, such as the security provider 106, to sign the public RSA keys of the second entity (such as the CE source 108-defined public RSA keys) and allows validation of the CE source's 108 public RSA key based on the security of the root of trust in the security provider's public RSA key stored in ROM/OTP 152A/152B. Preferably, this hardware-based validation process occurs in a secure manner that is not modifiable or accessible by other elements in the CE device 112 such as a general-purpose processor 4804A or special purpose processor 4804B. This process is typically controlled by a hardware state machine or performed on a separate embedded security co-processor executing from a private secure memory location.

The signed hash 210 used to validate the CE source's public RSA key 216 incorporate the CPD 202 field assigned by the first entity (the security provider 106) to properly bind the CE Source's public RSA key 216 to a specific party, that is, the CE Source 108 to which the CPD 202 was assigned in block 202'. Incorporating additional information such as the address of the memory 152 location of where the CPD 202 value and/or CE source's public RSA 216 are stored further limits potential attacks by fixing values to particular areas in a map of the memory 152 of the chip 114.

Having either the CPD field 202 or CPD address field incorporated into the signed hash 210 also enables the CE source 108 to assign an alternate CPD field 202 and/or CPD address, either of which enables switching from a first CA vendor 108B1 to a second CA vendor 108B2 as discussed below.

Incorporating either the CPD field 202 or CPD address field into the signed hash enables the CE Source 108 to revoke a previously assigned CE source 108 public RSA key by changing the value of the CPD 202 itself, assigning a new CE source public RSA key for a new CE source 108 and sending a new software image as is also discussed below. The previously signed CE source public RSA 216 key will no longer be successfully validated by the security provider's signed hash 210 since the signed hash incorporates the old CPD value 202, which will no longer pass the verification process of blocks 310 and 312 of FIG. 3 since the CPD value 202 has changed, thereby, revoking the signed hash 210 and previous CE source public RSA key 216. The previous CE source public RSA key could be used once again if the security 106 provides another signed hash 210 using the old CE source public RSA key 216, an old CPD value 202 with a new CPD address because the new address could used to store the previously old CPD value.

The generation of the signed hash 210 is typically accomplished using the security providers' private RSA key and the chip manufacturer's 104 supplied tool chain at the security provider's 106 trusted facility. The security provider 106 may generate the signed hash 210 through use of publicly available tools such as OpenSSL or custom tools developed by the security provider 106. The signed hash 210 validation in the chip 114 occurs using the security provider's public RSA key 200 stored in the ROM/OTP of the chip 114.

As an alternative to switching CA systems, a broadcaster or service provider 102 may decide to enable the CA functionality of multiple CA systems provided by multiple distinct CA vendors 108B (e.g. CA vendor 108B1 and CA vendor 108B2) to be implemented in a single CE device 112. In this case, the broadcaster or service provider 102 may assign a single CPD 202 and CE Source public RSA key 201 to verify a CE device 112 boot image that combines the security functionality of both CA vendors 108B1 and 108B2. In this case, the boot code may combine and integrate two distinct portions, a first portion for the first CA vendor 108B1, and a second portion for the second CA vendor 108B2. Since current chip 114 designs cannot independently verify the signed hashes for two distinct boot code regions with two different public keys, a common CE source public RSA key 201 can used to verify the combined boot code portion containing the boot sequence for both CA vendors 108B1 and 108B2. In future chip 114 designs that can do so, a separate CA vendor public RSA key 201 can be used for each boot code portion.

The signed hash 210 may be incorporated in the boot flash image 152C by the CE source 108 as shown in 316 using tools provided by the chip manufacturer 104 once the CE Source 108 has finalized it own boot code. The signed hash 210 is validated in the chip 114 each time the chip 114 is powered up and before the chip 114 exits the reset mode. The precise boot process may be chip 114-specific as defined by the chip manufacturer 104.

The chip 114 may support several security provider RSA public keys 200, however, the number of production ROM locations available in the chip 114 is typically limited due to physical storage sizing and timing for the availability of the data (i.e. the security provider's public RSA key 200 placed in ROM must be available at the time of the initial chip design).

As described above, one of the unique features of the present invention is the ability for a standard chip 114 to be used with a multiplicity of different CE sources 108, service providers 120 and/or CA vendors 108B, with the security features customized for each CE source 108 and/or application. Typically, there are not enough ROM hardware slots in the chip 114 for all of the possible CE sources 108 to have their security data embedded in the ROM for the production chip 114. Also, since all CE sources 108 are typically not known during the development phase of the chip 114, the security data of every CE source 108 cannot be incorporated into the more secure production ROM during the development stage. The techniques discussed below extend the public RSA key of the security provider 106 as the hardware root of trust to multiple CE sources 108, service providers 102 and/or CA vendors 108B to enable in-field switching and or augmentation of CA functions implemented in the chip 114 and without the use of a black box 116. Instead, this programming system takes a generically manufactured chip 114 and binds a specific flash memory-based CE source 108-provided public RSA key 201 to a particular customer such as the CE Source 108 or service provider 102 utilizing the security provider's ROM/OTP-based public RSA key 200 as the hardware root of trust.

Secret OTP Value (SV) Use to Protect Sensitive Data

A secret value (SV) 451 programmed by the security provider 106 can be stored in the chip 114 OTP memory 152B, and that SV 451 can be used to indirectly modify or manipulate sensitive data that is externally supplied to the chip 114. Such sensitive data can be supplied from the service provider 102 via a broadcast, a third party CA vendor 108B, a USB port, Internet server, DVD or similar means.

Figure 4A:
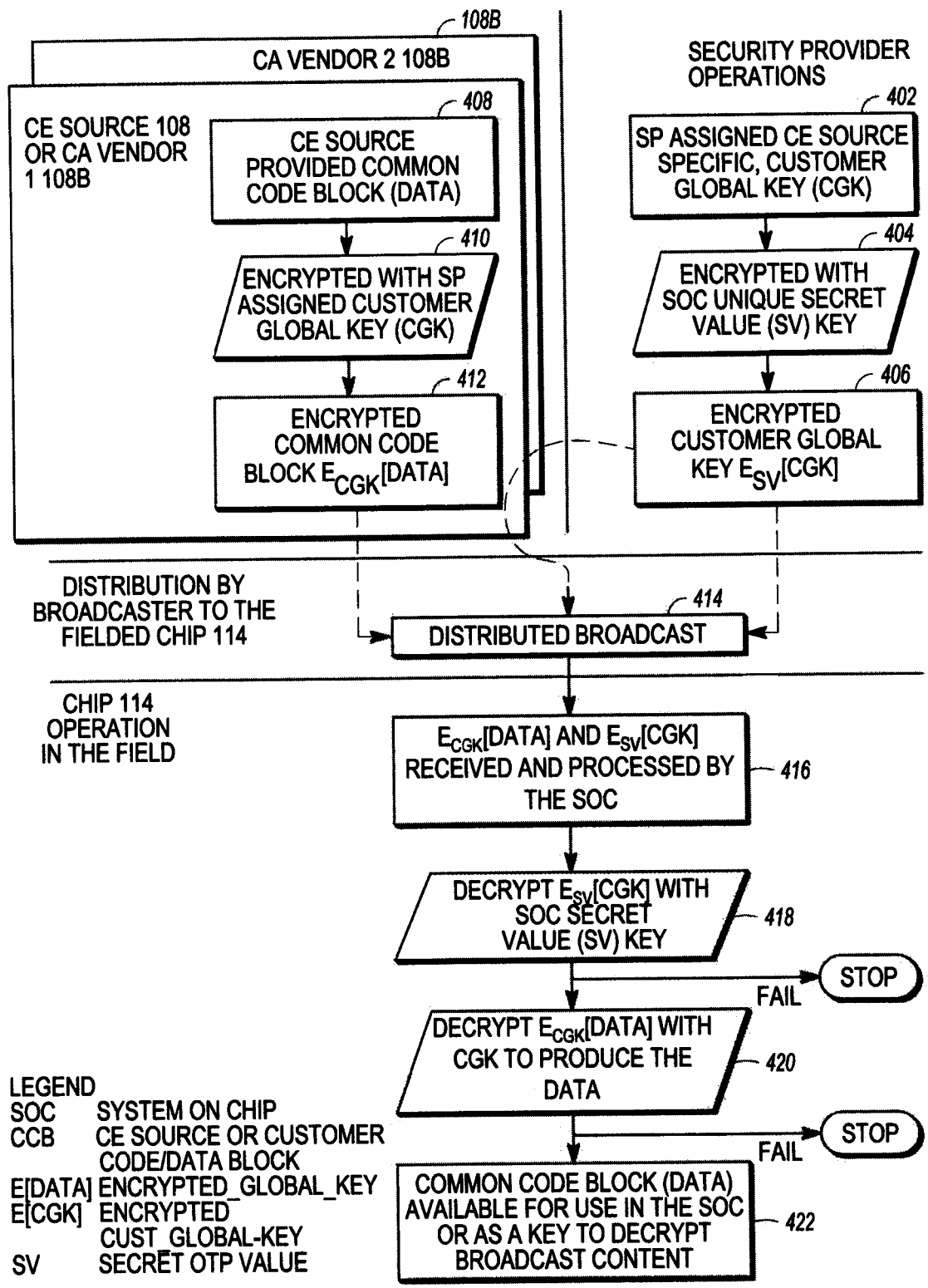
FIG. 4A illustrates use of a Secret Value stored in hardware to protect a given CA vendor customer's common block of data or key.
Figure 4B:
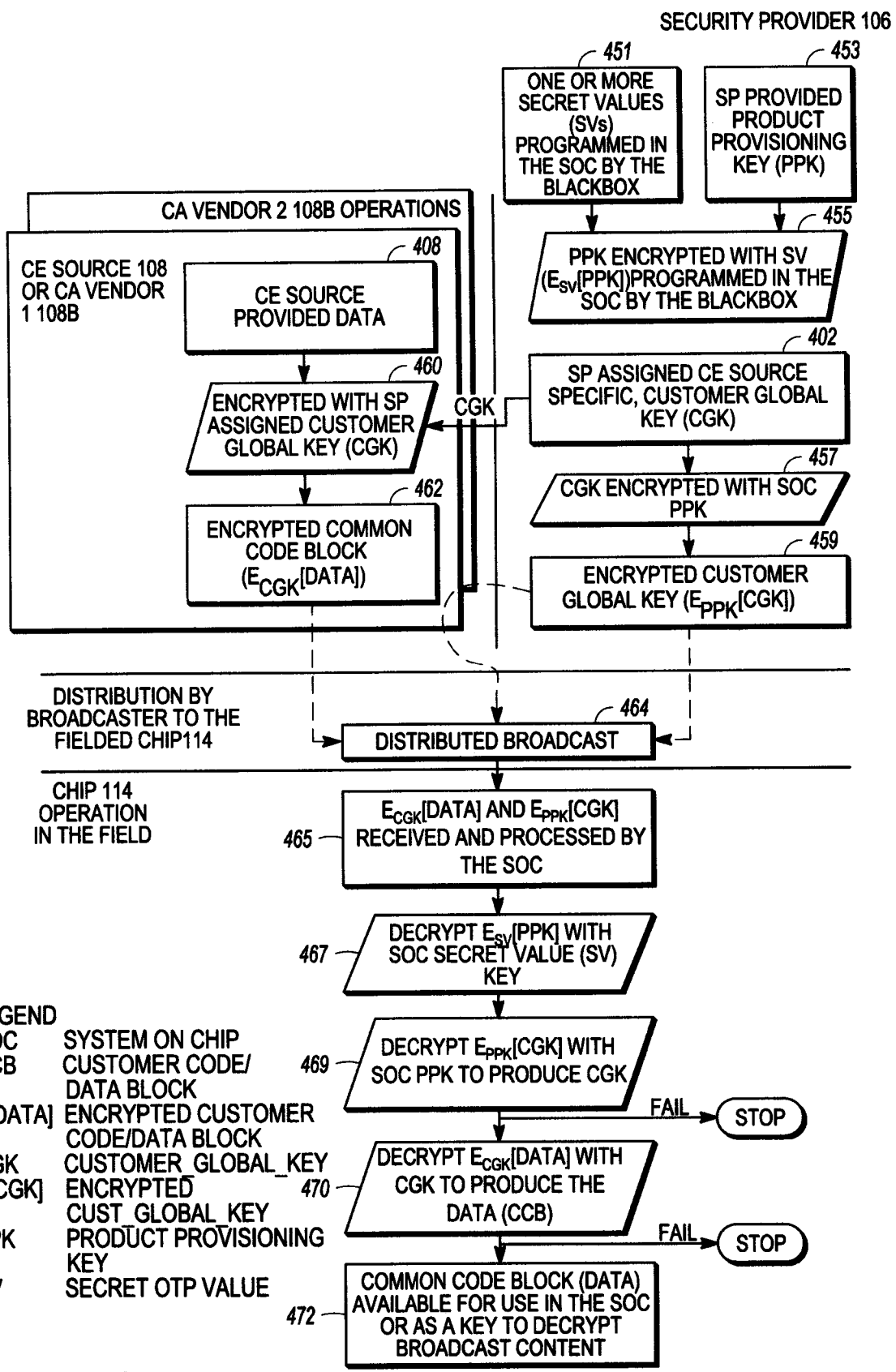
FIG. 4B illustrates use of a Secret Value and Product Provisioning Key both stored in hardware to protect a CA vendor's common block of data or key.

FIG. 4A and FIG. 4B are diagrams illustrating how data (D) can be securely received from one or more CA vendors 108B and can be provided for use by the chip 114 in a CE device 112. The data is protected from access by unauthorized CA vendors 108B and potential attackers. Such data (D) may be a key for decrypting media programs transmitted by the service provider 102 using the CE device 112, a common code block of data 408 including instructions for execution by the CE device 112, or similar data.

In block 402', a customer global key (CGK) 402 is generated or assigned by a first entity such as the security provider 106 and transmitted to a second entity such as the CE source 108 or a first CA vendor 108B1. The data (D) 408 of interest is encrypted according to the customer global key 402 provided by the security provider 106 to produce encrypted data $E_{CGK}[D]$ as shown in block 410. In a third party black box programming architecture performed by the security provider 106, this encryption may be performed, for example, by the second entity or CE source 108 or CA vendor 108B. The security provider 106 may select the CGK uniquely for each CE source 108 or CA vendor 108B. Since the CGK is unique to each CA Source 108A/CA Vendor 108B, sensitive intellectual property such as code or data can cryptographically isolated and protected from successive CA vendors 108B in case switching of CA systems or vendors is desired. Such CA systems from CA vendors 108B can concurrently be implemented in the CE device 112.

In block 404, the customer global key (CGK) 402 is also encrypted according to a secret value (SV) key by the security provider 106 (or CE source 108) to produce an encrypted customer global key $E_{SV}[CGK]$ 406. In one embodiment, each chip 114 has a unique SV key 451, and the security provider 106 or CE source 108 encrypts the CGK uniquely for each chip 114 using that chip's unique SV key 451.

The encrypted customer global key $E_{SV}[CGK]$ 406 and the encrypted data $E_{CGK}[Data]$ 412 are then transmitted or distributed to the CE device 112 and the chip 114, where it is received and processed, as shown in blocks 414' and 416'. Transmission can be by physical transfer of a storage medium or using wired or wireless data transmission. The encrypted customer global key $E_{SV}[CGK]$ 406 is then decrypted according to the SV key 414 stored in the chip 114 to reproduce the customer global key 403 and the encrypted data $E_{CGK}[Data]$ is decrypted with the reproduced customer global key CGK to reproduce the data (D), as shown in blocks 418 and 420. Either or both of these operations can be performed by a third entity (for example, the user's fielded CE device 112 using the chip 114). In one embodiment, these decryption operations are hardware controlled and not accessible or modifiable by the CE device 112. It is important to note that the CGK is not shared between potential CA vendors 108B and that this cryptographic isolation is maintained in the chip 114 by encrypting the CGK with the SV key that is unique to each chip 114.

When needed, the CGK may again be decrypted using the SV key within the key ladder (a secure processing engine that handles security keys in the chip 114 without exposing such secrets to the main CPU or exporting key material for access by software) with the results of this decryption unavailable to the software of the main CPU, thereby supporting both CA switching and CA co-existence in the CE device 112.

In block 420, the decrypted CGK 402 is used to decrypt the $E_{CGK}[Data]$ 412, resulting in the Data 408, which is used by the chip 114 to perform security related functions such as decrypting the media program. The decrypted Data 408 can also be a key used to further decrypt the broadcast content or a common block of code/data, as shown in block 422. If the operations of blocks 418 or 420 fail, processing stops, as shown in FIG. 4A. The foregoing operations can be used to transmit data from a second CA Vendor 108B2 as well.

FIG. 4B shows another embodiment of how to securely distribute data from the service provider 102 or CA vendor 108B. In this embodiment, the CGK 402 remains unique to each CA vendor 108B and cryptographic isolation is maintained in the chip 114 by use of a product provisioning key (PPK) 453 that is not shared with any other CA vendor 108B or third party. When needed, the CGK 402 is decrypted with the PPK 453 within the chip's 114 secure key processing engine that handles content protection keys, the key ladder, whose results are not available to software of the main processor of the chip 114, thereby supporting switching between CA systems (which may be supplied by different CA vendors 108B) co-existing in the CE device 112. Support for CA switching and CA co-existence is discussed in detail in the sections below.

The security provider 106 generates a secret value (SV) 451 that is unique to each chip 114 and a product provisioning key (PPK) 453 that is unique to a particular chip 114 design or model, but not unique to a particular chip 114. The PPK 453 could be changed for a given number of chips 114 programmed by the black box 116 or manufactured for a specific period of time. The SV 451 is programmed into the chip, as shown in block 451'. Further, the PPK 453 encrypted by the SV 451 is also generated and programmed into the chip 114, as shown in block 455'. These programming operations are performed by the chip manufacturer 104 using the black box 116 provided to the chip manufacturer 104 by the security provider 106. New keys are periodically loaded into the black box 116 which resides at the chip manufacturer 104 by encrypted DVDs or USB drive images created by the security provider 106 at their secure facility.

A customer global key (CGK) 402 is generated by a first entity such as the security provider 106 and transmitted to a second entity such as the CE source 108 or CA vendor 108B. The data (D) 408 is encrypted according to the customer global key 402 to produce encrypted data $E_{CGK}[D]$ as shown in block 460. The encryption of the data (D) may be performed, for example, by the second entity such as the CE source 108 or CA vendor 108B.

As shown in block 457, the customer global key (CGK) 402 assigned by the security provider 106 is also encrypted according to a product provisioning key (PPK) 453 by the security provider 106, as shown in block 457 to produce an encrypted customer global key $E_{PPK}[CGK]$ 459. The security provider 106 selects the CGK 402 uniquely for each CE source 108/CA vendor 108B combination, thus enabling the security provider 106 to support many third party CA Vendors 108B and/or CE Sources 108 using chips 114 from multiple chip manufacturers 104 while cryptographically isolating the CGK 402 intended for use by one CA Vendor 108B1 from that used by another CA Vendor 108B2 and potential attackers by use of the PPK 453.

The encrypted customer global key $E_{PPK}[CGK]$ 459 and the encrypted data $E_{CGK}[Data]$ 462 are then transmitted or distributed to the CE device 112 and hence, the chip 114, where it is received and processed, as shown in blocks 464 and 465. This can be accomplished by physical transmission of media storing the encrypted customer global key $E_{PPK}[CGK]$ 459 and the encrypted data $E_{CGK}[Data]$ 462 or by electronic transmission of the data, by wireless or wired means since the sensitive data is encrypted. Also, the security provider 106 may transmit the encrypted customer global key $E_{PPK}[CGK]$ 459 to the CE source 108, and the CE source 108 may transmit both the encrypted customer global key $E_{PPK}[CGK]$ 459 and the encrypted data $E_{CGK}[Data]$ 462 to the CE device 112.

The encrypted PPK 453 is recovered by decrypting $E_{SV}[PPK]$ that was programmed into the chip 114 using the SV programmed into the chip in block 451'. This is shown in block 467. The encrypted customer global key $E_{PPK}[CGK]$ 459 is decrypted according to the recovered PPK 453 to reproduce the customer global key CGK 402 as shown in block 469 and the encrypted data $E_{CGK}[Data]$ is decrypted with the reproduced customer global key CGK 402 to reproduce the data 408, as shown in blocks 470 and 472. Either or both of these operations can be performed by a third entity (for example, the user's fielded CE device 112 using the chip 114). In one embodiment, these decryption operations are hardware controlled and not accessible or modifiable by the chip's main processor or any other processor associated with the CE device 112.

If the operations in blocks 469 or 470 fail, processing stops, as shown in FIG. 4B.

The decrypted data 408 is typically data that is used by the chip 114 to perform security related functions. For example, the decrypted data 408 can include a key used to decrypt the broadcast content or can be a common block of code/data for performing security related functions. The data may also comprise a media program decryption key also known as the control word (CW) and/or a pairing key (PK) that cryptographically binds the CE device 112 with an external device such as a smart card.

Secure Product Code-Data Provisioning by Arbitrary Third Party Customers

Figure 5A:
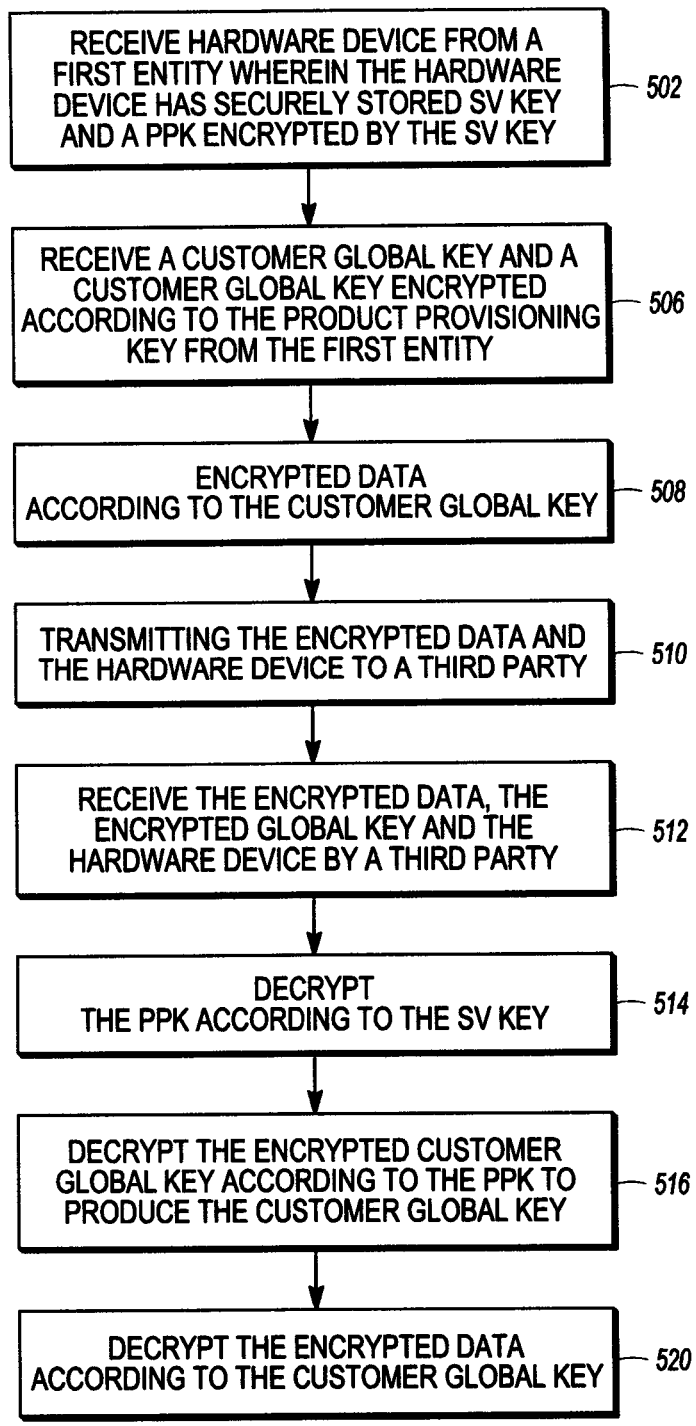
FIG. 5A is a diagram presenting illustrative method steps that can be used to enable encryption of sensitive code or data and provide it to an independent CA vendors or untrusted consumer electronics (CE) device manufacturer for provisioning.

FIG. 5A is a diagram presenting illustrative method steps that can be used for the encryption of sensitive code or data to enable cryptographic separation of code and data for different CA vendors 108B and CA co-existence. The encrypted block can be provided to an untrusted consumer electronics (CE) device manufacturer 108A for provisioning.

The hardware device such as a chip 114 is received from a first entity such as the security provider 106, wherein the hardware device has a securely stored SV key 451 and a product provisioning key (PPK) 453 encrypted by the SV key ($E_{SV}[PPK]$), as shown in block 502. A CGK 402 and the CGK encrypted according to the PPK 453 ($E_{PPK}[CGK]$ 455) is received from the first entity, as shown in block 506. The Data is 408 encrypted according to the customer global key to produce encrypted data ($E_{CGK}[Data]$ 462), and the encrypted data $E_{CGK}[Data]$ 462 and hardware device are transmitted to a third party, as shown in blocks 508 and 510. In one embodiment, the SV key and the encrypted product provisioning key $E_{SV}[PPK]$ 455 are securely stored in the hardware device 114 via a black box 116 the first entity.

The encrypted data $E_{CGK}[D]$ 462, the encrypted customer global key $E_{PPK}[CGK]$ 459, and the hardware device 114 are received by the third party such as a CE Source or CA vendor 108B, as shown in block 512, and installed into the CE device 112.

The encrypted product provisioning key $E_{SV}[PPK]$ 455 is then decrypted according to the SV key 451 stored in the chip 114, as shown in block 514. The encrypted customer global key $E_{PPK}[CGK]$ 459 is then decrypted according to the decrypted PPK 453 to produce the customer global key CGK 402, as shown in block 516'. Finally, the encrypted data $E_{CGK}$[Data] 462 is decrypted according to the customer global key 516, as shown in block 520. The data is then available for use.

Figure 5B:
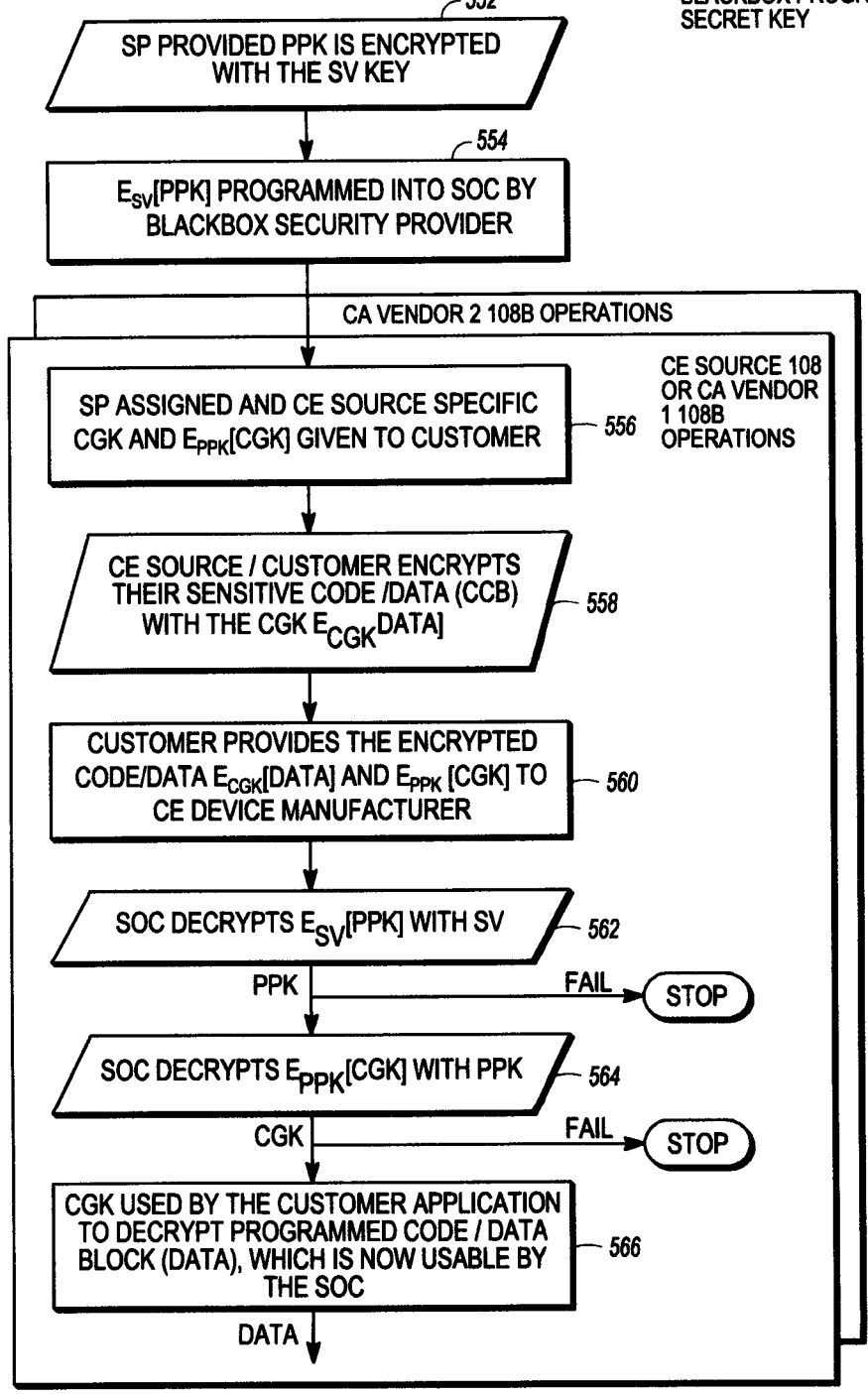
FIG. 5B is a diagram illustrating use of a product provisioning key and secret value stored in hardware to protect a CA vendors' common block of data or key enabling in-field insertion of a secret value post SOC manufacturing.

FIG. 5B is a diagram showing a specific example of the operations presented in FIG. 5A. The security provider 106 defines a PPK 453 and a SV 451, and programs the PPK 453 encrypted by the SV key 451 into the chip 114, as shown in blocks 552-554. This is accomplished via the security provider's black box 116 disposed at the chip manufacturer 114. Typically, the PPK 453 is held secret and not exported to software in the CE device 112, which would leave it vulnerable to unauthorized attack.

The security provider 106 then provides each CE source 108 (i.e. CE manufacturer 108A/CA vendor 108B combination) with a different customer global key, CGK 402 (in one embodiment, a 128 bit value) and the CGK 402 encrypted with the PPK 453, referred to as the $E_{PPK}$[CGK], as shown in block 556.

The CE source 108 encrypts their sensitive code/data (D) 408 with the CGK 402, as shown in block 558, and provides the encrypted code/data to the CE manufacturer 108A during CE device manufacturing for the initial load, as shown in block 560. The chip 114 decrypts $E_{SV}$[PPK] to obtain the PPK, and decrypts the $E_{PPK}$[CGK] using the obtained PPK 453 to produce the CGK 402, which is thereafter usable by the third party software application such as CE device 112 or a Set Top Box (STB) User Interface (UI) code executing in the chip 114, as shown in blocks 562-566. This allows the CGK 402 to be unique to each CE Source 108 (CE manufacturer 108A/CA Vendor 108B) combination without revealing the PPK external to the security provider 106 and assures that the CGK 402 is known only to the CE Source 108 combination it is assigned to and no other party, excepting the security provider 106, which assigned the CGK 402. This enables the PPK 453, CGK 402, and SV 451 from distinct CA vendors 108B to be used independently without exposing these keys or other data to other CA vendors 108B or third parties. As a consequence, different key sets ($E_{PPK}$[CGK] 459 and CGK 402) can be allocated to each CA vendor 108B. This permits a plurality of CA vendors 108B to implement CA functionality on a single chip 114.

Using this process, the CA vendor-specific CGK 402, the protected code/data segment 408 and the global PPK 453 are not exposed outside the hardware controlled key ladder of the chip 114, which is the secure key processing engine that handles content protection keys. Again, the PPK 453 is held secret by the security provider 106 and not given to the chip manufacturer 104 or any third party and the CGK 402 is never given a third party outside the CE source 108 or CA vendor 108B.

Among the advantages of this scheme include:
(1) The global chip 114 secret, PPK 453, is not given to the chip manufacturer 114 or any third party. It is held secure by only the security provider 106;
(2) Each CE source 108 or CE manufacturer/CA vendor 108B combination receives their own provisioning key, CGK 402; and
(3) A hardware chip 114-unique secret (SV 451) is used as the root of trust, and each CA vendor 108B can be provided a different SV key when several chip unique SVs are provisioned in the chip 114 during black box 116 manufacturing.

In one embodiment, the security provider's programming is tied to a particular chip 114 identified by a public value referred to as a Product Identifier (PID) 600. The chip 114 is uniquely programmed and provisioned by the security provider's black box 116 and tracked by the chip manufacturing process. The programming methodology taught in this disclosure enables the placement of secondary provisioning/activation server at third party CE product manufacturing facilities 108A to track actual CE devices 112 produced and tested as opposed to chips 114 manufactured by the SOC chip manufacturer 104. This secondary provisioning/activation server can be located in the CE Source Operations of FIGS. 4A and 4B. The programming methodology taught in this disclosure can automate reporting (at chip 114 fabrication and CE device 112 manufacturing) and less is hands-on for authorized third parties to track production of CE devices 112 for accounting purposes such as determining royalty payments for software licensing. This solves a major problem for CE manufacturers 108A who may not be receiving accurate reports from suppliers or distributors for royalty payment purposes for licensed software or hardware that the CE manufacturer 108A is due.

The other significant advantage with this architecture is that security is enforced purely in hardware, which is significantly harder to defeat than software based implementations. Hardware based storage, which cannot be modified by a third party customer or an attacker, can be used for the security provider's Public RSA 200 or security provider's ECC key, CPD field 202, first secret value (SV) 451, one or more additional secret values (SV2, SV3, SV4, etc.), product identifier (PID) 600, JTAG unlock and $E_{SV}$[PPK] 455 (the PPK encrypted with the SV).

Product Identifier (PID) Assigned to Arbitrary Customers

Figure 6:
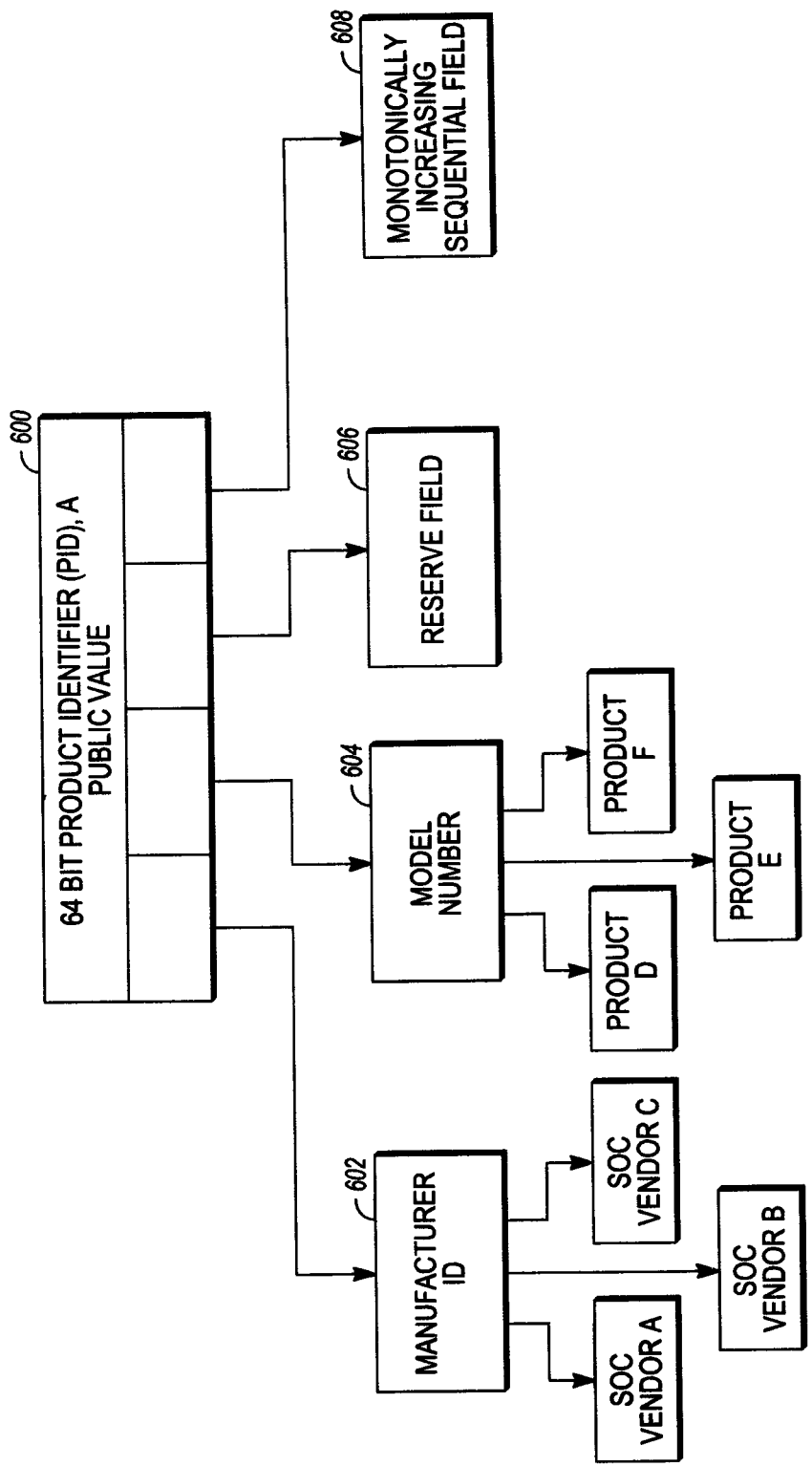
FIG. 6 is a diagram of one embodiment of the product identifier (PID) described above.

FIG. 6 is a diagram of one embodiment of the product identifier (PID) described above. The PID 600 identifies the specific chip 114 (not just the chip 114 configuration), and may be provided to the CE source 108 after the chip 114 is manufactured. In one embodiment, the PID is a 64 bit Public CE Device ID that is generated by the security provider 106 and programmed in the chip 114 by the black box 116.

The security provider 106 ensures that the PIDs 600 are globally unique across all supported products, that is, across multiple chip manufacturers 104 and multiple CE device manufacturers 108A. A system-wide unique value is needed to ensure that any manufactured chip 114 can be allocated to any customer.

In one embodiment, the PID 600 consists of a chip manufacturer identifier 602, a model number 604 that specifies the type of chip 114 produced by that chip manufacturer 104, a reserve field 606 for future use and a monotonically increasing serial identifier 608 to uniquely identify the chip 114 within the product family and manufacturer.

Conditional Access System Swap with Different Key Sets

The infrastructure provided by the security provider 106 in chips 114 programmed by the black box 116 allows for a broadcaster or service provider 102 to change Conditional Access Systems (CAS) at its discretion.

In traditional systems for large CA Vendors 108B, the Conditional Access provider held the root RSA key used to sign the boot loading code. The boot loader code, which is used by the Set Top Box (STB) or CE device 112 internal software to validate and authenticate a software download it has received, performs this critical verification step. This is to ensure an authorized party provides the code. If the boot loader cannot successfully validate the code, the code received in the download message will be rejected.

The public portion of an RSA key root key 200 is either part of the ROM mask set of the chip 114 or it is programmed into a secure portion of One Time Programmable (OTP) memory as part of the chip manufacturer's 104 foundry process. This key can be used by the security infrastructure of the chip 114 to authenticate the download, which has been signed with the corresponding private key section of the programmed RSA key. If the signed hash 210 cannot be validated as shown in FIG. 3, then the public RSA key verified in 310 is not correct or does not match with the public portion of the RSA key (either 200 or 201), the chip 114 will not come out of reset or will not continue with its operations, depending on the security rules of the chip 114.

In the past, this RSA key signing and authentication process was held by the Conditional Access (CA) vendor 108B, which could block the broadcaster or service provider 102 from performing downloads to the fielded CE device 112 simply by not signing the code. If a broadcaster or service provider 102 wanted to change CA vendors 108B and did not get the ability to sign the code from the originating CA vendor 108B, then the only option available to the broadcaster or service provider 102 would be to change out the in field CE device 112 with one that it did have the proper download capability. This is a prohibitively expensive proposition for most broadcaster or service provider 102, which prevents them from running their system as they wish.

In this proposed infrastructure, the root public RSA key 200 is extended by storing the CA vendor public RSA key in flash as shown in 216. In this case the CA vendor public RSA key is either held by the broadcaster/service provider 102, or by a trusted third party that acts as an escrow entity. This allows the broadcaster or service provider 102 wide latitude in operating its system if it wishes to either change out Conditional Access 108B providers or to use multiple Conditional Access systems in the field.

This infield CA vendor 108B replacement scheme enabled by the security provider 106 for its third party customers (i.e. service providers 102, CE source 108, and/or CA vendors 108B) utilizes a combination of the security provider 106 black box 116 programmed data and the security provider 106 assigned keys given to the third party customer. Keys and programmed values that enable switching CA vendors include the security provider 106 ROM RSA key 200, Product Provisioning Key (PPK) 453, the Customer Global Key (CGK) 402, third party customer RSA key 201 signed by the security provider's 106 private RSA key, the Customer Product Differentiator (CPD) 202, and one or more Secret Value (SV) keys 451.

Each chip 114 contains a unique public identifier (the PID) 600 and a private symmetric provisioning key (the Product Provisioning Key (PPK) 453). The PID 600 can be freely shared with any third party while the PPK 453 is kept private by the security provider 106 and is never released to any third party and/or Consumer Electronic (CE) Source 108. The JTAG password unlocks access to debug information and is only provided if the CE device 112 experiences an in field failure.

The security provider 106 black box 116 programs a series of Secret Values (SVs) 451 that are allocated to the individual CE source 112 and/or CA vendors 108B as the CE source 108 or CA vendor 108B requires as a part of its conditional access system to secure content distribution. If multiple SVs 451 are programmed by the service provider 102 via the security provider 106 black box 116 and distributed to the field, the service provider may later elect to provide one or more of these SVs to an individual CA vendor 108B when the CE device 112 is first used in the field or the service provider 102 can chose to save one or more SVs 451 for a subsequent CA vendor 108B switch for the fielded CE device at a later time.

These SV values 451 can both be provided by the security provider 106, i.e. 2 or more keys, and held in escrow or given to the broadcaster or service provider 102 to hold. Another option open to the broadcaster or service provider 102 is for one of the SV values 451 to be provided by the security provider 106 and the others provided by an external key source or some other CA vendor 108B.

This allows for the broadcaster or service provider 102 to have multiple CA vendors 108B operating in the field at the same time using one STB. This can be done so that the broadcaster or service provider 102 can segregate their markets by broadcast methodology (i.e. Cable, Satellite distribution, IPTV, etc.), region (i.e. different areas of a particular City or Country, or Geographic Location such as the Asia-Pacific market), or content package (High Definition Programming, Sports or Premium content) or any other market segmentation as market forces dictate.

For each CA vendor 108B, there is typically some type of code resident in the CE device 112, such as a Security Kernel, which is used to pass keys, perform certain housekeeping functions, etc. as deemed necessary by that vendor. Given that the broadcaster or service provider 102 has control over the in field download via the public RSA root key 201, it is a simple matter to update these Security Kernels in the field.

If the broadcaster or service provider 102 knows in advance that one or more CA vendors 108B may be operating on their network, the Security Kernels could be integrated into the "Golden Image" of the CE device 112 code at the manufacturing line, thus eliminating the need to do an in field download.

The broadcaster or service provider 102 would then be able to use the appropriate CAS infrastructure by utilizing the specific SV 451 and other associated keys for that vendor. Again, this type of flexibility is unprecedented in the Pay TV industry and is only possible utilizing the security provider 106 black box 116 programmed data and the security provider 106 assigned keys given to the third party customer, (i.e. service providers 102, CE source 108, and/or CA vendors 108B).

Switching CA Vendors for Fielded CE Devices

The keys and programming infrastructure found in the chip 114 as provided by an independent security provider 106 enables the fielded Consumer Electronic (CE) device 112 to change conditional access (CA) providers 108B, thus giving the service provider 102 or broadcaster more flexibility in managing their business. This can result in saving the service provider 102 a significant capital investment by using the provided security architecture (including the chip 114 and CE device 112) and downloading a new software containing an alternate CA vendor 108B application without having to replace fielded CE devices 112.

A service provider 102 or broadcaster can switch CA vendors 108B in a legacy conditional access system without swapping fielded CE devices 112 using the method specified herein. This in-field CA vendor 108B replacement scheme enabled by the security provider 106 for its third party customers utilizes a combination of black box 116 programmed data and security provider 106 assigned keys given to the third party customer (i.e. service providers 102, CE source 108, and/or CA vendors 108B). Keys and programmed values that enable switching CA vendors 108B include the security provider 106 ROM RSA key 200, PPK 543, CGK 402, third party customer RSA key 201 signed by the security provider's private RSA key $Kpr_{SP}$ (item 210), CPD 202, and one or more SV keys 451.

The foregoing description of describes a system boot code can be securely installed, verified, and executed in the CE device 112 and wherein data (D) used for conditional access can be securely provided to the CE device 112 for use in the conditional access system. The same procedures can be used to either provide additional conditional access functionality (e.g. to support a conditional access system provided by another CA vendor 108B) or to revoke the conditional access functionality of a CA vendor 108B and substitute that of another CA vendor 108B. Adding additional functionality to support another CA vendor 108B can be accomplished by the storage of additional security values, while revoking conditional access functionality of one CA vendor 108B to substitute another can be accomplished by replacing previously installed security values with the security values for the new CA vendor 108B.

For example, a generic bootloader 706 and/or SOC security driver can be installed in the flash memory of the System On a Chip (SOC) 114 using the procedures shown in FIG. 2 and FIG. 3 instead of the CE source 108 specific or secondary boot loader 710. This generic bootloader 706 and/or SOC security driver is capable of accepting a new customer flash application image for the CE device 112 and can authenticate a third party public RSA key 201 associated with the new CA vendor 108B stored in the new CE device 112 flash image as shown in blocks 302-312 of FIG. 3.

The new CE device 112 application flash image includes:

A new third party RSA key (different from the previous third party RSA key 201 of FIG. 2), a new CPD 202 and a new $E_{PPK}[CGK]$ 459;

New customer flash conditional access application code 316 from the same or a new CA vendor 108B with its own content protection scheme;

An optional new CE device 112 application that potentially uses new conditional access application code to implement the conditional access system; and The security provider 106 defined code download and verification module will be included in the deployed software image.

When the CE device 112 reboots after the successful download, the new CE device application flash image is authenticated as shown in FIG. 3 with the new signed third party RSA key as shown in 310, new CPD 202, and new CA vendor 108B application, thereby, enabling the new CA vendor 108B application to take control of the CE device 112 and provide content protection services for the service provider 102.

Figure 7:
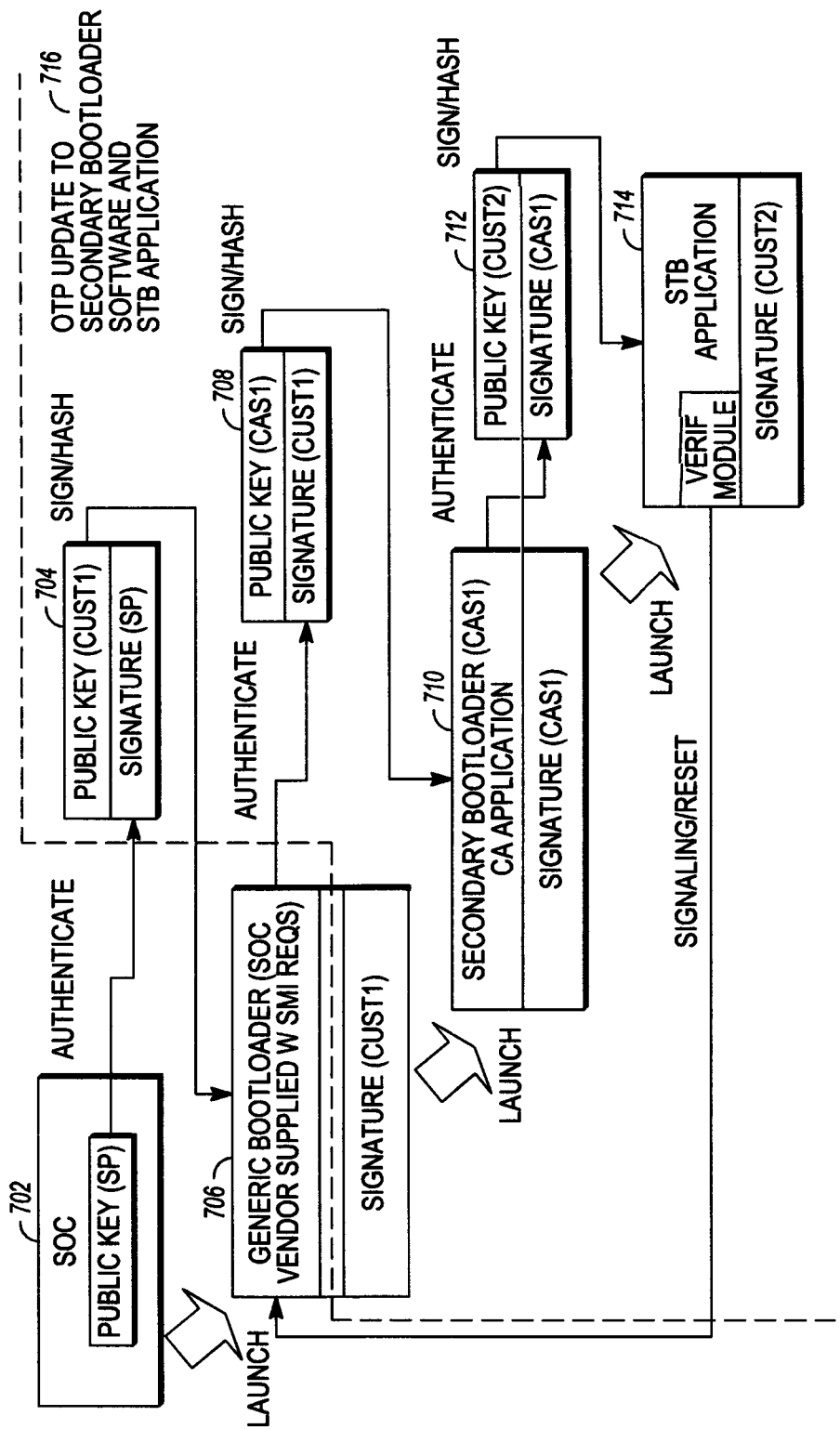
FIG. 7 illustrates the boot process, image signing and RSA public key authentication for over the air updates.

FIG. 7 shows a bootloader cascade beginning with the generic bootloader 706 authorizing the secondary bootloader 710 supplied by a CAS provider that in turn authorizes a STB application. The generic bootloader 706 is generally not replaced in the field. This bootloader 706 verifies Customer RSA key 201, i.e. Cust1 as shown in 708. The generic bootloader 706 does not contain the CAS vendor's 108B public RSA key 201. The generic bootloader 706 needs to be able to point to a new Over-the-Air (OTA) image 716 provided by the CAS vendor and load this image if the new image passes RSA Signature verification from FIG. 3. Subsequent STB reboots will load the new CAS OTA image 716, which may contain a revised secondary bootloader 710.

A download verification module resident in the STB Application monitors and guides the download process shown in 714. The code needed to download and authenticate the new CE Device 112 image is controlled by the security provider 106 and the broadcaster/service provider 102. The download verification module shown in 714 must be incorporated into the STB code image 716 to accept updates, validate updated image and re-launch the STB application. The download verification module shown in 714 assembles data segments of the encrypted image for the OTA update 716, verifies data integrity and assists generic bootloader 706 in validating the signature 310. Following validation of the signature 310, the image 716 is decrypted and made ready for re-launching the updated CE Device 112 image.

Table 1 lists the data used by the CE Source 108 and/or CA vendor 108B in their typical operation in providing a secure content distribution system for their service provider 102.

TABLE 1

Typical keys and data fields used in providing a secure content distribution system

| Key and/or Security Field Name | Resident in | Who programs |
| --- | --- | --- |
| SP Public RSA ROM/OTP key (from 210) | ROM/OTP | SP 102 or Chip Mfg. 104 |
| Customer Public RSA key (Cust Pub RSA Key) 201 | Flash | CE Source 106 in field |
| Customer Product Differentiator (CPD) 202 | OTP | CE Source 106 in field |
| Hash of Customer Public RSA & CPD (Hash) | Flash | CE Source 106 in field |
| Signed Hash of Customer RSA key and Customer Product Differentiator (Signed Hash) 210 | Flash | CE Source 108 in field |
| Customer signature over signed code (Cust Sig) 218 | Flash | CE Source 108 in field |
| One or more Secret Value (SV) Key(s) 451 | OTP | SP 102 by black box 116 or via SV insertion |
| Encrypted Product Provisioning Key ($E_{SV}[PPK]$) 455 | OTP | SP 102 by black box 116 |
| Encrypted Customer Global Key ($E_{PPK}[CGK]$) 459 | Flash | CE Source 108 in field |
| Secret Value 2 (SV2) Key 451 | OTP | CE Source 108 in field |
| Product ID (PID) 600 | OTP | SP 102 by black box 116 |
| JTAG unlock key | OTP | SP 102 by black box 116 |

Table 2 shows what keys and data fields in a particular CE device 112 are fixed (do not change) after a new software image containing an alternate conditional access vendor application has been downloaded and authenticated by the chip 114.

TABLE 2

Fixed key and data fields when accepting a new software image for an alternate conditional access vendor application
Fixed Keys/Security Fields for all downloaded images used in the CE Device 112

SP Public RSA key 200 (stored in ROM or OTP)
SV, $SV_{CA2}$, $SV_{CA3}$, $SV_{CA4}$, . . .

TABLE 2-continued

Fixed key and data fields when accepting a new software image
for an alternate conditional access vendor application
Fixed Keys/Security Fields for all downloaded
images used in the CE Device 112

(programmed by black box) 451
$E_{SV}$[PPK] 455
PID 600
JTAG

The PID 600 is a public identifier and can be freely shared with any third party. The PPK 453 is kept private to the security provider 106 and is never released to any third party and/or CE Source 108 (an encrypted version of the $E_{SV}$ [PPK] 455 is stored in the chip 114, via the black box 116 as is the secret value (SV) 451 needed to decrypt the $E_{SV}$[PPK] 455). The JTAG value is only provided if the CE device 112 experiences an in field failure. Table 2 also shows different values of the SV key 451. The first value SV 451 is the value programmed by the security provider 106 via the black box 116 and is allocated to the individual CE source 108 and/or CA vendors 108B as the CE source 108 or CA vendor 108B requires as a part of its conditional access system to secure content distribution. $SV_{CA2}$ is distinguished from SV2 451, which can be optionally programmed by the black box 116). Hence, if multiple SVs 451 are programmed by the service provider 102 via the black box 116 and distributed to the field, the service provider 102 may later elect to provide one or more of these SVs 451 (e.g. SV) to an individual CA vendor 108B when the CE device 112 is first used in the field or the service provider 102 can chose to save one or more SVs 451 ($SV_{CA2}$, $SV_{CA3}$, $SV_{CA4}$ ...) for a subsequent CA vendor 108B switch for the fielded CE device 112 at a later time.

The downloaded STB image contains the switchable keys from Table 3, i.e. the initial image loaded in the STB flash contains CA Vendor key set 0 as defined below:
Cust Pub RSA Key0
Hash0
Signed Hash0
Cust Sig0
$E_{PPK}$[CGK0]

CA switch means that the new STB flash for the new STB application contains an image that has values for CA Vendor key set 1. The Code Signing verification routine needs to reference these fields from the STB flash image.

Table 3 shows the new key and data fields that utilized when a new CE device image implements a switch from one CA vendor 108B to another CA vendor 108B.

TABLE 3

New Key and Data Fields Utilized in a CE Device
After a Switch to a Different CA Vendor 108B
or Different Conditional Access System

| Keys/Security Fields contained in the initial image loaded into the CE Device at Manufacturing | Downloadable Keys/Security Fields modified in first CA provider switch image delivered to the fielded CE Device | Downloadable Keys/Security Fields modified in second CA provider switch image delivered to the fielded CE Device | Downloadable Keys/Security Fields modified in third CA provider switch image delivered to the fielded CE Device |
|---|---|---|---|
| SV1 | SV2 | SV3 | SV4 |
| Cust Pub RSA Key0 (201) | Cust Pub RSA Key1 (201) | Cust Pub RSA Key2 (201) | Cust Pub RSA Key3 (201) |
| CPD0 (202) | CPD1 (202) | CPD2 (202) | CPD3 (202) |
| Hash0 | Hash1 | Hash2 | Hash3 |
| Signed Hash0 (210) | Signed Hash1 (210) | Signed Hash2 (210) | Signed Hash3 (210) |
| Cust Sig0 (218) | Cust Sig1 (218) | Cust Sig2 (218) | Cust Sig3 (218) |
| $E_{PPK}$[CGK0] (459) | $E_{PPK}$[CGK1] (459) | $E_{PPK}$[CGK2] (459) | $E_{PPK}$[CGK3] (459) |

Each CA vendor 108B switch results in the installation and use of a new Customer Public RSA key 201 (i.e. Cust Pub RSA Key1, Cust Pub RSA Key2, Cust Pub RSA Key3 in the Table 3). The security provider 106 assigns each new CA vendor 108B a unique CPD 202 (i.e. CPD1, CPD2, CPD3 in Table 3). The security provider 106 hashes the Customer Public RSA key 201 and CPD 202 producing unique hash values and signs each new hash with the security providers 106 own Private key as requested by the service provider 112. (i.e. Signed Hash1, Signed Hash2, Signed Hash3 in Table 3). To optionally further increase security, the address location for the flash-based third-party public RSA key 201 and/or the CPD 202 can also be used fix input data for a given CE source 108 and incorporated into the signed hash block 210. The secret values (SVs) 451 programmed by the black box 116 during SOC manufacturing are allocated as determined by the service provider/broadcaster 102 or CE device 112 owner. In Table 3 a different SV value 451 is allocated to the CA vendor 108B after a switch is performed.

The security provider 106 also assigns a new CGK 456 and generates the $E_{PPK}$[CGK] 459 for each switch to a new CA vendor 108B or different conditional access system. Upon a successful download and a CE device 112 reboot, the new CE device 112 application flash image 716 is authenticated with the new signed Third Party RSA key 210, new CPD (202), and new CA vendor 108B application 716 as shown in FIG. 3. This enables the new CA vendor 108B application to take control of the CE device 112 and provide content protection services for the service provider 102 with the conditional access system new CA vendor 108B.

An existing CE vendor's 108B conditional access data can also be revoked. This is made possible by incorporating the CPD 202 into the signed hash 210 to enable the CE source 108 to revoke a previously assigned CE source 108 public RSA key 201. In this embodiment, the CE Source 108 provides a new public RSA key 201 to the security provider 106. The security provider 106 assigns a new CPD 202 to be used with the new public RSA key 201, with the new CPD 202 to be stored at the same address as the CPD 202 currently stored and used with the existing public RSA key 201. If the replaced CPD 202 was stored in OTP, then a few bits of the new CPD 202 may be changed so that the physical address of the CPD 202 does not change. The security provider 106 returns a new signed hash 210 for the new CE source public RSA key 201 and new CPD 202. The CE source 108 transmits a new software image 716 to the CE device 112 (for example, by wireless means). The previously signed CE source public RSA 201 key will no longer be successfully validated by the security provider's signed hash 210 since the signed hash uses old CPD 202 value, which will no longer pass the verification process in blocks 304-312 of FIG. 3 since the CPD 202 value has changed, thereby, revoking the signed hash and previous CE source public RSA key 201 in the CE Device 112. The previous CE source public RSA key 201 could be used once again if the security provider source provides another signed hash 210 using the old CE source public RSA key, old CPD value 202 with a new CPD address since the CPD value 202 at the old CPD address location has been changed.

TABLE 4

Provisioning for CA Co-Existence

| Keys/Security Fields allocated to CA Vendor 1 loaded into the CE Device at Manufacturing | Keys/Security Fields allocated to CA Vendor 2 loaded into the CE Device at Manufacturing |
|---|---|
| Cust Pub RSA Key0 201 | Cust Pub RSA Key0 201 |
| CPD0 202 | CPD0 202 |
| Hash0 | Hash0 |
| Signed Hash0 210 | Signed Hash0 210 |
| Cust Sig0 218 | Cust Sig0 218 |
| SV1 451 | SV2 451 |
| $E_{PPK}$[CGK1] 459 | $E_{PPK}$[CGK2] 459 |

Table 4 shows a provisioning example where two CA vendors 108B can coexist in the same CE device. A common Customer private RSA key signs the final CE Device binary image containing the production code 716. The CE Device 112 would verify the signature using the Cust Pub RSA Key0 shown in 708 contained in the image 716 loaded during CE Device manufacturing or sent over the air. In this case the Customer who holds/generated the code signing RSA key 201 would be the CE Device 112 owner who is responsible for the overall operation of the STB or CE Device and the Co-existence of both CA vendors 108B in the field. The CE device 112 owner would be responsible for receiving the final binary images from the two CA vendors 108B and making sure that the applications 716 perform properly together. Each CA vendor 108B maintains its own Secret Value key 451 (SV1 and SV2 respectively) programmed by the black box 116 during SOC manufacturing that protects content related items such as Control Words and subscription entitlements. Each CA vendor 108B also is provided with its own Customer Global Key (CGK1 and CGK2 respectively) that is used to protect sensitive code and CE Device data contained in the application code image 716. CA Co-Existence works in a single CE Device 112 because each CA vendor's 108B content protection mechanism is cryptographically protected and isolated against the other through the allocation of independent key sets (SV1/$E_{PPK}$[CGK1] and SV2/$E_{PPK}$[CGK2] respectively) programmed by the black box 116. The CA vendor 108B designs their unique content protection and distribution architecture based on these root keys resident in the CE device 112. Since the root key sets shown in Table 4 are unique and separate for each CA vendor 108B, encrypted subscription entitlements and control words can be delivered uniquely to the CE Device 112 without fear of them being manipulated or falsely created by the other CA vendor 108B.

Chip Ownership Validation Code for JTAG Unlock Value

In one embodiment, security provider 106 uses a key to protect a Joint Test Action Group (JTAG) port on the chip that is used to obtain access to higher security areas of the chip 114 (e.g. the chip's internal states). The value for this key can be programmed by the black box 116 during chip 114 manufacturing. In one embodiment, the key is a 128-bit JTAG key. The JTAG key should be a 128-bit value. Smaller values JTAG key lengths are acceptable if there is a delay function between successive password unlock attempts. For adequate security, the key length should be at least 64 bits in length. Access to the JTAG port is gained when the password is supplied. This key cannot be exported to software.

Figure 8A:
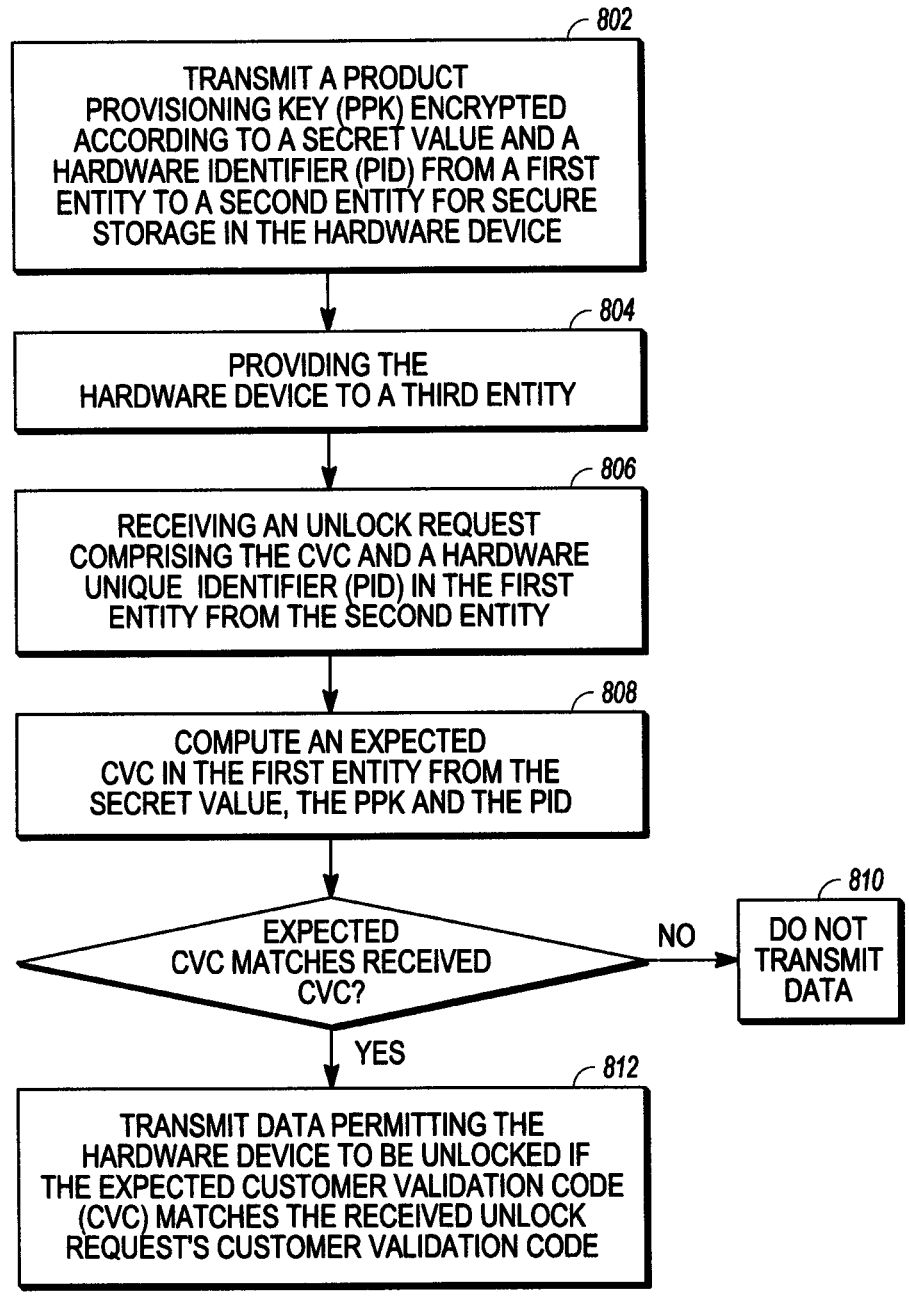
FIG. 8A is a diagram illustrating exemplary method steps that can be used to deliver the unlocking data.

FIG. 8A is a diagram presenting exemplary method steps that can be used as a method for a first entity (security provider 106) to deliver JTAG data to unlock the hardware device or chip 114 to a second entity (CE source 108). The chip 114 ownership by the second entity can be verified by the first entity if the second entity delivers an authentication value produced uniquely for each chip 114 as recoded during the manufacturing process. There are numerous methods that can be employed several of which are identified here.

FIG. 8A is a diagram illustrating exemplary method steps that can be used to deliver the unlocking data. As shown in block 802, a product provisioning key that has been encrypted with the chip 114 unique secret value SV 451 is transmitted from the first entity (the security provider 106) to the second entity (CE source 108) for secure storage in the chip 114. In one embodiment, this is accomplished via the Black box 116. A chip 114 PID 600 is also stored in the chip 114. The chip is provided to the CE Source, which installs the chip 114 in a CE device 112, and provides the CE device 112 with the chip 114 to third parties, such as end users, as shown in block 804. When the CE device wishes to unlock the hardware chip using JTAG or similar data, the CE source 108 and transmits, and the security provider 106 receives an unlock request, as shown in block 806. The unlock request comprises a customer validation code CVC 862 that is computed by the chip 114 and reproducible in the service provider 106 as well as chip 114 identifying information such as the PID 600. In one embodiment the CVC 862 computed in the hardware device from the encrypted product provisioning key $E_{SV}$[PPK] alone or with an additional seed. In other embodiments, the CVC 862 is also computed using the CE source 108 unique customer product differentiator (CPD 202), the chip 114 unique PID 600. The security provider 106 receives the unlock request having the CVC 862 and PID 600, and computes an expected CVC 862 from the secret value SV 451, and CPD/PID/PPK as required, as shown in block 808. The resulting expected CVC 862 is compared to the CVC 862 received from the CE source 108 in the unlock request, and if the two values match, the security provider 106 transmits the requested JTAG data to the CE Source 108. The CE Source can then use that data to unlock the chip 114 as desired.

Figure 8B:
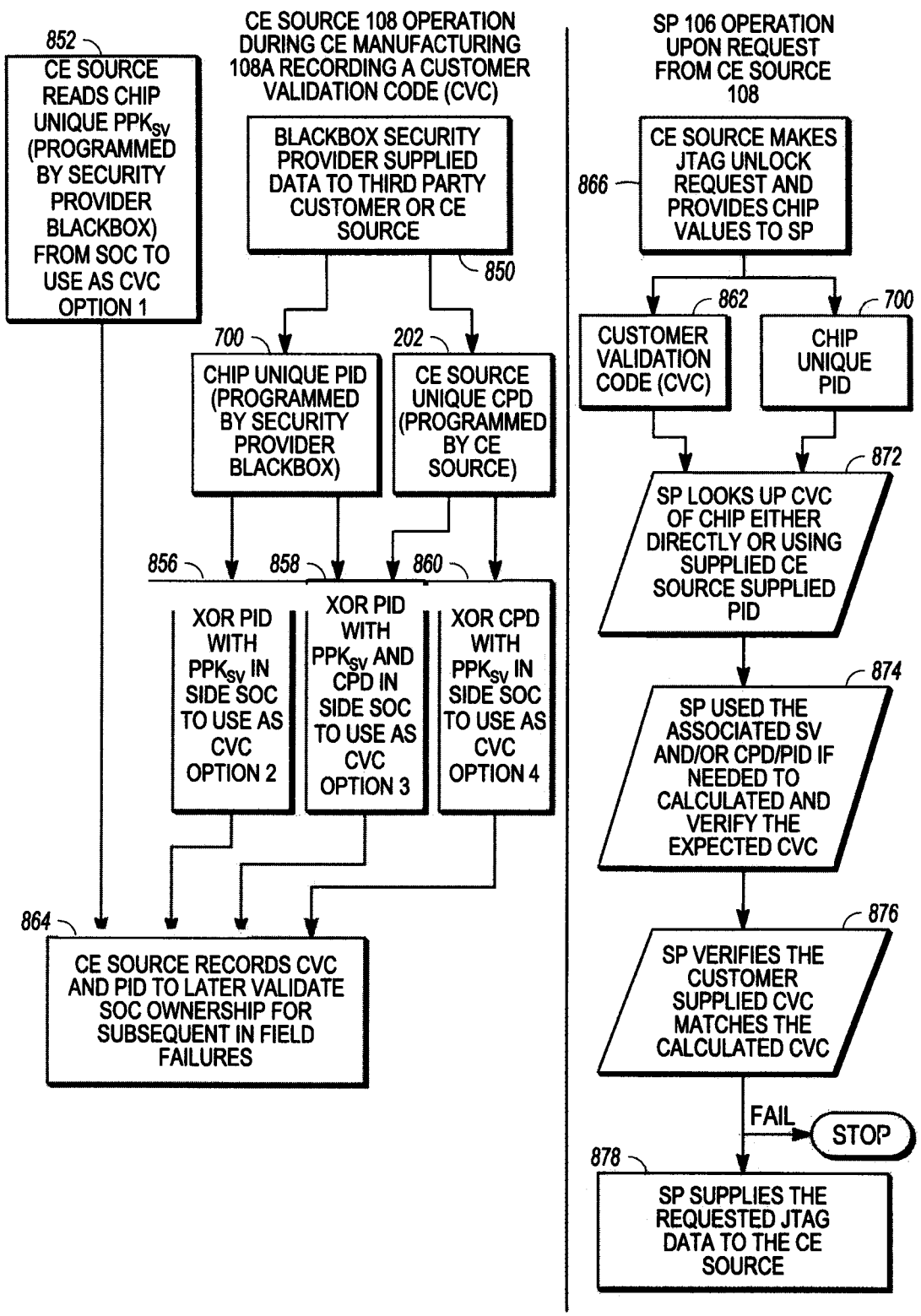
FIG. 8B illustrates a more specific example of the calculation and distribution of customer validation data by the CE source 108 after the chip 114 is manufactured.

FIG. 8B illustrates a more specific example of the calculation and distribution of customer validation data by the CE source 108 after the chip 114 is manufactured. The security provider 106 can implement a chip 114 ownership validation scheme that the CE source 108 or subscriber 110 can use to prove ownership of the CE device 112 before the security provider 106 releases a JTAG key to a requesting party. The CE source 108 participates in the generation of validation codes when the chip 114 is produced.

First, the consumer validation code (CVC 862) must be determined. This can be accomplished in a number of ways.

First, since the $E_{SV}$[PPK] 455 itself us unique, it can be used as the consumer validation code CVC 862, as shown in block 852.

Alternatively, the CVC 862 may computed inside the chip 114 from different combinations of $E_{SV}$[PPK], the chip PID 600, the unique customer product differentiator CPD 202, and a seed provided by the security provider 106. For example, the CVC 862 can be computed as an XOR of the PID 600 and $E_{SV}$[PPK] 455, as shown in block 856, as an XOR of the PID 600, the $E_{SV}$[PPK] 455, and the CPD 202, as shown in block 858, or an XOR of the CPD 202 and the $E_{SV}$[PPK] 455, as shown in block 860. All of these CVC 862 calculations are unique to the chip 114, SV 451 and globally unique PID 600, which could only be have been produced by a single chip 114 of the entire population of fielded chips 114. The CVC 862 (alternatively referred to hereinafter as the hash validation code) and optionally the PID 600 are recorded as shown in block 864 for later use in validating chip 114 or CE device 112 ownership.

The security provider 106 needs to be able to validate third party owner of the CE device before the JTAG unlock key can be release to a third party customer (e.g. CE source 108). The third party customer such as the CE source 108 transmits a JTAG unlock request 866 to the security provider 106. The request includes the CVC 862 862 and PID 600 for the chip 114 for which they require a JTAG unlock key. The security provider 106 looks up the SV 451 of the chip 114 using the PID 600 supplied by the third party customer. The security provider 106 uses the SV 451 and the PID/CPD to calculate the expected CVC 862, as shown in blocks 872 and 874. The service provider 106 verifies that the customer supplied CVC 862 matches the calculated expected CVC 862 to determine if they are the legitimate third party owner of the chip 114. If so, the JTAG data needed to unlock the chip 114 is transmitted to the third party customer, as shown in block 878.

Camouflaging A Standard Cell Based Integrated Circuit with Micro Circuits and Post Processing In standard-cell based ASIC design, the logic function of the chip is modeled and simulated in higher level hardware description languages such as "Very High Speed Integrated Circuit Hardware Description Language (VHDL) or VERILOG. It is then synthesized in a silicon compiler such as SYNOPSIS to generate a netlist using logic cells from a targeted standard-cell library (hereinafter referred to as "library cells). The netlist is then used in the backend physical design phase to locate (e.g. physically place) the library cells on the ASIC and route connections between those library cells (a process known as a "Place and Route" or PR of the library cells), thereby generating the full circuit layout of the ASIC for manufacturing. The PR process uses an automated computer program placing all logic cells in appropriate locations then connects them with metal and via layers according to the connection information in the netlist.

ASICs designed using this approach are vulnerable to reverse engineering (RE) attack. Reverse engineering of an ASIC involves the steps of functional identification of logic cells and the extraction of the cells' connections. With the latest optical and scanning electron microscopic techniques, an ASIC's logic circuits and its wiring network can easily extracted by RE.

In a standard PR process of an ASIC, some unused silicon areas (gaps) with no logic cells will usually occur during cell placement due to the requirement of effective routing of circuit connections from one cell to another. The presence of the unused silicon areas provides extra information, like the cell boundaries, to the reverse engineering (RE) process. RE usually starts the functional identification of logic cells near the unused silicon areas of the ASIC.

Figure 9:
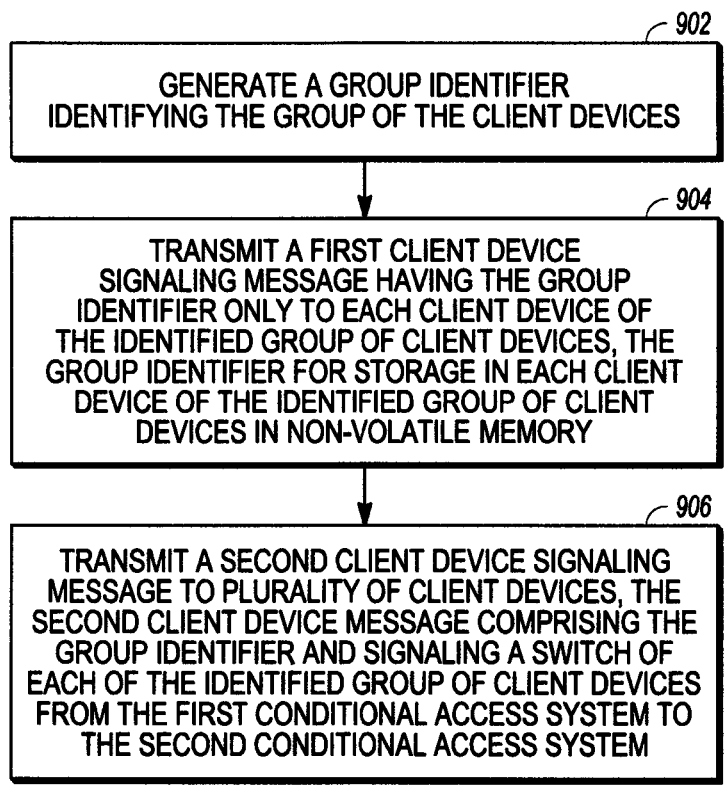
FIG. 9 is a diagram illustrating a portion of the ASIC design with unused silicon areas or gaps.

FIG. 9 is a diagram illustrating a portion of the ASIC design 900 with unused silicon areas or gaps 904A, 904B. A typical ASIC design includes an active layer, a poly layer, and a plurality of metal layers and vias to interconnect the layers. However, in the example shown in FIG. 9, only layers up to Metal 1 (active 1202, poly 1204, and metal 1 1206) are depicted so that unused areas can be clearly shown.

Figure 10:
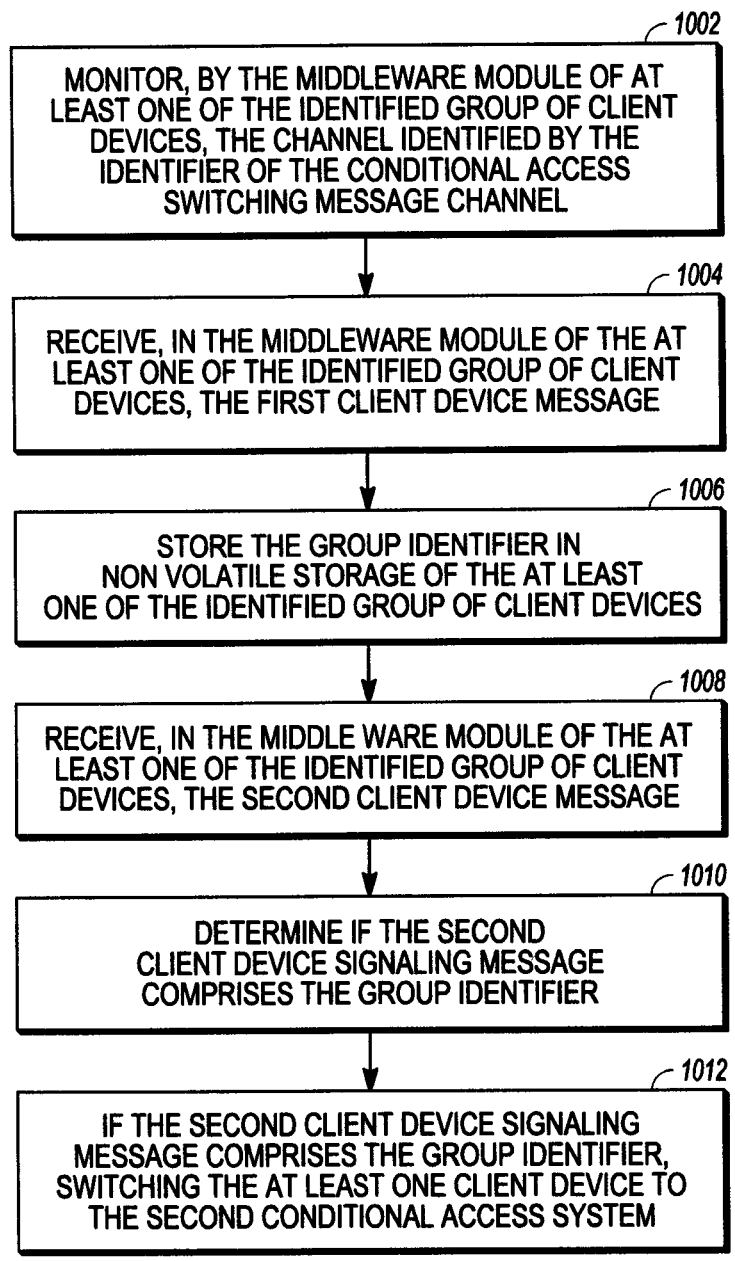
FIG. 10 is a diagram illustrating the same portion of the ASIC design as shown in FIG. 9, but also illustrating all the connecting metal layers.

FIG. 10 is a diagram illustrating the same portion of the ASIC design 900 as shown in FIG. 9, but also illustrating all the connecting metal layers.

Figure 11:
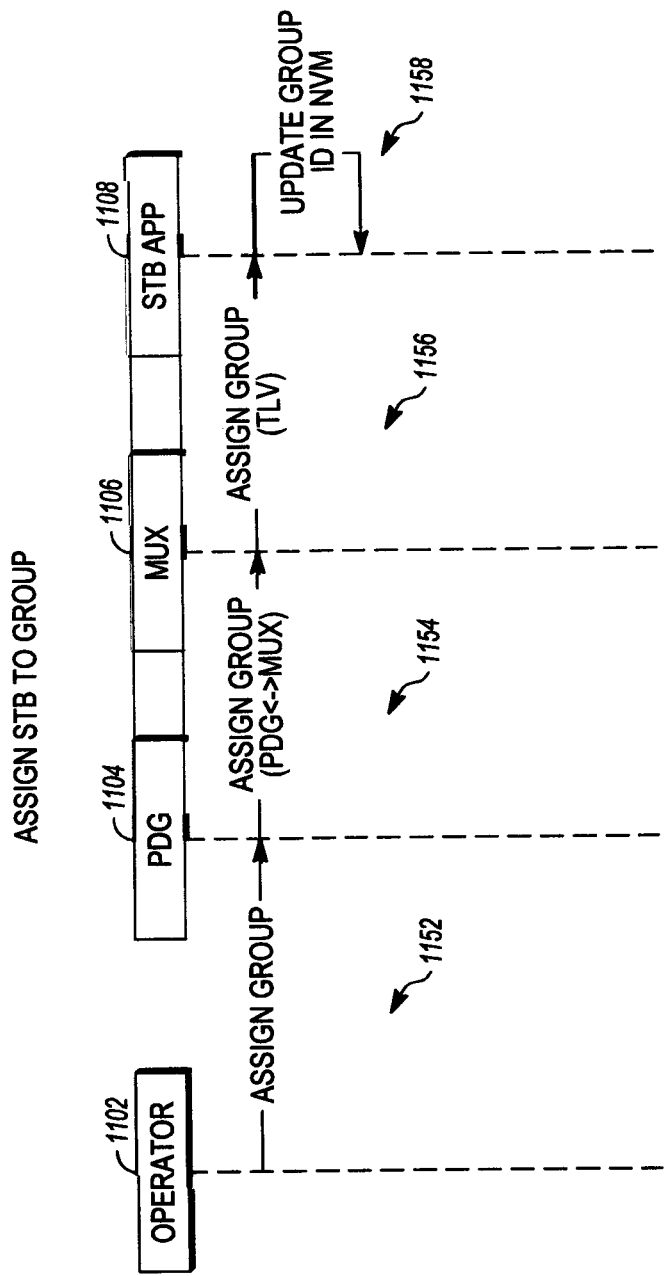
FIG. 11 is the scanning-electron-microscopic view of a portion of an actual ASIC after the removal of higher connecting metal layers, leaving only the first metal layer.
Figure 12:
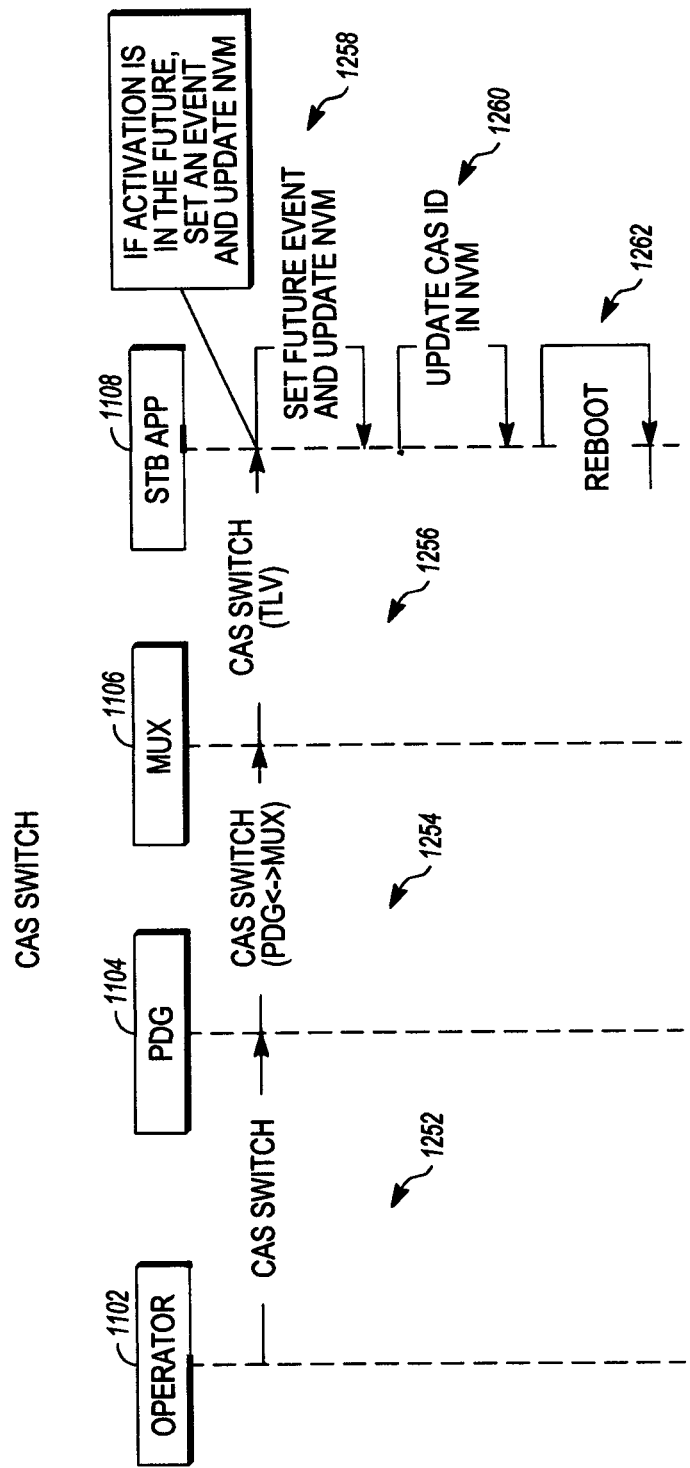
FIGS. 12A-12C are diagrams depicting how a filler cell physical layout design can be defined based on the physical layout design of a standard 10-input NAND gate from a typical standard cell library.
Figure 13:
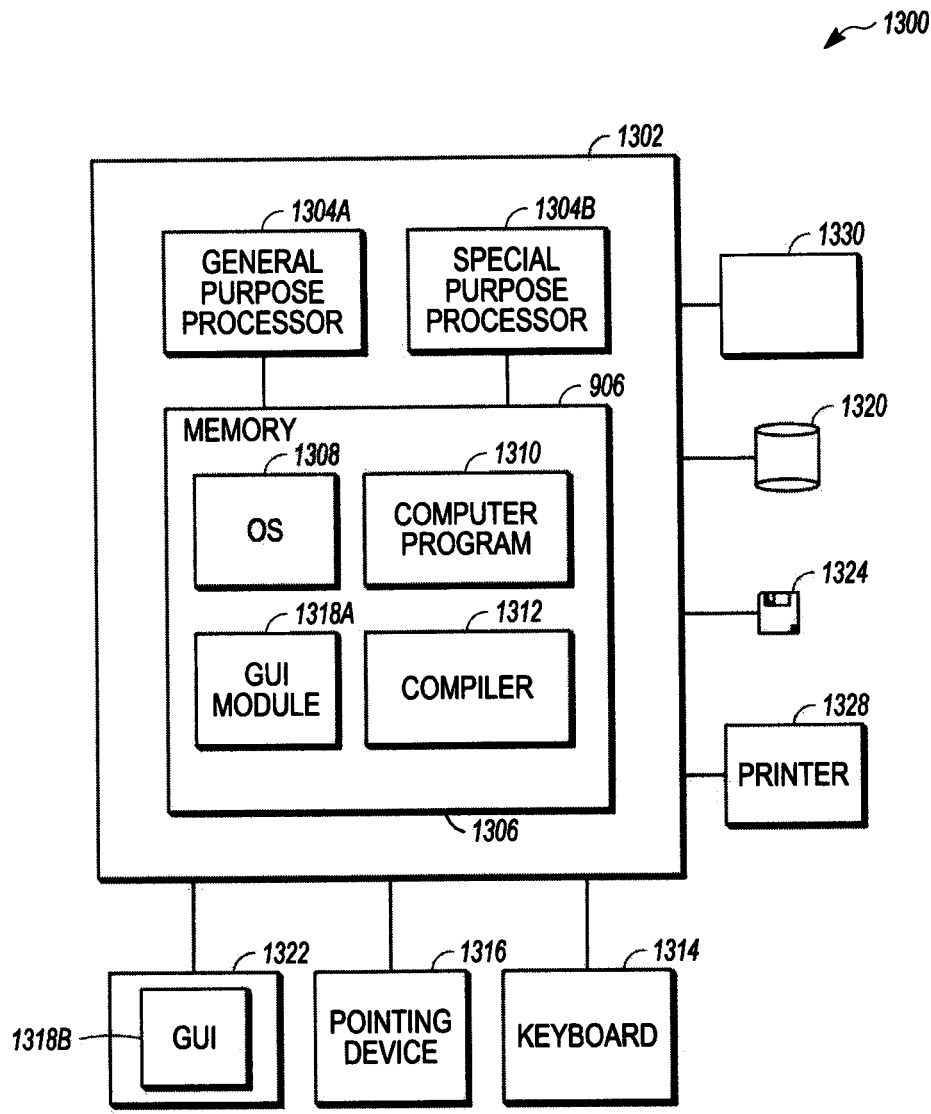
FIGS. 13A-13C are diagrams also depicting how a filler cell physical layout design can be defined based on the physical layout design of a standard 10-input NAND gate from a typical standard cell library.

FIG. 11 is the scanning-electron-microscopic view of a portion of an actual ASIC 1100 after the removal of higher connecting metals (Metal 1 and up), leaving only the first metal layer (Metal 1). Note that the ASIC 1100 includes gaps 904C-904E, functional logic cells 902C, 902D interconnected by circuit traces in the Metal 1 layer to perform one or more of the functions performed by the ASIC. Filling the unused silicon areas with layers in Metal 1, Contact, Poly and Active implant provides a camouflage effect to the ASIC and make RE more difficult.

As described above, U.S. Pat. No. 6,924,552, which is hereby incorporated by reference herein, discloses the filling of higher metal and via layers to protect ASIC from RE, using an algorithm that make the filled layers of metals and vias appear like real connectors. However, this filling algorithm is not applicable to layers like Metal 1, Contact, Poly and Active implants and most of the metals generated are not connected to any voltage source and thus are vulnerable to the 'voltage contrast' technique used in reverse engineering.

A more effective way of filling in the unused silicon spaces with layers of Metal 1, Contact, Poly and Active implants to create a strong camouflage effect to protect the ASIC 180 from reverse engineering is described below. This method also includes a process to connect a large number of metal traces generated by the metal fill process in U.S. Pat. No. 6,924,552 to voltage sources.

U.S. Pat. Nos. 7,049,667; 6,815,816; 6,774,413; 6,924,522 attempt to protect ASICs from RE by making either the logic cell identification or the connection extraction difficult. In contrast, the technique described below uses unused areas in an ASIC to create a camouflage effect to increase the RE effort of an ASIC by a factor of ten or more. One aspect of the technique is the design of the filler cells to fill some or all unused silicon areas in an ASIC.

This may be implemented by (1) using one or more filler cells that appear similar to or substantially the same to a reverse engineer, yet to provide either no logical functionality or a modified logical functionality (e.g. an "AND" logical cell has been altered to perform an "OR" logical function or no function at all); (2) using one or more filler cells that are unmodified from the library cells, but connecting them to provide no A logic cell (e.g. a cell implementing a logical function such as "OR," "AND," "NOR," or "NAND") is selected from the standard cell library, and a filler cell is designed. Importantly, the filler cell is designed so that the physical design layout (the size, location, and material composition of the different layers of the filler cell) is similar to or substantially the same as the physical design layout for a functional logical cell, but different in that the physical design layout is modified so that the filler cell provides no logical function or a modified logical function.

Typically, the reverse engineer analyzes the ASIC by "stripping" or "peeling" the chip. This involves grinding or etching away the encapsulating materials and each layer of the ASIC, photographing the layers with an electron microscope to discover the layout of and interconnection of the logic cells in the ASIC. The reverse engineer may also attach probes to different parts of the ASIC logic cells to measure voltages. Such attacks require a large investment in effort and special equipment that is typically only available to chip manufacturers. The process of stripping the chip can be both difficult and expensive.

As is well known, with sufficient time and with sufficient resources, virtually any device can be reverse engineered to create a new device that performs the same functionality without duplicating the original structure. However, if the costs of successfully stripping the chip, discovering the underlying functionality and producing counterfeit ASICs are such that the resulting counterfeit ASICs are commercially unviable (for example, because they are not sufficiently less expensive than a genuine ASIC or because the genuine ASIC functionality can be changed to render the counterfeit ASICs usable for a commercially insufficient time), then the camouflaging functionality effectively protects the producer of the genuine ASICs.

Filler cells having physical design layout that is similar to but different than the corresponding library cell may have significant changes (either in terms of the number physical design layout elements changed or in terms of the extent of the change(s)) from those of the library cells such that a reverse engineer can manually inspect and note the differences. However, if those changes, taken together, define camouflaging that renders reverse engineering by automated means commercially unviable. Hence, "similar to, but different from" in this context, refers to changes that render reverse engineering commercially unviable.

"Substantially the same" means that a small number (for example, as few as one but as many as several) physical layout elements of the library cell have been added, removed, or altered, to produce the filler cell, but a all other of the elements of the physical design layout of the filler cell remain the same.

Different examples of physical design layouts that are "similar to" or "substantially the same" are provided below. For example, small changes in specific layers can be made to alter the function of the filler cell to maintain a constant output at either '0' or '1' (equivalent to Vss or Vdd output) without regard to the input state.

FIGS. 12A-13C are diagrams depicting how a filler cell physical layout design can be defined based on the physical layout design of a standard 10-input NAND gate 182E from a typical standard cell library.

FIG. 12A is a diagram illustrating a physical design layout for a standard two-input NAND gate 1202E, and FIG. 13A is a diagram illustrating a schematic diagram for the physical design layout shown in FIG. 12A.

A standard 10-input NAND gate 182E comprises two parallel connected P devices 1302A, 1302B connected between the output (Z) 1216 and Vdd, and two series connected N devices 1304A, 1304B between the output (Z) and Vss, as shown in FIG. 13A.

Referring first to FIG. 12A, the physical design layout comprises a plurality of layers disposed over one another on a multilayer circuit board. The layers include an active layer 1202, a poly layer 1204, a contact layer 1205, a first metal layer (Metal 1) 1206 and a P+ implant (P-doped) layer 1208.

The P devices 1302A, 1302B are formed by the overlap of the Poly layer 1204, P+ implanted layer 1208 and active layer 1202 shown in FIGS. 12A-4C while the N devices are formed by the overlap of Poly layer 1204 on an N+ implanted active layer (the N+ active layer is formed by an active layer with no coverage of P+ implant layer.

FIGS. 12B and 12C are diagrams depicting exemplary physical design layouts for two possible filler cells 1230. FIG. 12B is a diagram depicting an exemplary physical design layout for a filler cell 1230A in which the output is always a logical zero, while FIG. 13B is a schematic diagram of the exemplary filler cell 1230A shown in FIG. 12B.

Note that the exemplary layer modifications of the 2-input NAND gate 1200 shown in FIG. 12B result in an output of logical one while retaining substantially the same physical layout design. The modifications from the physical design layout of the standard cell 1200 include layout changes in contact layer 1205 and active layer 1202 to make the output potential (Z) always equal to Vss (logical zero). The contact layer 1205 refers to contacts connecting the Metal 1 layer to the doped Active (N or P doped) layers or the Poly layer. Specifically, in FIG. 12B, contact 1210 is missing in the output connection to P-channel devices and an extra piece 1232 of N+ Active layer is added to short the output (Z) 1216 to Vss (logical zero). The result is a non-functioning logic circuit with its output always at '0' or Vss.

FIG. 12C is a diagram depicting an exemplary physical design layout for a filler cell 1230B in which the output is always a logical one, and FIG. 13C is a schematic diagram of the exemplary filler cell 1230B in which the output is always a logical one.

Note that the exemplary layer modifications of the 2-input NAND gate 1200 shown in FIG. 12C result in an output (Z) 1216 that is always equal to Vdd (logical one), while minimizing changes to the physical layout design, thus camouflaging the 10-input NAND gate 182E. Specifically, in FIG. 12C, the output (Z) 1216 of filler cell 1230 in FIG. 12C is shorted to Vdd through added contact 1236 and the P+ Implant region 1208. In order to have the output (Z) 1216 not influenced by its inputs (A, B), the active layer 1202 in FIG. 12C was also modified in the N+ Active region 1234 making the output (Z) 1216 isolated from the N devices. FIGS. 13A-13C are the schematics associated with the layout in FIGS. 12A-12C, respectively.

All filler cells 1230 are designed to deliver a constant output of either logical zero or logical one, independent of the logical values at their inputs (inputs A 1212 and B 1214 in FIGS. 12A-4C and 13A-5C). These filler cells 1230 perform no logic function but only serve as camouflage cells in the unused silicon areas 904. Hundreds of such filler cells 1230 can be designed by modifying logic cells 902 from a standard cell library with minor variations in different circuit layers to accommodate the effect of having a constant output of either a logical one or a zero but no logical function.

FIGS. 12B and 12C present only examples of for purposes of illustration. While the filler cell 1230 designs shown in FIGS. 12A and 12B may still be detectable using reverse engineering techniques, when taken in the aggregate with the other techniques described below, these filler cells 1230 can be used to sufficiently camouflage the ASIC to make RE many times more difficult. Other camouflage techniques like those described in U.S. Pat. Nos. 7,049,667; 6,815,816; 6,774,413; 6,924,522 (which are hereby incorporated by reference) for hiding connections or isolations can be used to enhance the camouflage effect of these filler cells 1230. Also, multiple variations of filler cells can be designed with reference to one library cell so to reduce the effect of a specific signature in certain layers of the filler cell design.

Since each filler cell 1230 is designed according to a logic cell 902 in the library, the physical size of the designed filler cell 1230 will be the same as the original reference logic cell 1200. However, different newly designed filler cells 1230 can have different sizes and thus be able to fill into different sized gaps 904. In ASIC design terminology, a routing track is a circuit trace that interconnects the logical cells 902. The size of a logic cell 902 and the gaps 904 or empty silicon space between logic cells 902 are typically counted in terms of the number of routing tracks, and the minimum size of the designed filler cell is one routing track. In other words, only one routing track will be able to route through this cell. Routing track size is the minimum width of the track plus the minimum space to the next track.

In a standard logic cell library, there is seldom any logic cell 902 with a width of only one routing track but gaps 904 in between logic cells 902 of an ASIC 1100 can be as small as one track. Special filler cells 1230 of one routing track width can be designed to fill in the minimum gap of one routing track space.

Figures 14A, 14B:
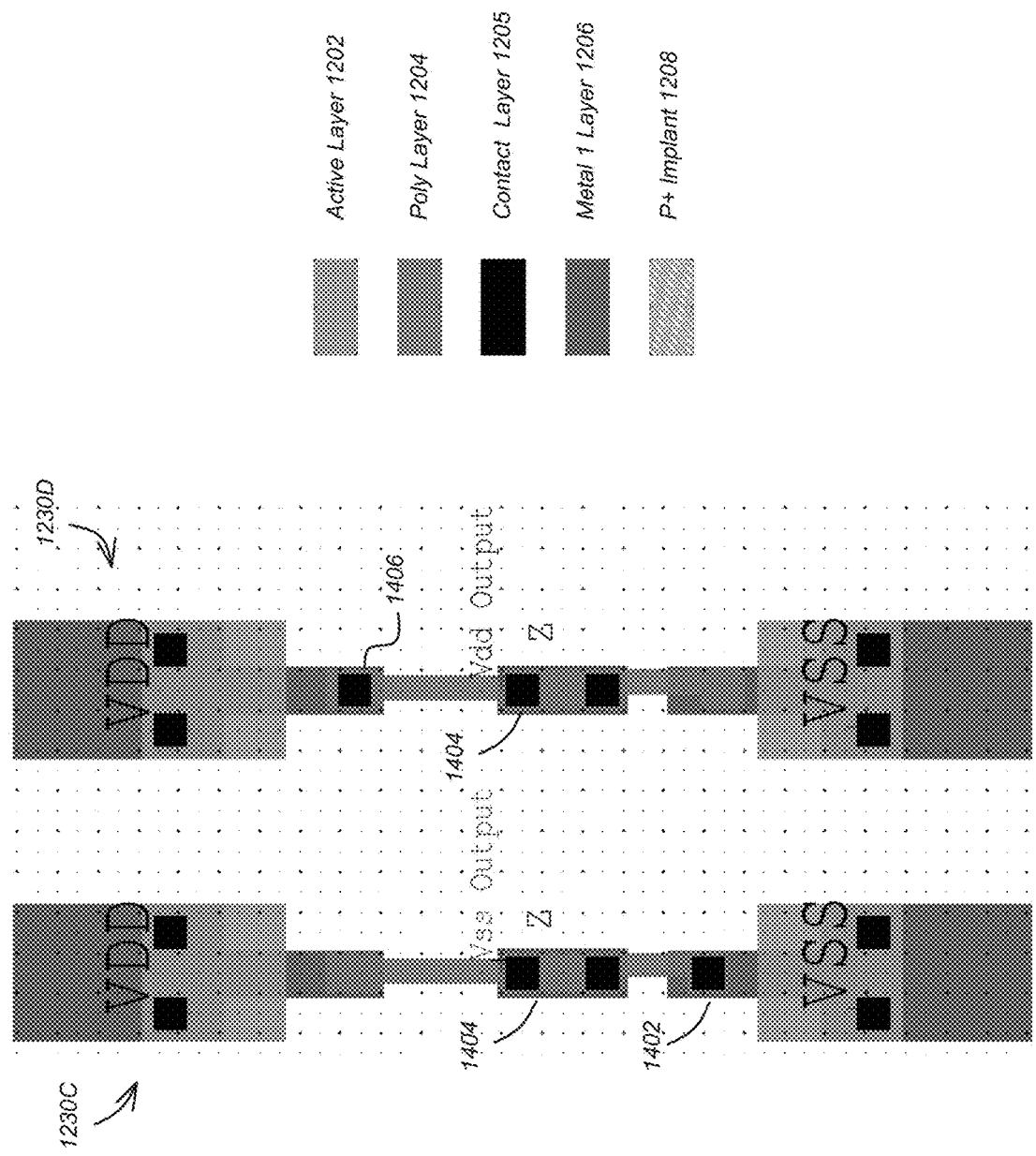
FIGS. 14A and 14B are diagrams depicting single track width filler cells.

FIGS. 14A and 14B are diagrams depicting single track width filler cells 1230C and 1230D. The filler cell 1230C depicted in FIG. 14A uses contact 1402 to short the output 1404 (Z) to the voltage Vss (logical zero), and the filler cell 1230D uses contact 1406 to short the output 1404 (Z) to voltage Vdd (logical one) through the poly layer 1204. The active layer 1202 is also present to increase the camouflage effect of these filler cells. Again, other camouflage techniques described in the references (e.g. U.S. Pat. Nos. 7,049,667; 6,815,816; 6,774,413; 6,924,522 etc.) can also be used to make the actual circuit connection of these filler cells difficult to be determined by reverse engineering.

Figure 15:
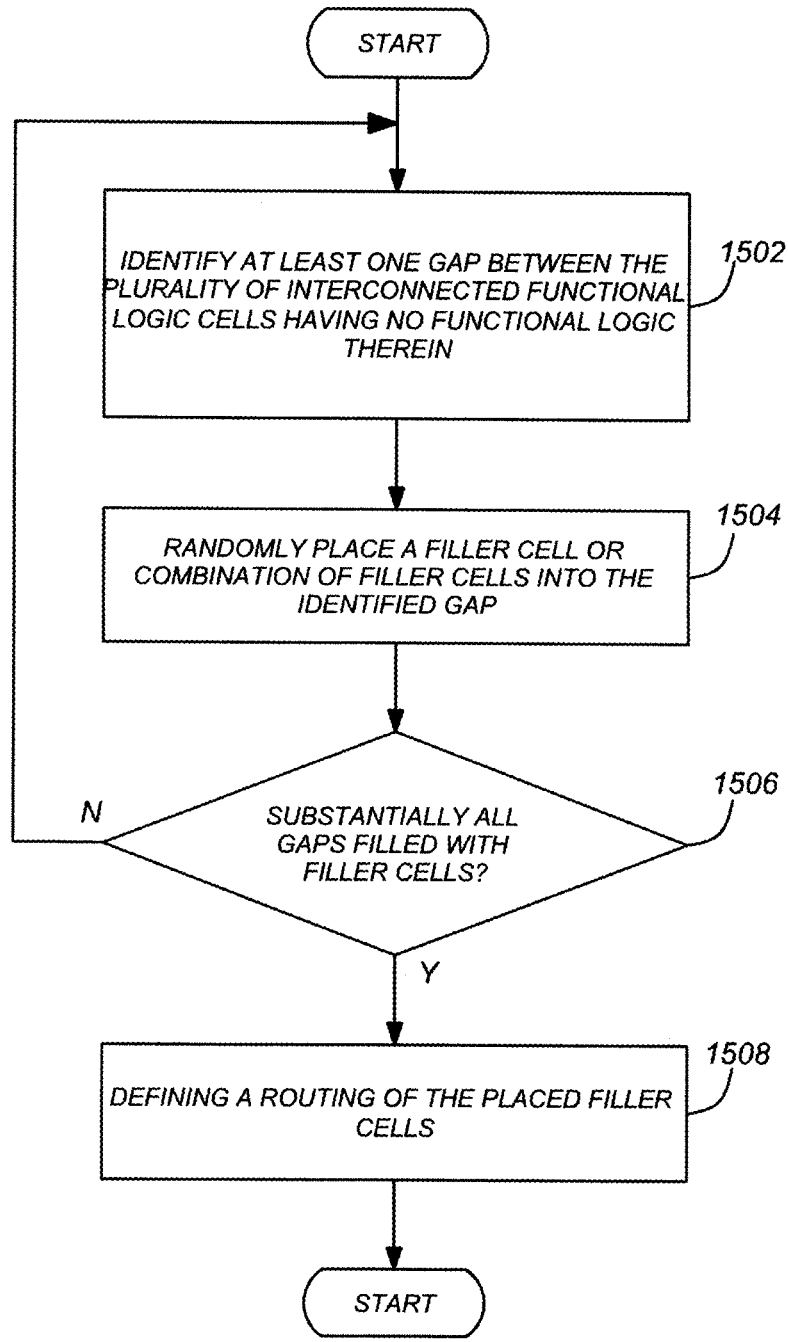
FIG. 15 is a flow chart illustrating representative method steps that can be used to practice one embodiment of the invention.

FIG. 15 is a flow chart illustrating representative method steps that can be used to practice one embodiment of the invention. In block 1502, at least one gap 904 is identified between a plurality of interconnected functional logic cells 902. Such gaps 184 have no functional logic within their boundaries. Next, a filler cell 1230 or combination of a plurality of filler cells 1230 are placed into the identified gap 904, as shown in block 1504. In one embodiment, the placement of filler cells 1230 is accomplished randomly. This randomness can be implemented by randomly selecting from different filler cell 1230 designs or different filler cell 1230 combinations. As shown in block 1506, the operations of block 1502 and 1504 are repeated until substantially all of the gaps 904 are filled with filler cells 1230. This can be accomplished by running a computer program for the random placement of one filler cell or a combination of filler cells into the unused silicon area of the post Place and Route standard cell portion of the ASIC.

Figure 16:
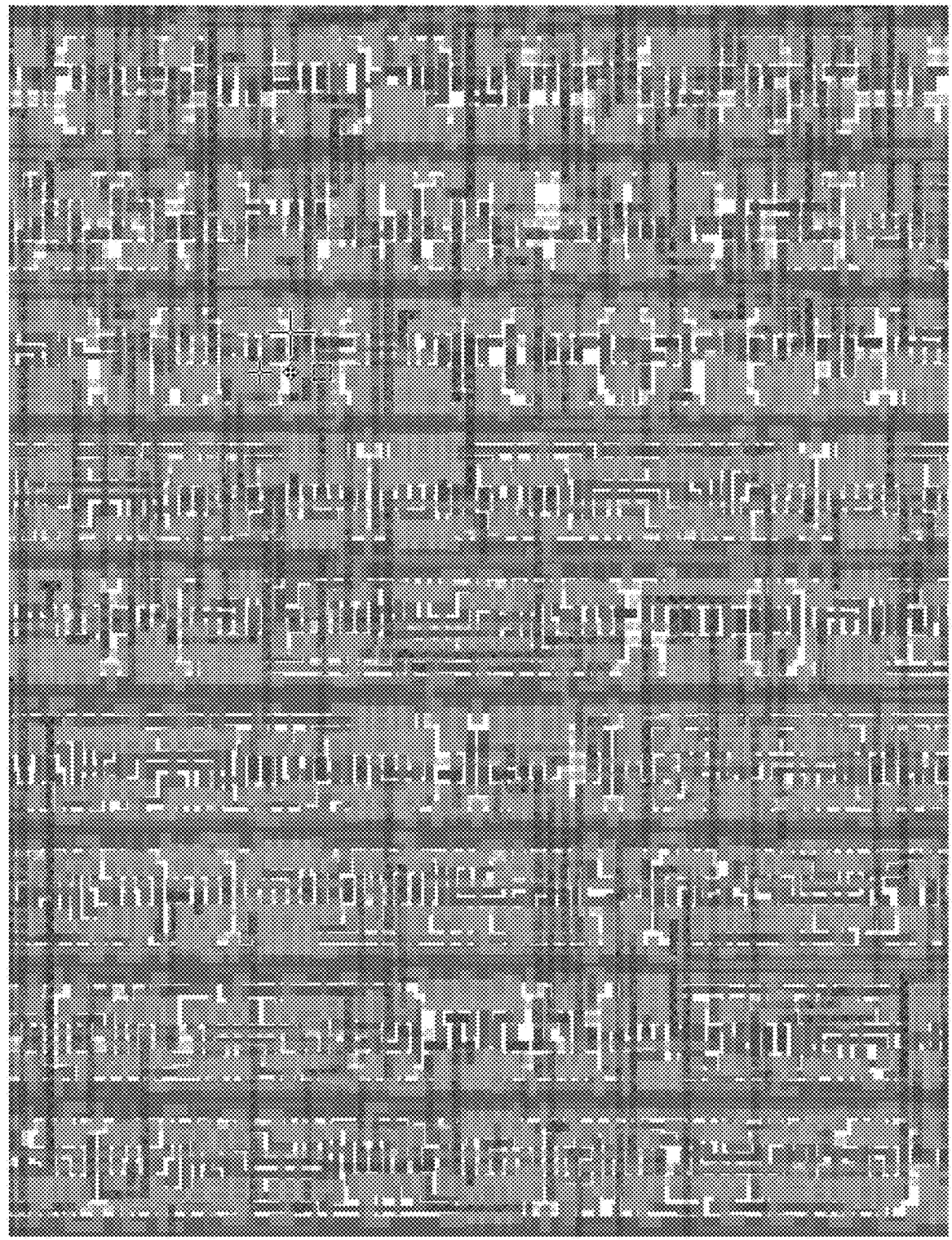
FIG. 16 is a diagram showing an exemplary ASIC after the completion of selected operations of FIG. 15.

FIG. 16 is a diagram showing an exemplary ASIC after the completion of the operations of blocks 1502-1506.

Figure 17:
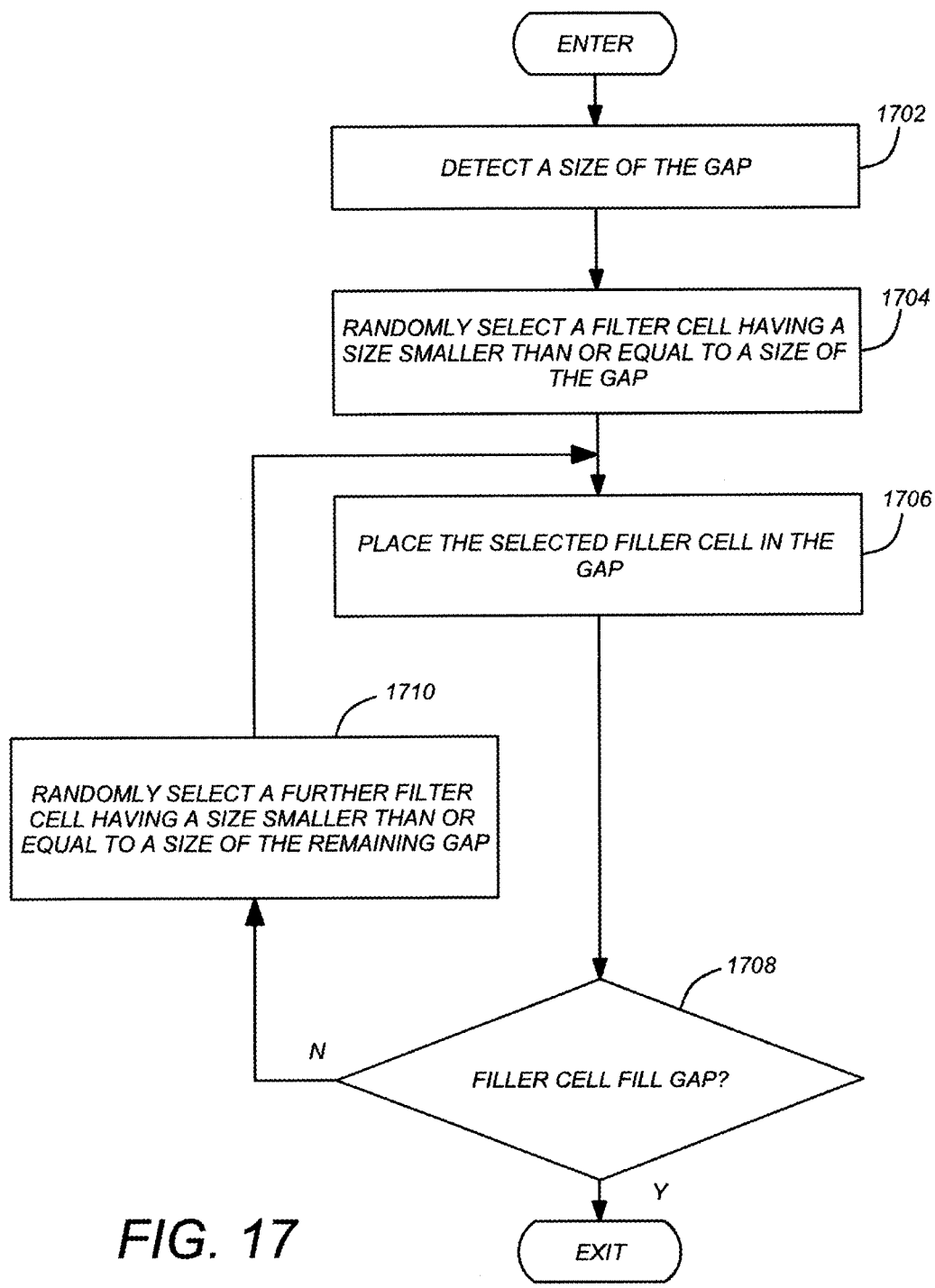
FIG. 17 is a diagram illustrating one embodiment of how filler cells or combinations of filler cells can be randomly placed into identified gaps.

FIG. 17 is a diagram illustrating one embodiment of how filler cells 1230 or combinations of filler cells 1230 can be randomly placed into identified gaps. As shown in FIGS. 9 and 10, the standard cell region of an ASIC is comprised of rows of placed logic cells with connecting conductive traces or wirings. After an ASIC design is finished, all the layer information of the design is stored in a graphical data system (GDS) file, ready to release for mask making. GDS is an industry accepted database file format for IC layout design. The GDS file describing the ASIC layout can be input to an algorithm or computer program and used to detect, in the standard cell region, each gap 904 (unused silicon area) in each row of logic cells, as shown in block 1702. It then randomly picks a filler cell 1230 from the newly designed filler cells 1230 with a size smaller than or equal to the size of the gap 904, and places it in that gap 904, as shown in blocks 1704-906. If the first randomly chosen filler cell 1230 does not fully fill the gap 904, then another filler cell 1230 with a size smaller than or equal to the remaining space is randomly selected and placed until the space is fully utilized, as shown in blocks 1708-1710.

In one embodiment, the filling program sequentially processes the ASIC layout from space to space and row to row until it finishes filling all the unused silicon areas in the standard cell portions of the die.

Returning to FIG. 15, a routing is defined for the placed filler cells 1230, as shown in block 1508.

Figure 18:
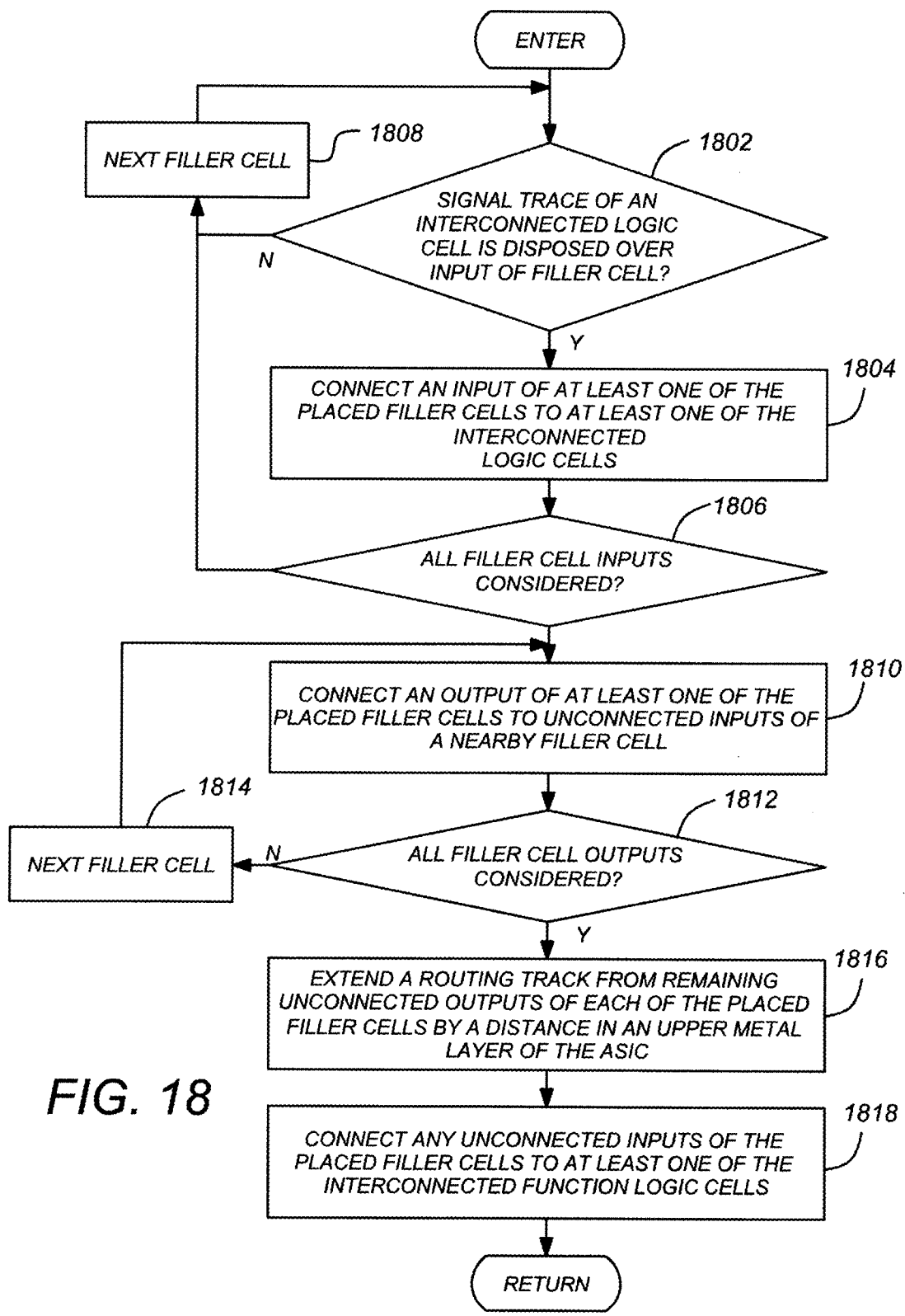
FIG. 18 is a diagram presenting exemplary operations that can be used to route the placed filler cells.

FIG. 18 is a diagram presenting exemplary operations that can be used to route the placed filler cells. The illustrated steps can be performed on a general or special purpose computer using interfaces standard to ASIC design programs.

The first routing connects the inputs of the filler cells to the existing ASIC network if those ASIC network signals go directly over the filler cell 1230 inputs in the Metal 1 layer. Standard logic cells 902 and also the filler cells 1230 are all designed such that inputs and outputs are in the metal 1 layer, making the higher metal layers available for routing between cells.

First, as shown in block 1802, the ASIC layout is examined to determine if a signal trace of an interconnected logic cell 902 is disposed over an input of a placed filler cell 1230. If not, the next filler cell 1230 is examined, as shown in block 1808. If a signal trace of an interconnected logic cell 902 is disposed over an input of a placed filler cell 1230, an input of at least one of the placed filler cells 1230 is connected to at least one of the interconnected logic cells 902, as shown in block 1804. This process is repeated until a desired number filler cell 1230 inputs have been considered, as shown in block 1806. In one embodiment, all filler cells 1230 inputs are connected to an interconnected logic cell 902 wherever possible.

Figure 19:
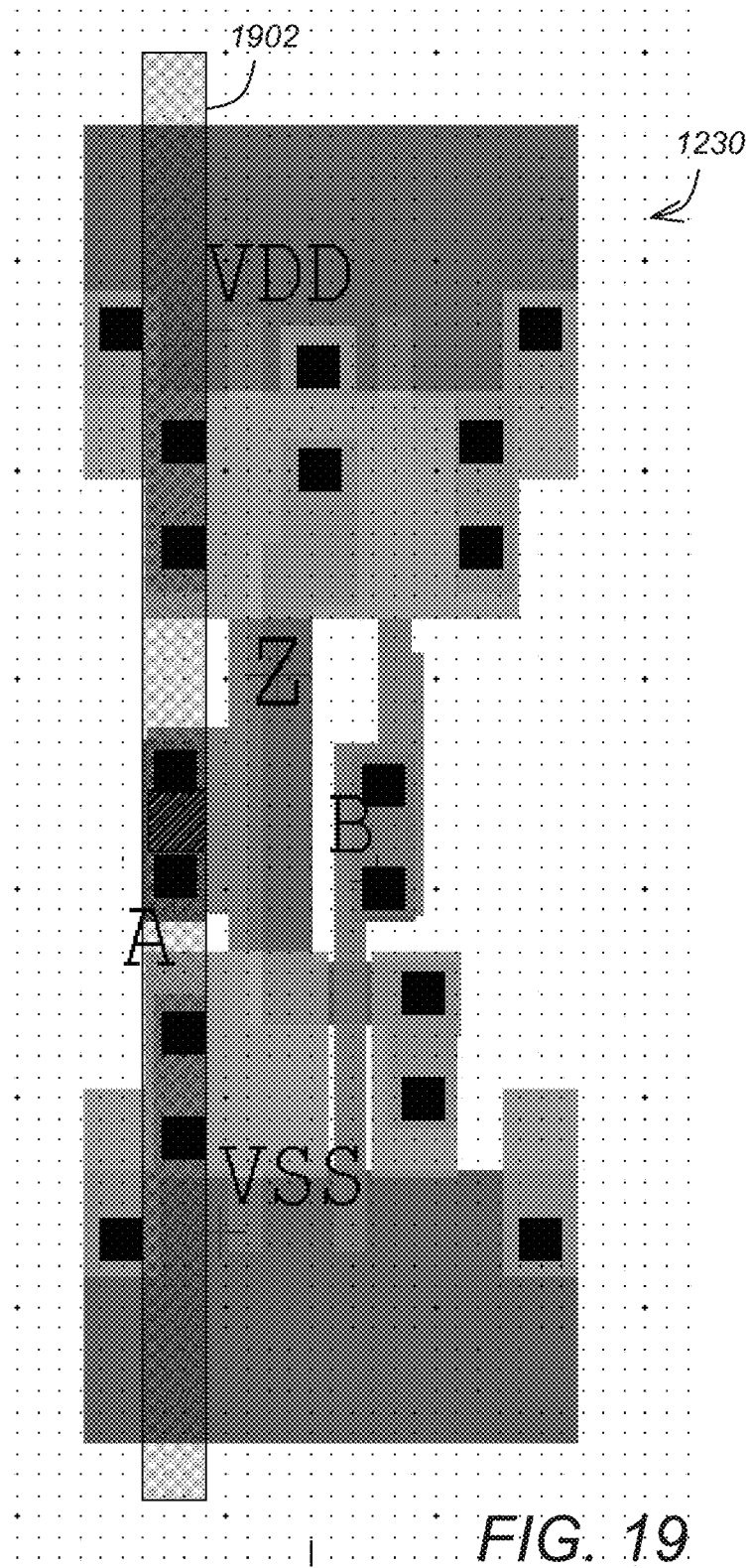
FIG. 19 is a diagram illustrating a signal wiring or trace in a metal 2 layer from the ASIC network running on top of the filler cell input A disposed in the metal 1 layer.

FIG. 19 is a diagram illustrating a signal wiring or trace 1902 in the metal 1 layer from the ASIC network running on top of the filler cell 1230 input A disposed in the metal 1 layer 1206. This condition is detected and a via is placed to connect the ASIC signal trace 1902 in the Metal 1 layer 282 to the filler cell 1230 input A in the Metal 1 layer 1206. The input of the filler cell 1230 is recognized by the special 'input layer' in the filler cell design. Once an input of a filler cell 1230 is connected, a routing program generates another identification layer to differentiate this filler cell 1230 input from other (currently uncommitted or unconnected) filler cell 1230 inputs. Since only the inputs of filler cells 1230 are connected to the ASIC signals (and not the outputs), these connections result in only a minor increase of the capacitive loading on those tapped ASIC signals, and they will not change the ASIC logic function.

Next, the outputs of the filler cells 1230 are connected (via signal traces) to nearby uncommitted inputs of other filler cells 1230, as shown in block 1810.

Figure 20:
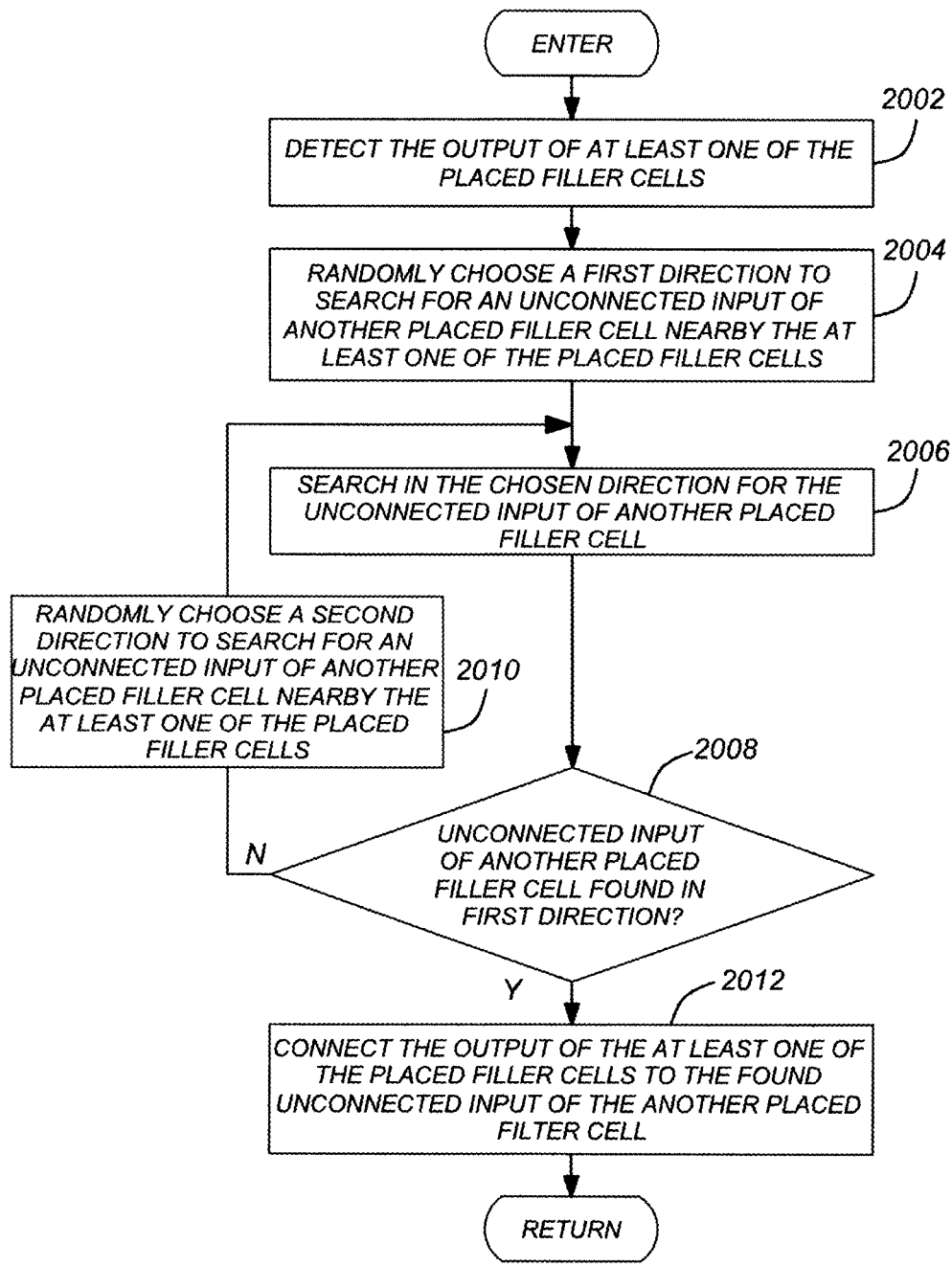
FIG. 20 is a flow chart illustrating exemplary method steps that can be used to connect filler cell outputs to nearby uncommitted inputs to other filler cells.

FIG. 20 is a flow chart illustrating exemplary method steps that can be used to connect filler cell 1230 outputs to nearby uncommitted inputs to other filler cells 1230. In block 2002, the presence of an output of a filler cell 1230 is detected by the recognition of the output identification layer in the filler cell 1230 design. Then, a direction is chosen (preferably randomly) to search for an unconnected input of another placed filler cell 1230, as shown in block 2004. In one embodiment, the direction is chosen as either left, right, up or down to start a search and the search is performed within a certain 'search dimension' in width and length, for the presence of any input of other filler cells 1230. A search is then performed in the chosen direction for an unconnected input of another placed filler cell 1230, as shown in block 2006.

If an unconnected input of another filler cell 1230 is identified, one or more layers of higher level metal layers and vias are used connect the output of the first identified filler cell 1230 to the input of the second identified filler cell 1230, as shown in block 2012. If the search does not find any other filler cell in one direction, it will start the search with another direction, which may also be chosen at random, a shown in blocks 2008 and 2010. At the same time, if an input of another filler cell 1230 is identified but the routing program can not make the connection between the identified output and input (for example, due to wiring congestion or too many traces already located in the area between the output and input), it will start the search in another direction.

Returning to FIG. 18, the operations of block 1810 (which are described in more detail in FIG. 20) are repeated until all of the filler cell 1230 outputs have been considered, as shown in blocks 1812 and 1814.

The 'search dimension' is a parameter controlling the area (length and width) of the search. If this dimension is too large, the time of each search may become excessively long, while a search dimension that is too small will result a high percentage of filler cell 1230 outputs not able to find any other filler cell 1230 input to make a connection. The value of the 'search dimension' can be optimized based on the size and routing trace congestion level of the ASIC.

In general, the 'search dimension' is defined in terms of the number of metal routing tracks in horizontal direction and the number of rows of logic cells in the vertical direction. Optimal 'search dimension' values can be between '1 row by 130 tracks' to '5 rows by 1300 tracks'.

Another parameter used in the second routing program is the 'number of inputs' to which an identified output will be connected. The 'number of inputs' parameter can also be a randomly chosen number for each identified filler cell 1230 output with a value between 1 and 6 for example. The 'number of inputs' parameter determines the maximum number of filler cell 1230 inputs for which an identified filler cell 1230 output is to be connected. This parameter value is also equivalent to the maximum number of input searches that will be performed for each identified filler cell 1230 output. For example, if the value is randomly picked at '2' for a specific filler cell 1230 output, this output will be connected to '2' or fewer inputs of other filler cells 1230 (some searches may end up with no connection due to wiring congestion). In this example, this portion of the routing process will stop after the second search-and-route process for this filler cell 1230 output.

In one embodiment, an attempt is made to connect the output of every placed filler cell 1230 to some input of other filler cells 1230. The identification of a filler cell 1230 output is through a special "identification" layer designed in the filler cell 1230. The identification layer is a special design layer that is defined to differentiate this filler cell from the other ASIC standard logic cells (when the presence of this layer is detected, the cell is a filler cell). The identification layer can be thought of as a layer that is "opaque" over the regions of filler cells and "transparent over regions of functional logic cells, but is not physically realized in the ASIC. To find a filler cell output, the identification layer can be examined in each row of cells of the ASIC standard cell region.

Figure 21A:
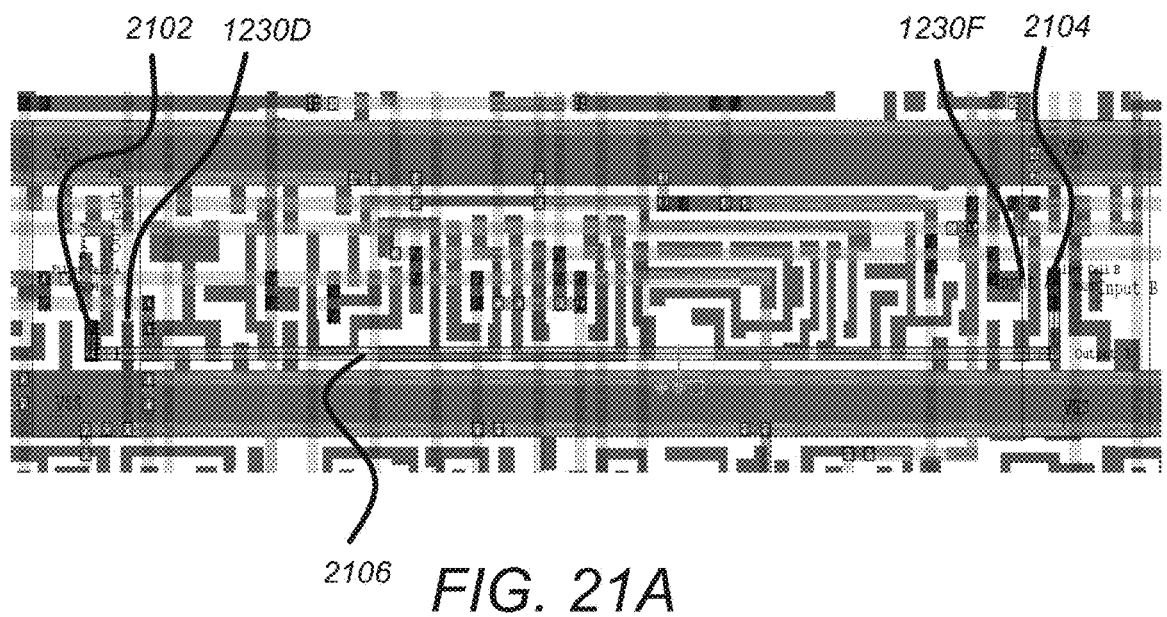
FIGS. 21A and 21B are diagrams illustrating a portion of an ASIC, showing an example of a trace routed by using described techniques.
Figure 21B:
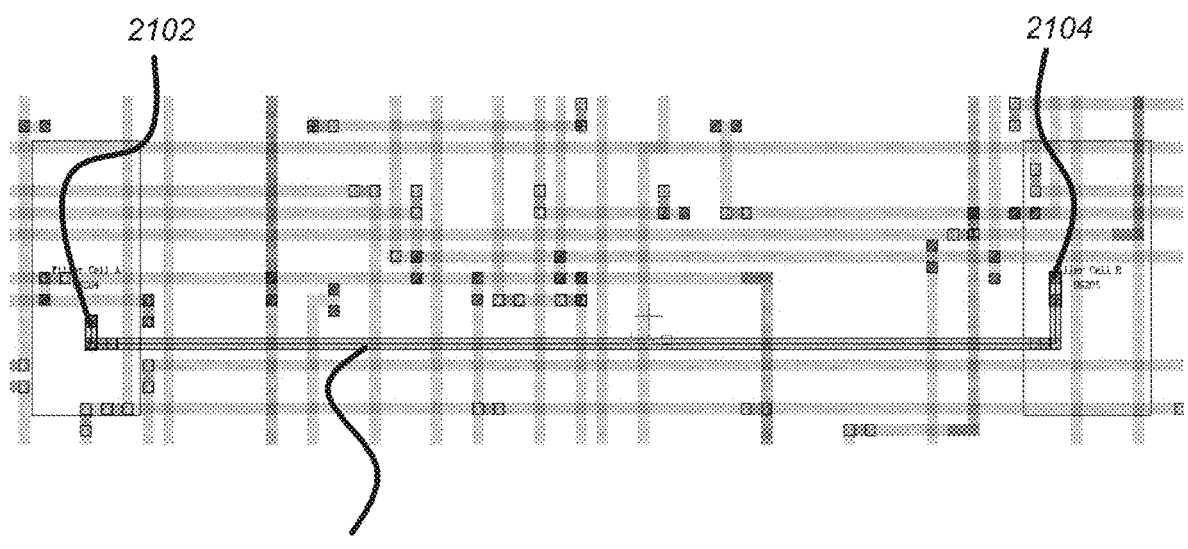

FIGS. 21A and 21B are diagrams illustrating a portion of an ASIC, showing an example of a trace routed by using the foregoing technique. The output of a filler cell 2102 is identified, and a search is made in the horizontal direction to find the nearest filler cell 1230 input 2104, resulting in the routing of a metal trace 2106. FIG. 17A shows the several layers of the ASIC including the metal 1, via 1, metal 2, via 2, metal 3 and via 3 and metal 4 layers. FIG. 17B illustrates the same ASIC and routing as FIG. 17A, but does not depict the metal 1 layer, thus providing a clearer view of the connection wire (or signal trace) defined using the technique described above. An output 2102 for the filler cell 1230D at the left was detected, and it was randomly determined to search horizontally to the right of the filler cell 1230D. Within the predefined 'search dimension' (in this example, 2 rows by 50 tracks) another filler cell 1230F was found with its input A 2104 uncommitted. A wiring connection 2106 from the output of the first filler cell 1230D to the input of the further filler cell 1230F was defined. This wiring connection 2106 was routed in the Metal 2 layer to via 9, touching down to the output or input in the Metal 1 layer of both filler cells 1230D and 1230F, then with the Metal 3 layer and Via 2 making the final connection between the two traces in the Metal 2 layer. In this example, the parameter 'number of inputs' was picked randomly to be 1. Therefore, the process stops further searches after one input is routed to this identified output.

There are two scenarios in which the output of a filler cell 1230 will complete the foregoing processes and remain with no connection with a connection to the input of another filler cell 1230. The first is if no input of any other filler cell 1230 is identified after searching in all four directions. The second is, when the ASIC wiring in that specific area is congested to the point that no wiring connection is possible within the 'search dimension'.

Returning to FIG. 18, for these remaining unconnected filler cell 1230 outputs after the performance of the operations of blocks 1802-1012 of FIG. 18, operations are performed to extend the routing track or wiring connection of the uncommitted filler cell 1230 output to a distance by wiring in higher metal and via layers of the ASIC, as shown in block 1816. The goal of this extension is not to target the connection between outputs and inputs of filler cells 1230. Instead, its purpose is to camouflage the filler cell 1230 output by connecting to that filler cell 1230 output what appears to be a functional routing wire.

Figure 22:
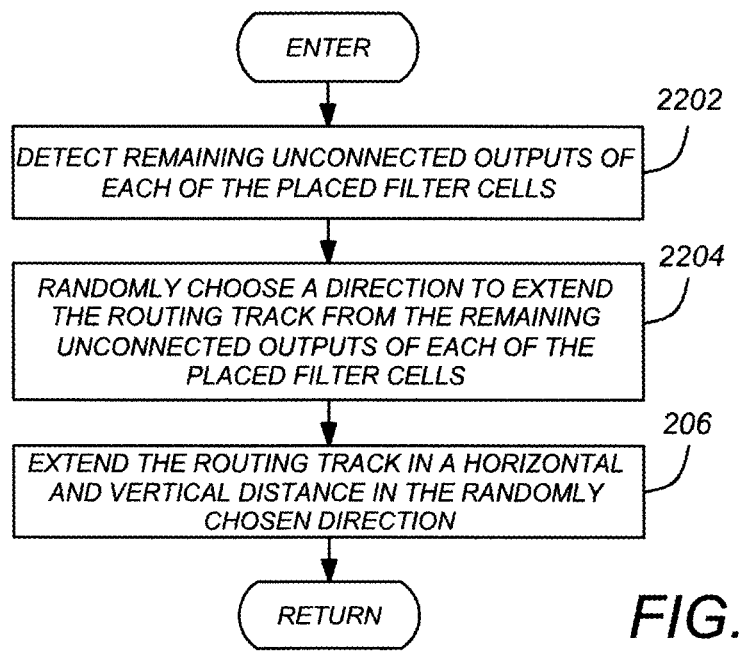
FIG. 22 is a diagram illustrating exemplary method steps that can be used to extend a routing track from remaining unconnected outputs of the placed filler cells.

FIG. 22 is a diagram illustrating exemplary method steps that can be used to extend a routing track from remaining unconnected outputs of the placed filler cells 1230, as described in block 1816 of FIG. 18.

First, block 2202 detects the unconnected filler cell output of each of the placed filler cells 1230. Block 2204 then picks a direction (e.g. left, right, up or down) to extend the routing track from the remaining unconnected outputs of each of the placed filler cells 1230. The direction may be randomly chosen. Then, a routing track or wiring connection is extended from the filler cell 1230 output to higher metals through vias, thus extending the output signal of the filler cell 1230 to a horizontal and vertical distance along the chosen direction. This is shown in block 2206.

The 'total horizontal length' and the 'total vertical length' of wiring are the two controlling parameters that define the horizontal and vertical metal length by which the router can extend the output connector. The process described in FIG. 22 will stop the horizontal metal extension when the actual extended horizontal length of the metal reaches the specified 'total horizontal length'. It also stops the vertical extension if the same condition for vertical extended metal is met. In the example described here, the metal 1 and metal 11 layers may be used for horizontal extension while the metal 2 and metal 12 layers may be used for vertical extension. For each filler cell 1230 output being extended, the parameters of the 'total horizontal length' and the 'total vertical length' can be chosen to be a random number in microns (μm) between 10-200.

Preferably, the extended metal wiring is realized as much as possible in the highest level of metal layers (e.g. the metal 4 layer for vertical extension and the metal 3 for horizontal extension). This is for two reasons. The first is to avoid the metal 2 and metal 1 layers, which are typically more congested due to the routing between functional logic cells 902 in the ASIC. This is because ASICs usually consume more of the lower metal layers, metal 2 and metal 1, for inter-cell 902 routing and for internal connections within the logic cells 902. The other purpose of having the filler cell 1230 outputs extended to higher metal layers is to prepare for the future possible tapping of these extended output signals to metal features created in the metal fill process. Examples of the metal fill process are described in U.S. Pat. No. 6,924,552, which is hereby incorporated by reference herein. The metal fill process in can also be used to fill up all unused metal tracks to further camouflage the ASIC to protect it from reverse engineering.

The metal fill process will produce a large number of floating metal structures that can be differentiated by the voltage contrast technique in a reverse engineering process using a scanning electron microscope. Connecting some of these filled metals to known potentials will make them look like real connectors under voltage contrast. Due to the fact that reverse engineering starts the attack with the highest layer of metal, a floating metal trace at the highest level will reveal that both it and the traces in the lower metal layers connected to it are false connectors. Hence, it is desirable to have as many as possible of the highest-level metal traces generated from the metal fill process connected to a known voltage potential. Bringing the filler cell 1230 output voltages, either Vdd or Vss, to the highest level of metal layer (the metal 4 layer in this discussion) makes the tapping of the high layer metals generated from the metal fill process easier and will result in a higher percentage of such high level metals being connected to known potentials.

In areas with highly congested routing wires, the third routing program will stop when there is no possible route for the continuation of the metal layer extension before the specified 'total extended length' is reached.

Figure 23:
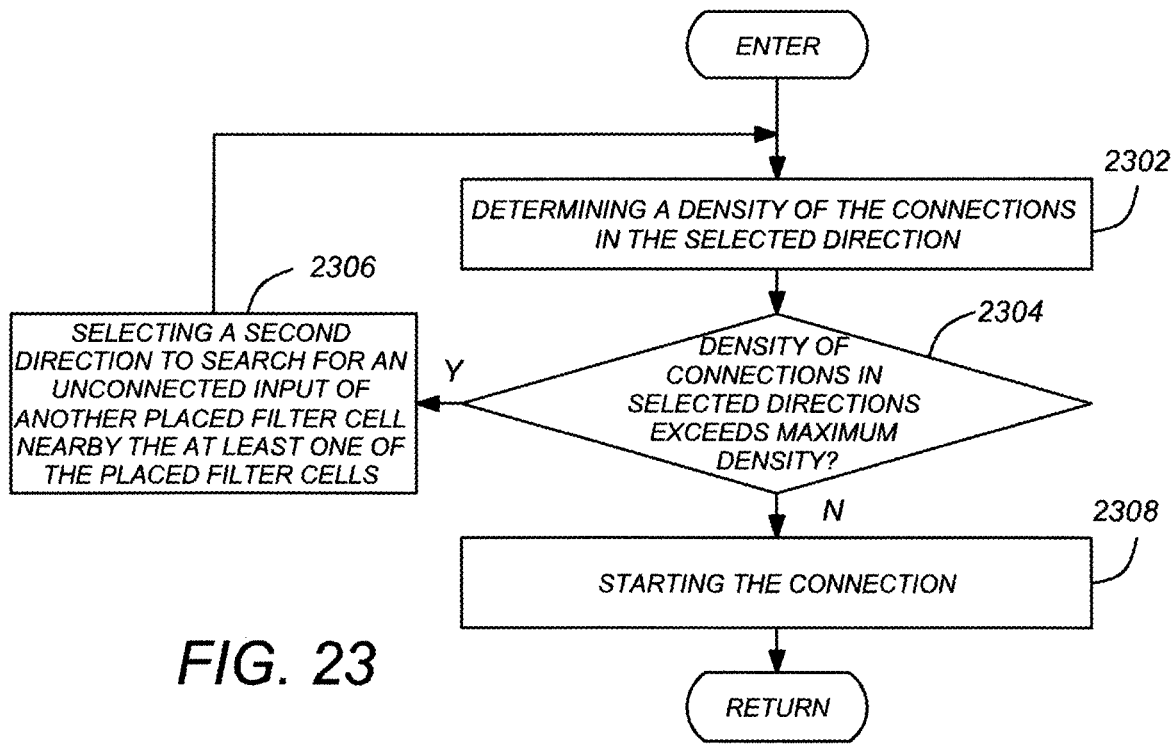
FIG. 23 is a diagram illustrating exemplary method steps that account for the situation where no possible routes are definable.

FIG. 23 is a diagram illustrating exemplary method steps that account for the situation where no possible routes are definable (e.g. due to congestion). First, the density of connections in the selected direction is determined, as shown in block 2302. If the density of connections exceeds a maximum density, a different direction is selected, as shown in blocks 2304-1506. If the density does not exceed the maximum density, the connection is begun in the selected direction and extended the desired length, as shown in block 2208.

Figure 24:
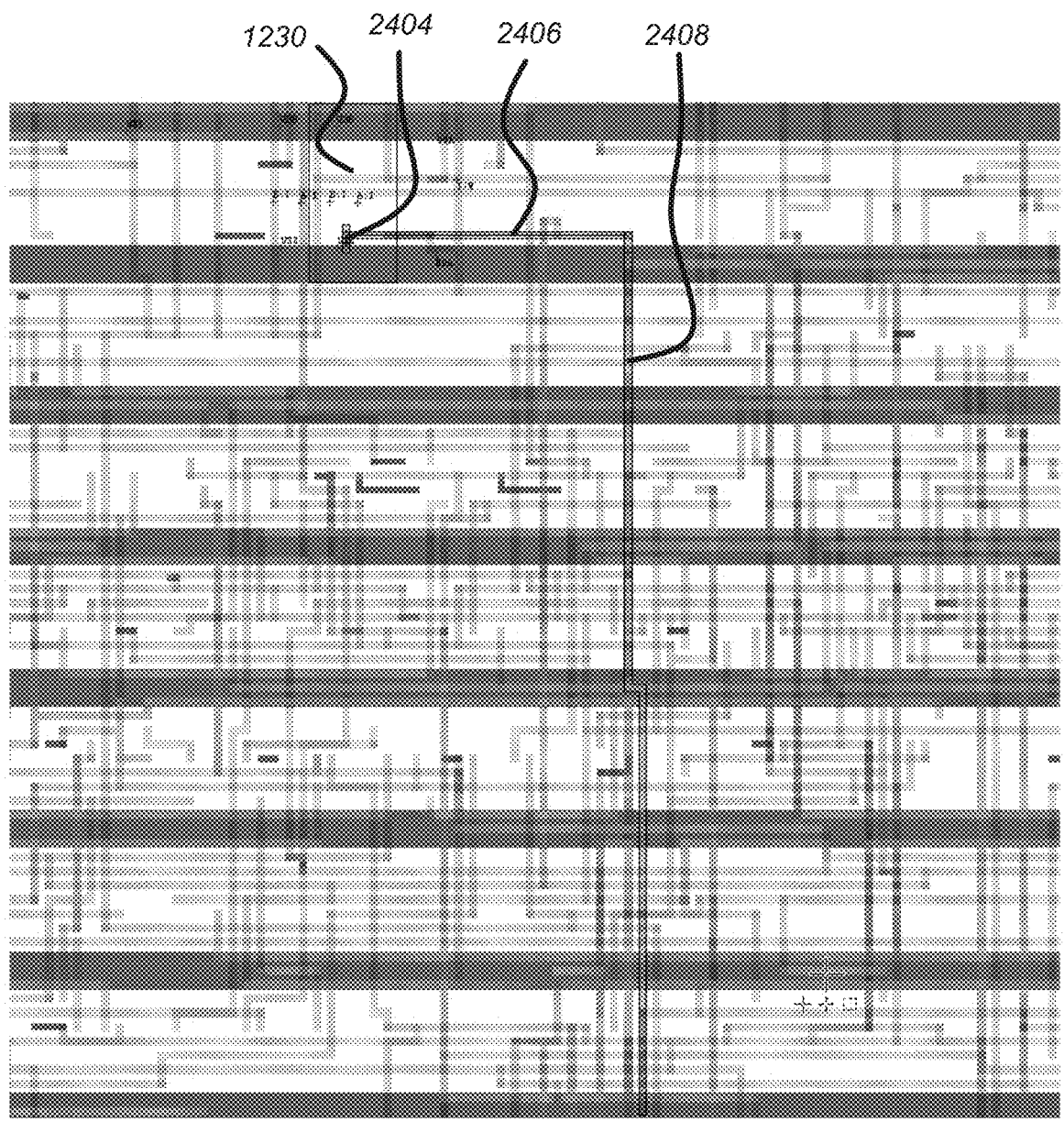
FIG. 24 is a diagram illustrating an exemplary result of the extension process.

FIG. 24 is a diagram illustrating an exemplary result of the extension process described above. An output 2404 of a filler cell 1230 being extended 16 um horizontally in the metal 3 layer by a first trace portion 2406 and 33 um vertically in the metal 4 layer 2408.

After the third routing, the outputs of placed filler 1230 cells are connected to some higher metal layers and extended a distance away from the filler cells 1230. However, there are still some filler cell 1230 inputs which are not connected anywhere and left floating.

Figure 25:
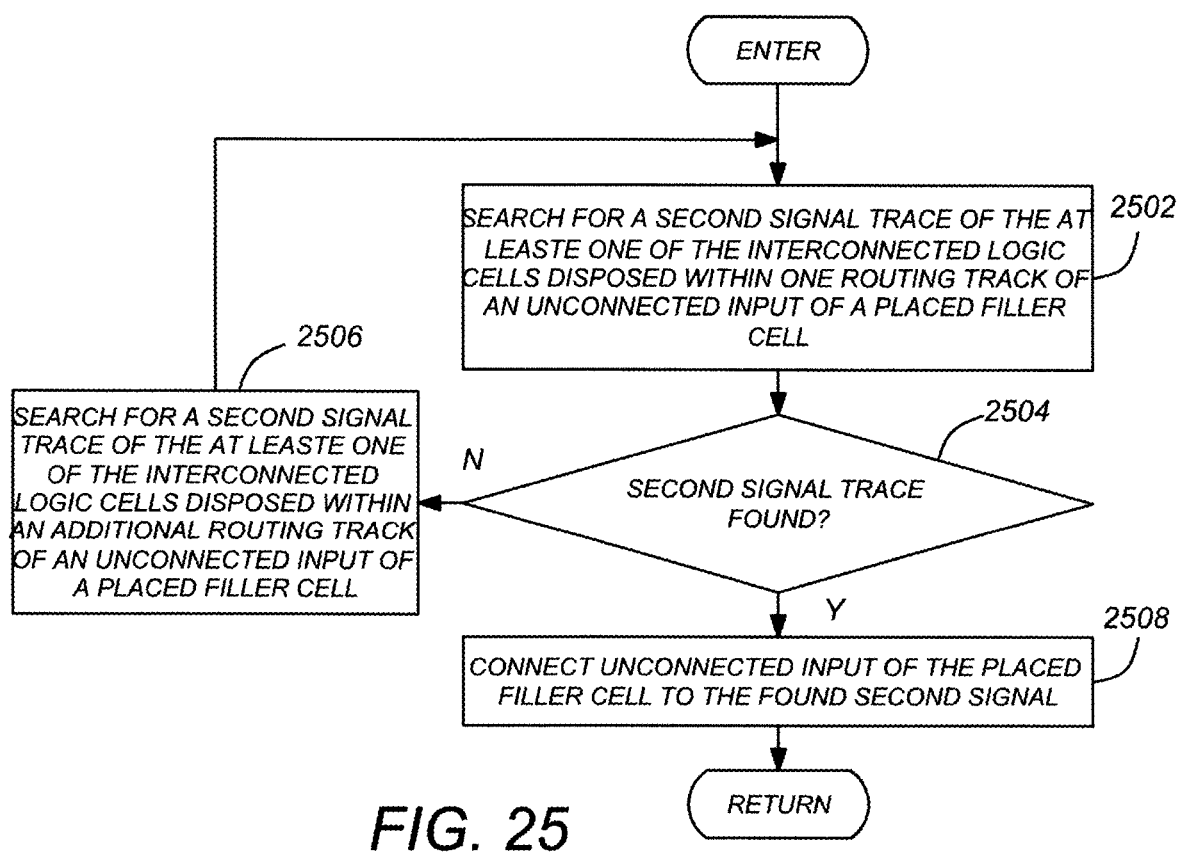
FIG. 25 is a diagram illustrating exemplary method steps that can be used to connect the remaining filler cell inputs to further ASIC logic cell signals.

FIG. 25 is a diagram illustrating exemplary method steps that can be used to connect the remaining filler cell 1230 inputs to further ASIC logic cell 902 signals.

A search is performed for a second signal trace of at least one of the ASIC signals in the interconnected logic cells 902 (not signals from the output of the filler cells 1230) disposed within one routing track of a floating (unconnected) input of a placed filler cell 1230, as shown in block 2502. Typically, this search is performed in the metal 2 layer.

If a second signal trace is found, the unconnected input of the placed filler cell 1230 is connected to the found second signal, as shown in block 2508. This can be accomplished by creating a connection between the floating filler cell 1230 input to the chosen signal using higher metal layers and vias.

If a second signal trace is not found within one track, an expanded search is performed until an interconnected logic cell 902 signal is found, as shown in blocks 2504 and 2506. Typically, the search is expanded by searching for a second signal trace of an interconnected logic cell 902 within two signal tracks, then three signal tracks, until a second signal trace is identified. This process continues until a second signal trace is found or is determined to be unavailable. In case more than one signal is found within the same distance from the floating input node of the filler cell, one of them is picked at random.

Figure 26A:
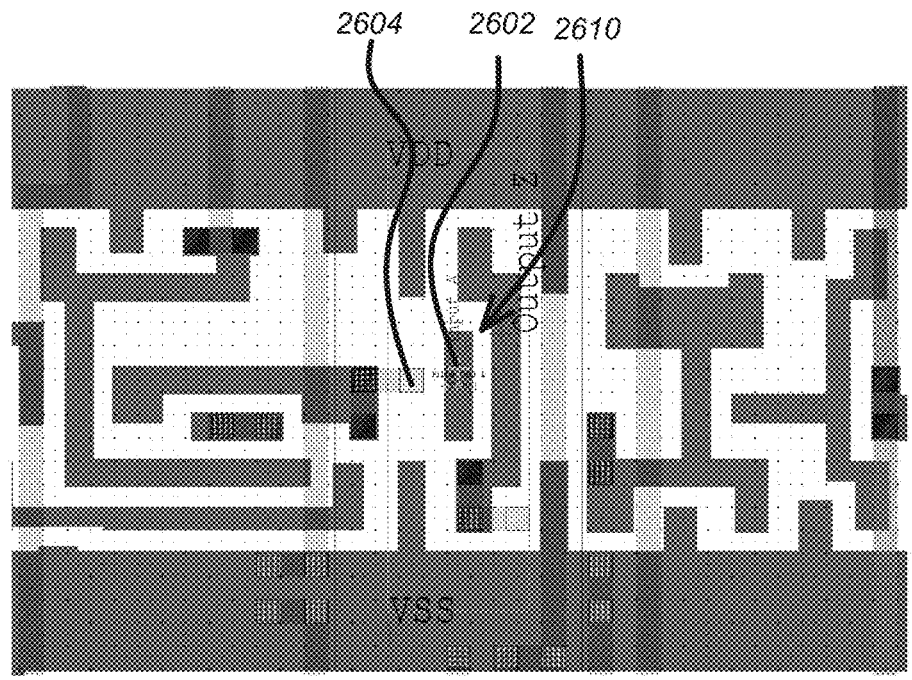
FIG. 26A is a diagram showing an example of a signal trace found one track away from a floating unconnected input of a filler cell.
Figure 26B:
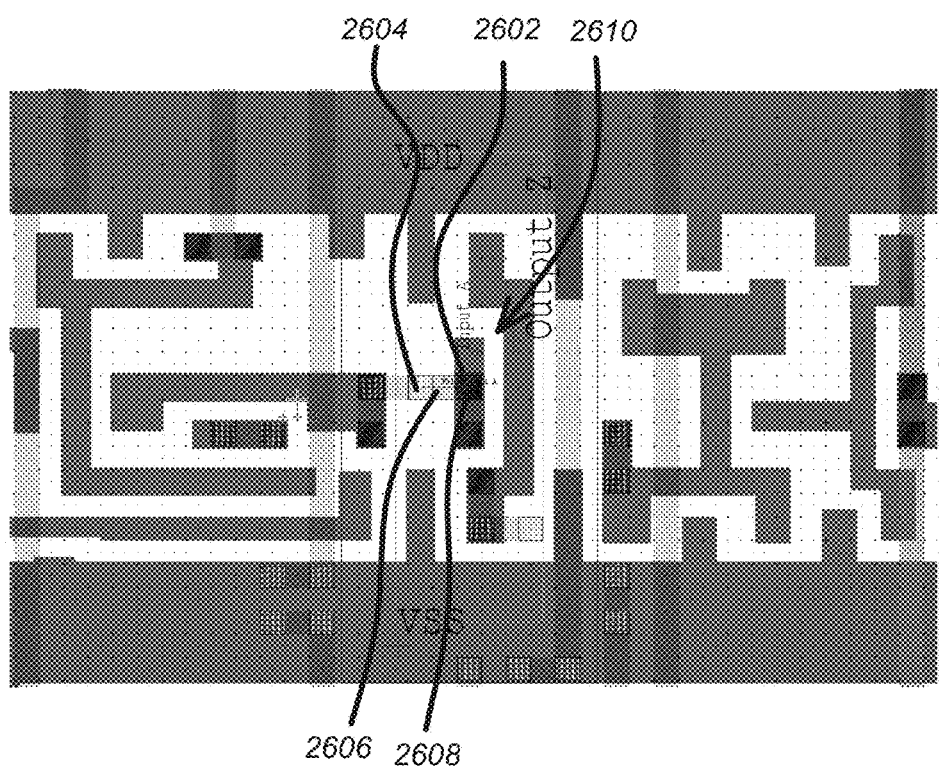
FIG. 26B shows a connection between the filler cell input and a chosen ASIC signal 2604.

FIG. 26A is a diagram showing an example of a signal trace 2604 found one track away (and to the left) from the floating unconnected input A of filler cell 2610 in the metal 2 layer 2602, on the left side of the unconnected input A of the filler cell. FIG. 26B shows the connection in via 9 and metal 2 layers created between the filler cell input A 2602 and the chosen ASIC signal 2604.

At this point, all filler cell 1230 inputs and outputs are connected or extended to some higher level metal layers.

Next, a metal fill process can be performed to generate ASIC-like routing metal wirings and vias to fill up all unused routing channels available in the ASIC areas. An exemplary method to perform this metal fill process is described in U.S. Pat. No. 6,924,552, which is hereby incorporated by reference herein. The metal fill process is a very strong ASIC protection technique that increases the quantity of image information that a reverse engineer has to analyze by 5 to 10 times.

Because a floating metal wire can be easily identified using voltage contrast techniques with a scanning electron microscope, the effect of the metal fill process in protecting ASIC from reverse engineering can be enhanced by connecting as many metal fill wirings as possible to a known voltage.

After the metal fill process, another process can be performed to propagate the output voltage of filler cells 1230 to the floating metals generated by the metal fill process described above.

Figure 27:
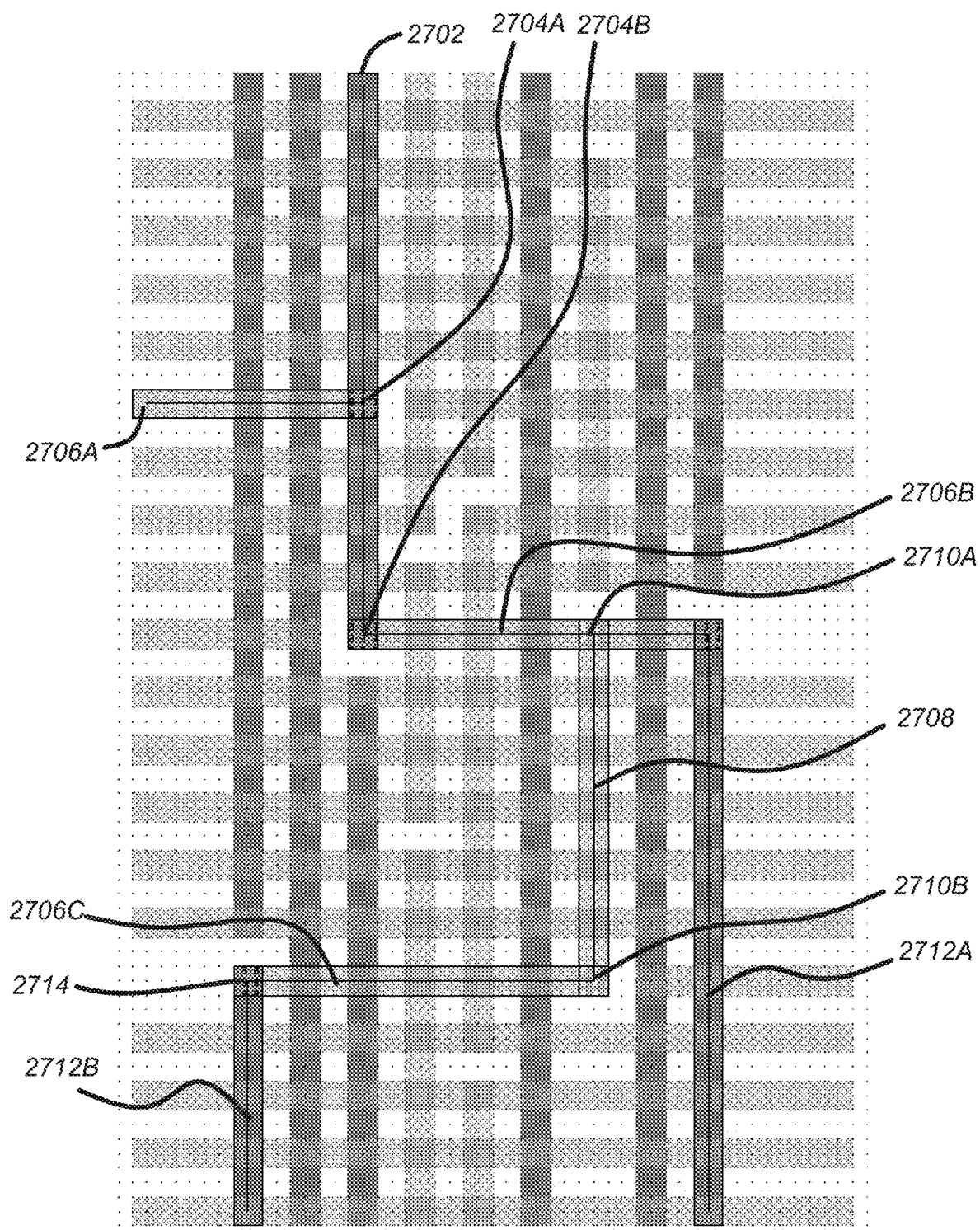
FIG. 27 is a diagram showing an illustration of the process of propagating the output voltage of filler cells to floating metals generated by the metal fill process.

FIG. 27 is a diagram showing an illustration of the process of propagating the output voltage of filler cells 1230 to floating metals generated by the metal fill process. In the illustrated example a filler cell extension 2702 has been generated in the metal 12 layer as described in FIG. 22. Further, the above-described metal fill process is performed in the metal 3 and metal 4 layers, resulting is traces 2708 (created in the metal 2 layer), 2706A, 2706B and 2706C (created in the metal 11 layer).

This process starts with the filler cell output extension in the metal 4 layer generated from using the process illustrated in FIG. 22, then searches for any areas in the metal 3 layer filled using the metal fill process above its end region lying just under that piece of extension in the metal 4 layer. Once such a filled metal 3 is found, the process generates a via 2704B at an endpoint of the Metal 3 layer trace 2706A connecting the extended Metal 4 layer trace 2702 to the filled Metal 3 layer trace 2706B. These filled Metal 3 layer traces carry the voltage potential of the filler cell 1230 output after they are connected with the via 2704B.

The process may propagate the filler cell output voltage present at 2702 further by repeating the same extension process described above. The process then searches for any metal 2 layer trace from metal fill process with its endpoint lying exactly under the connected metal 3, and places a Via 10 2710A there to connect the filled metal 2 layer trace 2708 to the metal 3 layer trace 2706B, as shown in FIG. 27. The result is that the filler cell 1230 outputs propagate through the metal 4 layer extension 2702 generated earlier to some filled metal 3 layer trace 2706A, 2706B, and additionally to some filled metal 2 layer trace 2702 generated in the metal fill process. Filled metal 2, 3 and 4 layer traces here are referring to the metal layers traces created in the metal fill process.

This routing process forms connections between a higher metal layer traces (metal 4) to lower metal layers traces (metal 3 and metal 2). The process also forms connections from the lower filled metal 2 layer traces to higher level filled metal 11 traces, and again to the filled metal 4 layer traces as long as the endpoint overlap condition of the two adjoining metal layers is met. This type of connection is shown in FIG. 27 where a metal 2 geometry trace 2708 is connected to the filler cell 1230 output (by extension 2702) in the earlier propagation process, and is further connected to another of filled metal 3 layer trace 2706A-1906C.

A similar extension from filled metal 3 layer trace 2706C to filled metal 4 layer trace 2712B and connection by via 2714 is also shown in the FIG. 27. The propagation of the output signal in the fifth routing program will stop when it cannot find any more endpoint overlap of metal layers. Using the metal layer endpoint overlap as a condition for the propagation (as opposed to making inter-layer connections elsewhere along the traces) makes sure the created connection has a similar appearance to the normal wiring of an ASIC. Note that the process need not investigate the metal 1 layer traces, since all possible metal 1 empty spaces were already used during the placement of the filler cells 1230.

There are two filler cell 1230 output voltages, Vdd and Vss. A further process may be used to start first with those filler cell 1230 outputs at the Vdd potential and carry out the propagation of the Vdd voltage to the filled metal layers. After finishing the Vdd output propagation, all the filled metals connected to Vdd will be identified and restricted from the next extension step. This is a process connecting the filled metal traces to the output of 'some' filler cells. Since there are two types of filler cell outputs either at Vdd or Vss, separating the extension process into 'Vdd only' and 'Vss only' avoids the possibility of shorting the Vdd to Vss in the extension. The routing is from the outputs of the filler cells. However, these outputs are all (internally) connected to either Vdd or Vss). Then, filler cell outputs at Vss are propagated to the rest of the filled metals. The purpose of separating the process into the foregoing two steps is to avoid any possible short between Vdd and Vss during the propagation of metal connections.

Figure 28:
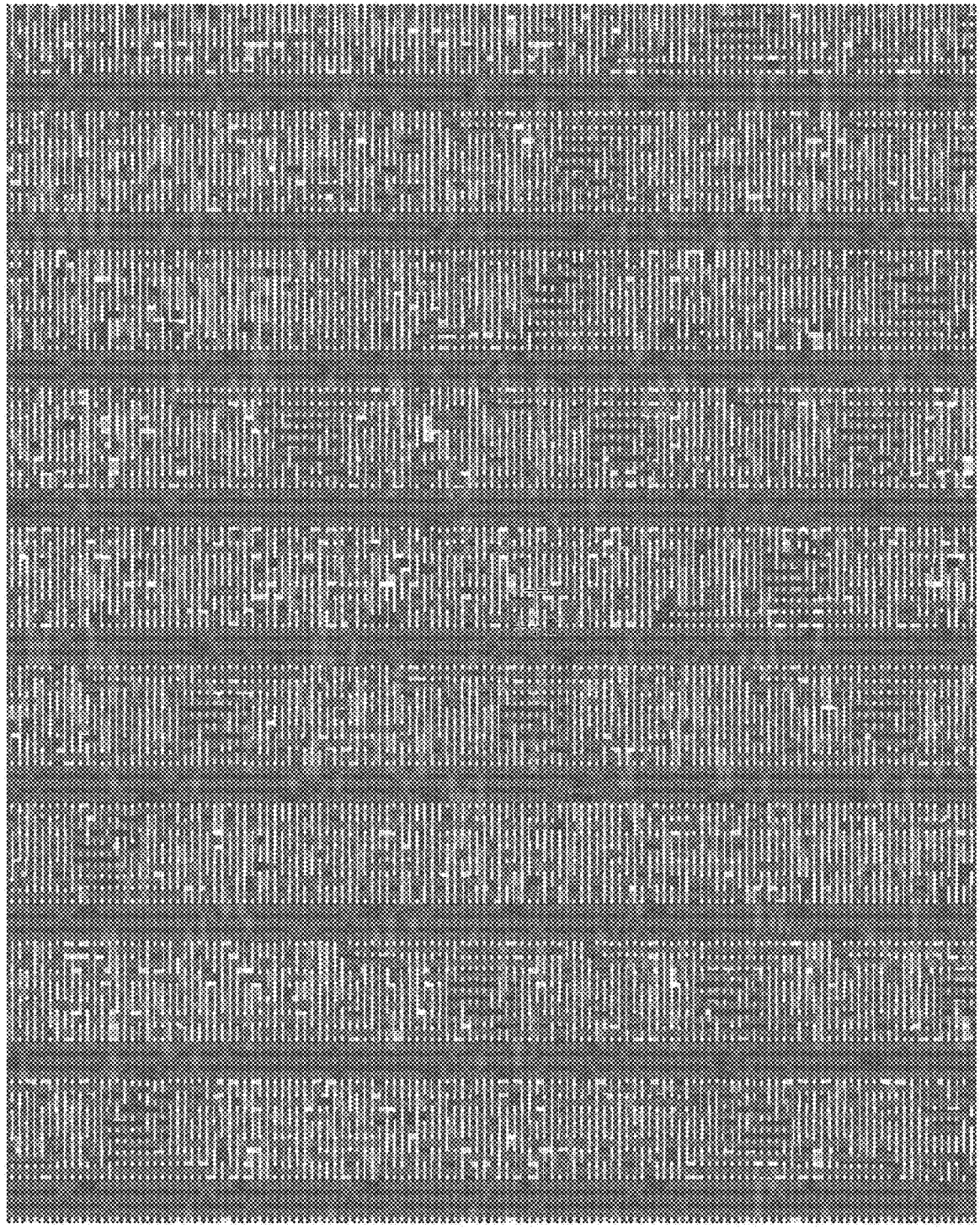
FIGS. 28 and 29 show the final layout of a portion of the ASIC after going through the filler cell placement and all the wire routing procedures described herein.
Figure 29:
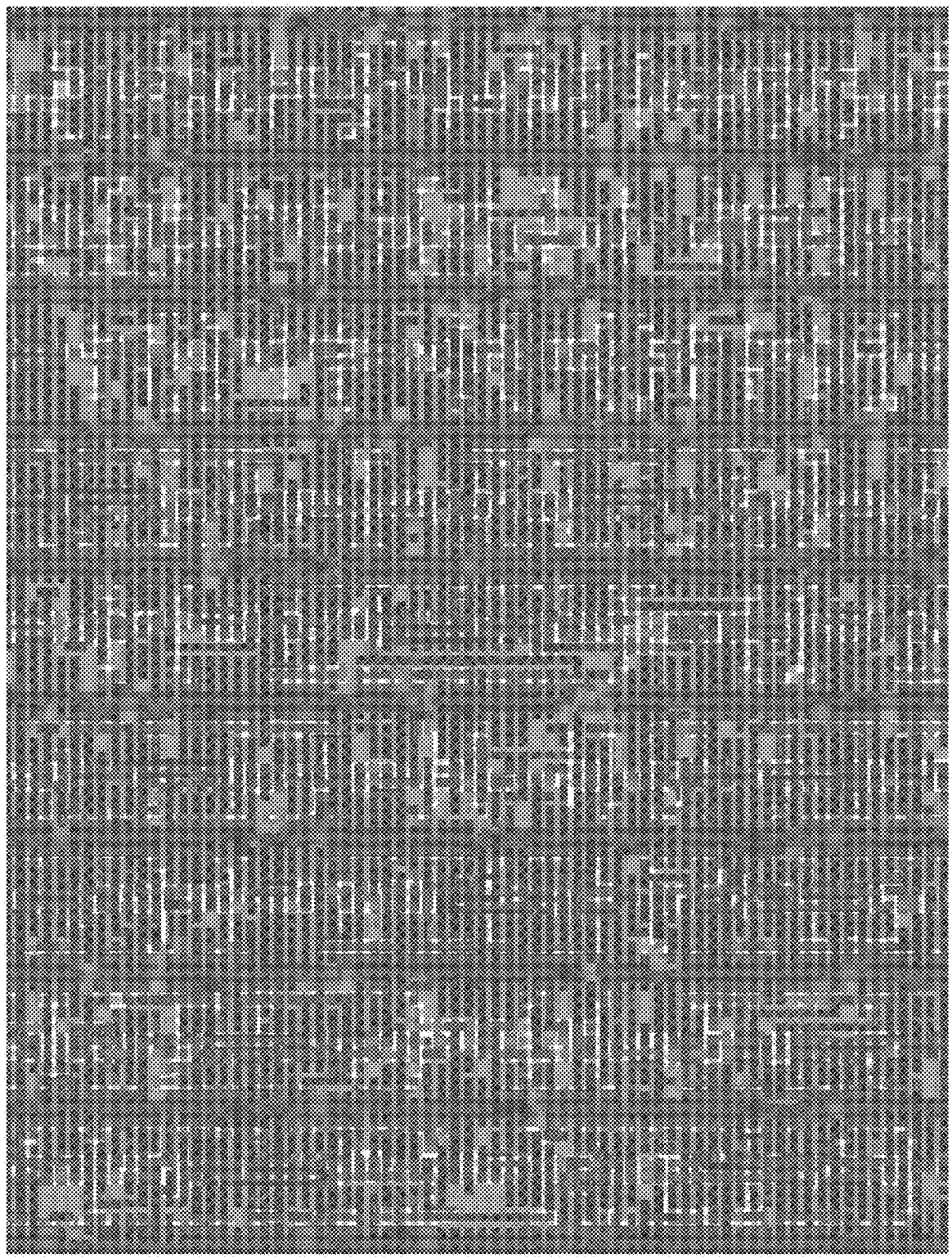

At the end of this process, the ASIC 900 will contain many times more data than the original design, which makes the reverse engineering effort much more difficult. FIGS. 28 and 29 show the final layout of a portion of the ASIC after going through the filler cell placement and all the wire routing procedures described above. FIG. 28 displays only metal layers so as to show the camouflage effect in the metal wiring, while FIG. 29 shows all layers of the ASIC 900 design.

The ASIC 900 camouflage technique described above involves the addition of specially designed filler cells 1230 and wiring connections in, preferably, all metal layers. These wiring connections occur from filler cells 1230 to filler cells 1230, from filler cells 1230 to the logic cells 182 of the ASIC 180, and from filler cells 1230 to floating metals generated in the metal fill process.

This process can be performed on the final GDS release of an uncamouflaged ASIC 180 design, and thus there will not be any impact on the uncamouflaged ASIC 180 design. The physical size of the ASIC's silicon die (die area) will not be changed since all added circuits and wires use only the unused silicon areas and the vacant metal tracks available in the ASIC 900. Although some filler cell 1230 inputs are connected to the ASIC 900 circuit network, the ASIC 900 logic function is not altered. However, there will be a minor increase in the capacitive loading of the tapped ASIC logical cell 902 outputs (due to the added connections to the inputs of the filler cells and to the proximity of the additional filler metal traces). A timing analysis of the post-camouflage ASIC may be performed to verify the timing requirements of the ASIC 180 before production release.

During the reverse engineering of an ordinary ASIC 900, the chip is imaged layer by layer under optical or scanning electron microscopy. The effort first focuses on identifying the function of logic cells 902 by extracting their circuit connections. The logic cell 902 extraction process is very straight forward for a standard cell library with no protection.

An ASIC design usually uses 200 to 300 distinct cells from the standard cell library. Reverse engineering can recognize hundreds of these logic cells in an ASIC within one to two weeks. Because of the unique layout of every logic cell 902, a signature of each logic cell 902 can be established in the metal 1 layer (which is used for device connections within the cell 902). Once logic cells 902 are recognized through circuit analysis, reverse engineering can use the metal 1 layer pattern as a recognition layer to identify the logic cells 902 in the ASIC 900. By recognizing the pattern in metal 1 layer, reverse engineering does not need to re-analyze the circuit for other instances of that logic cell 902. Hence, to pirate a 100-thousand-gate ASIC 900 design, the circuit analysis effort will be the same as a 9-thousand-gate design.

After the circuit extraction and identification of the two to three hundred library cells, extracting the ASIC netlist can begin by tracing the metal wire connections throughout the images of the ASIC's metal layers. Due to the addition of the special filler cells 1230 with the same metal 1 layer pattern as a standard logic cell 902, an ASIC 900 protected with this invention will invalidate the reverse engineering assumption of a unique metal 1 pattern for each logic cell 902. Reverse engineering is forced to review all the device formation layers (Active, Poly, Implants and Contact) of every cell in the ASIC 180 area to determine its logical function. This will multiply the circuit extraction and cell identification effort by many times. This technique is even more effective for ASICs 180 with relatively large gate counts. The metal wirings generated in the different routing programs will make these filler cells 1230 appear to be part of the ASIC 900 logic and make it difficult to sort them out.

For the camouflage of the metal wiring, the metal fill process described in the '552 patent is effective in resisting reverse engineering attempts to extract the logic netlist. However, many wires generated using this metal fill process are floating and are not driven by any voltage source. They are detectable by voltage contrast techniques with a scanning electron microscope (SEM). The voltage contrast techniques give different brightness levels to connectors or nodes in an ASIC 900 under a SEM according to their voltage potential. Any floating highest level metal layer (Metal 12 in this disclosure) from the metal fill process can be identified with this technique and eliminated from the image data during reverse engineering. Lower levels of floating metal layers, although identified by voltage contrast imaging, can not be eliminated in a reverse engineering effort since some real ASIC 180 routing connectors will show as floating after the de-layering of the higher metal layers. The last process described above provides a high percentage of otherwise floating metals from the metal fill layers with logic level potentials of either Vdd or Vss. This provides a strong enhancement to the metal fill process.

Other Camouflaging Techniques

Other camouflaging techniques can be used either in addition to or in alternative to those described above. For example, combinations of filler cells 1230 and logic cells 182 can be created and inserted into the functional logic cells, in such a way that the insertion does not affect the function performed. This can be accomplished by generating a logical description of a cell combination comprising a plurality of filler cells 1230 (or filler cells 1230 and logic cells 902) using predetermined input and output points.

Figure 30:
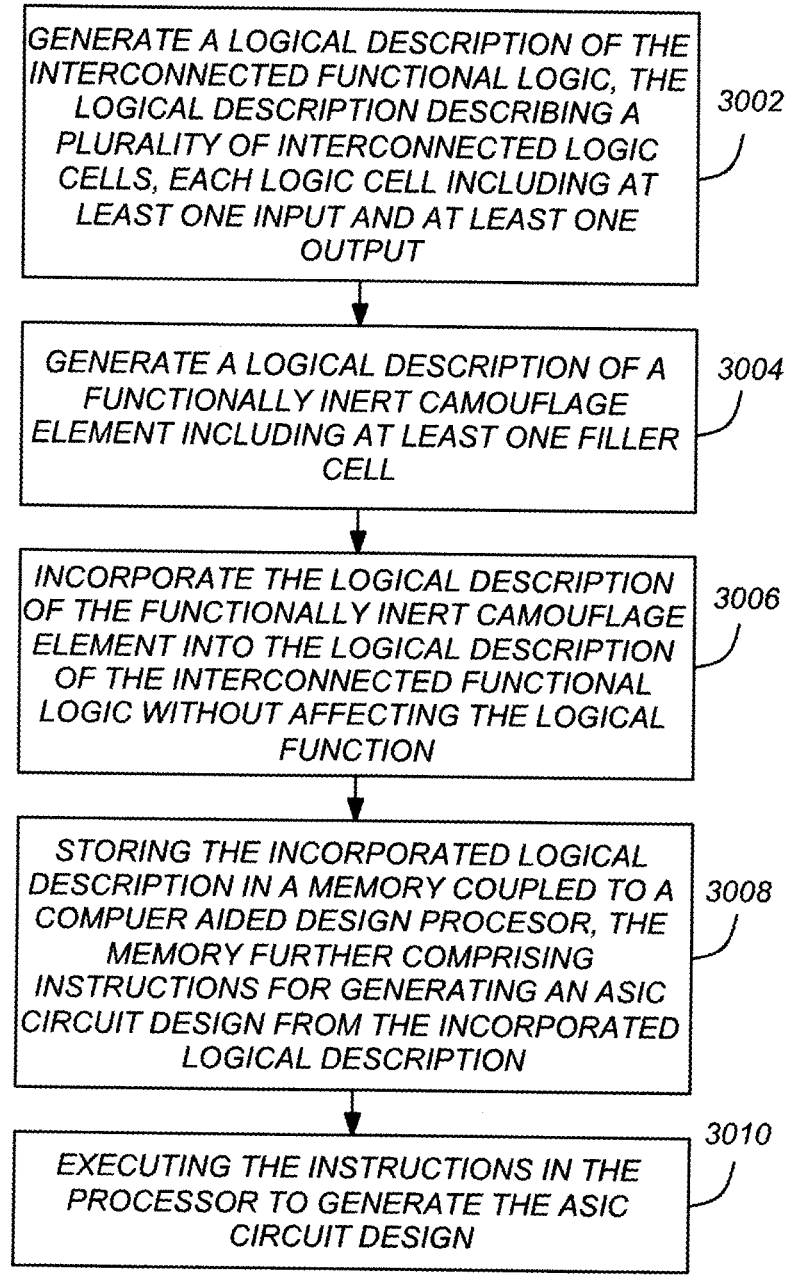
FIG. 30 is a flowchart illustrating further exemplary steps that can be used to camouflage a circuit.

FIG. 30 is a flowchart illustrating exemplary steps that can be used to camouflage a circuit. As shown in block 3002, a logical description of interconnected functional logic is generated, wherein the logical description describes a plurality of interconnected logic cells.

Figure 31:
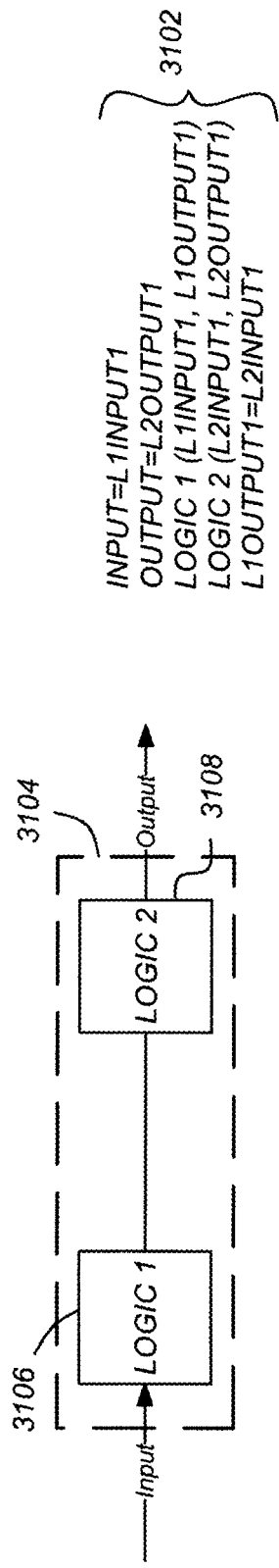
FIG. 31 is a diagram illustrating an exemplary embodiment of a logical description of interconnected functional logic or cell combination performing a desired logical function.

FIG. 31 is a diagram illustrating an exemplary embodiment of a logical description 3102 of interconnected functional logic 3104 or cell combination performing a desired logical function. The interconnected functional logic 3104 comprises logic cell 1 3106 and logic cell 2 3108.

Returning to FIG. 30, a logical description 3202 of functionally inert camouflage element that includes a filler cell 3210 is generated, as shown in block 3004.

Figure 32:
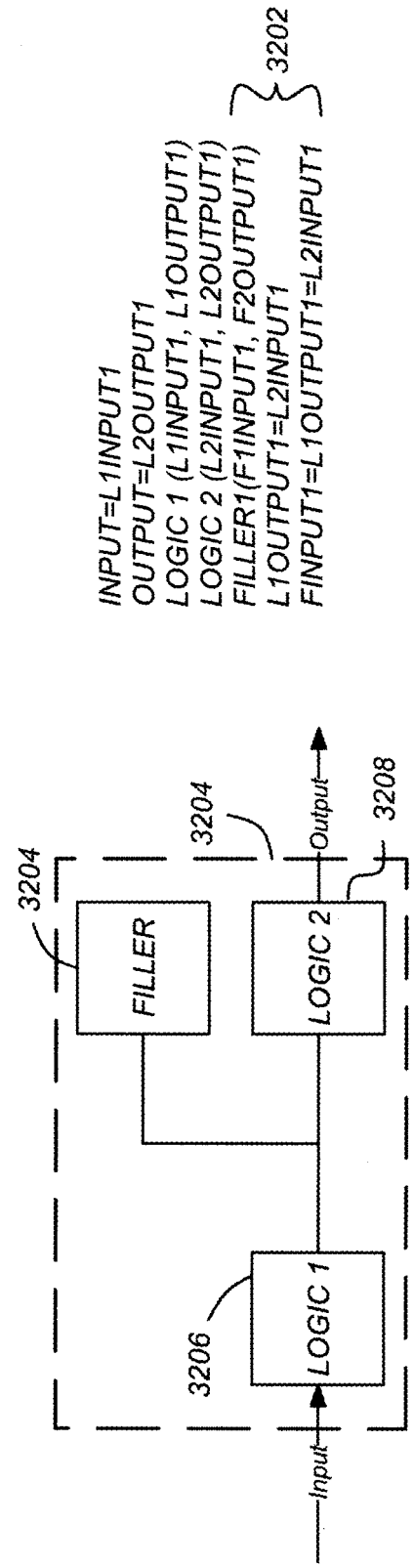
FIG. 32 is a diagram showing an embodiment of a functionally inert filler cell.

FIG. 32 is a diagram showing an embodiment of a functionally inert filler cell 3204. The logical description 3202 of the functionally inert camouflage element is incorporated into the logical description of the interconnected functional logic, as shown in block 3006 and illustrated in FIG. 32. In the context of the present invention, a "functionally inert camouflage element" refers to a one or more individual elements, when combined together and integrated with the baseline (non-modified) circuit design, do not affect the logic function of the baseline circuit design. For example, note that since the output of logic cell 9 3106 is still supplied to the input of logic cell 10 3108, the addition of the filler cell 3204 does not affect the logical function of the interconnected functional logic 3104.

Figure 33:
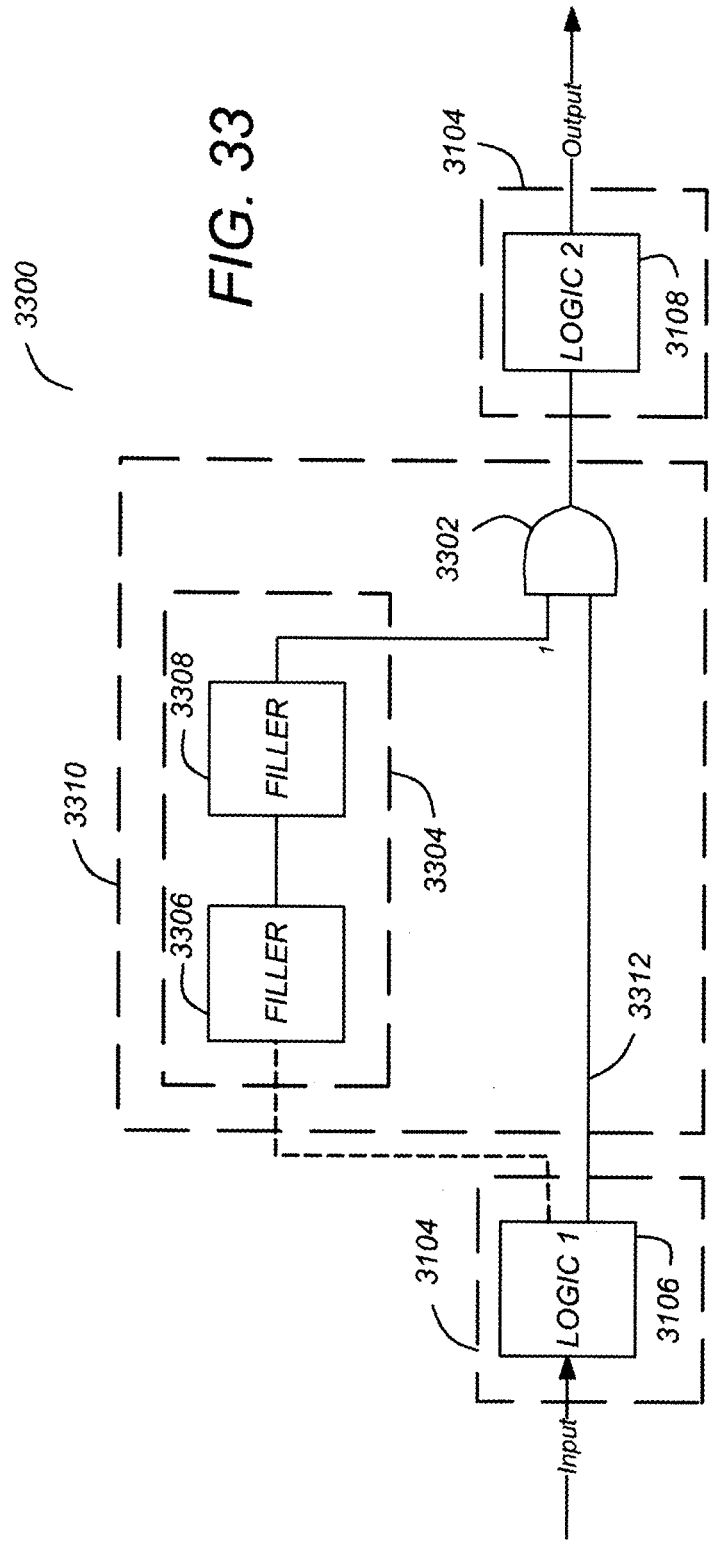
FIG. 33 is a diagram illustrating another example of the insertion of a functionally inert filler cell.

FIG. 33 is a diagram illustrating another example of this technique. In this example, a camouflaging element 3310 comprising a 2 input AND gate 3302 and a filler cell combination 3304 is used to camouflage the operation of logical cell combination 3104. In this example, the output of logic cell 1 3106 is provided to the input of logic cell 2 3108 via the filler cell 3310. In particular the output of logic cell 1 3106 is provided to one of the inputs to the 2-input AND gate 3302, and the output of the 2-input AND gate 3302 is provided to logic cell 2 3108. The output of the filler cell combination 3304, which is configured to always be logic ONE, is connected to the other input of the 2-input AND gate 3302. In this way the added filler cells 3306, 3308 would appear to be a functional part of the circuit, but, in fact, would not effect the function of the unmodified circuit or logical combination 3104. For further camouflaging, the filler cell combination 3304 may receive input from first logic cell 3106 to generate the logic ONE, as shown by the dashed line. The filler cell combination 3304 may generate the logical ONE by a combination of logic gates that always produce an output of one (e.g. $A \oplus B \oplus \overline{A}$) or the output of the filler cell combination 3304 may simply be tied to a positive voltage $V_{DD}$.

The use of either or both of the foregoing examples would not substantially increase the effort to design the ASIC, and will also have little or no effect in the later stages of layout and verification. Further, if only a relatively small number of filler cells are used in this manner, there little or no impact on the size of the final chip.

The foregoing techniques can also be used to design and use additional standard cells that have substantially the same appearance of the standard cells in the original cell library, yet perform a different logic function. Such cells could be randomly dispersed in the cell netlist at the appropriate point in the design flow. For example, a cell could be designed, using the techniques described in U.S. Pat. Nos. 7,049,667, 6,815,816, and 6,774,413 (which patents are hereby incorporated by reference herein), so that it appears identical to FIG. 12A in the layers shown, but performs a two-input NOR function instead of the NAND function of FIG. 12A. This makes it extremely difficult to determine the true function of the circuit by reverse engineering.

The present invention can also be used to create one or more logical descriptions (e.g. netlists) of combinations of filler cells (or combinations of filler cells and logic cells or combinations of filler cells, logic cells and filler cells) which, when combined, have the same logical function, but which have intermediate logical functions that are different than the uncamouflaged designs. Such combinations would, instead of having inputs which are ignored and/or fixed logic level outputs as described above, would have at least one active input and at least one active output which is some logical function of the active input(s). The circuitry of the true logic function of the combination would be hidden by spreading the logical function over a greater number of cells. The true logic function is further obscured in that it is distributed across a plurality of apparent logic cells instead of occurring in just one cell as would be expected.

Figure 34:
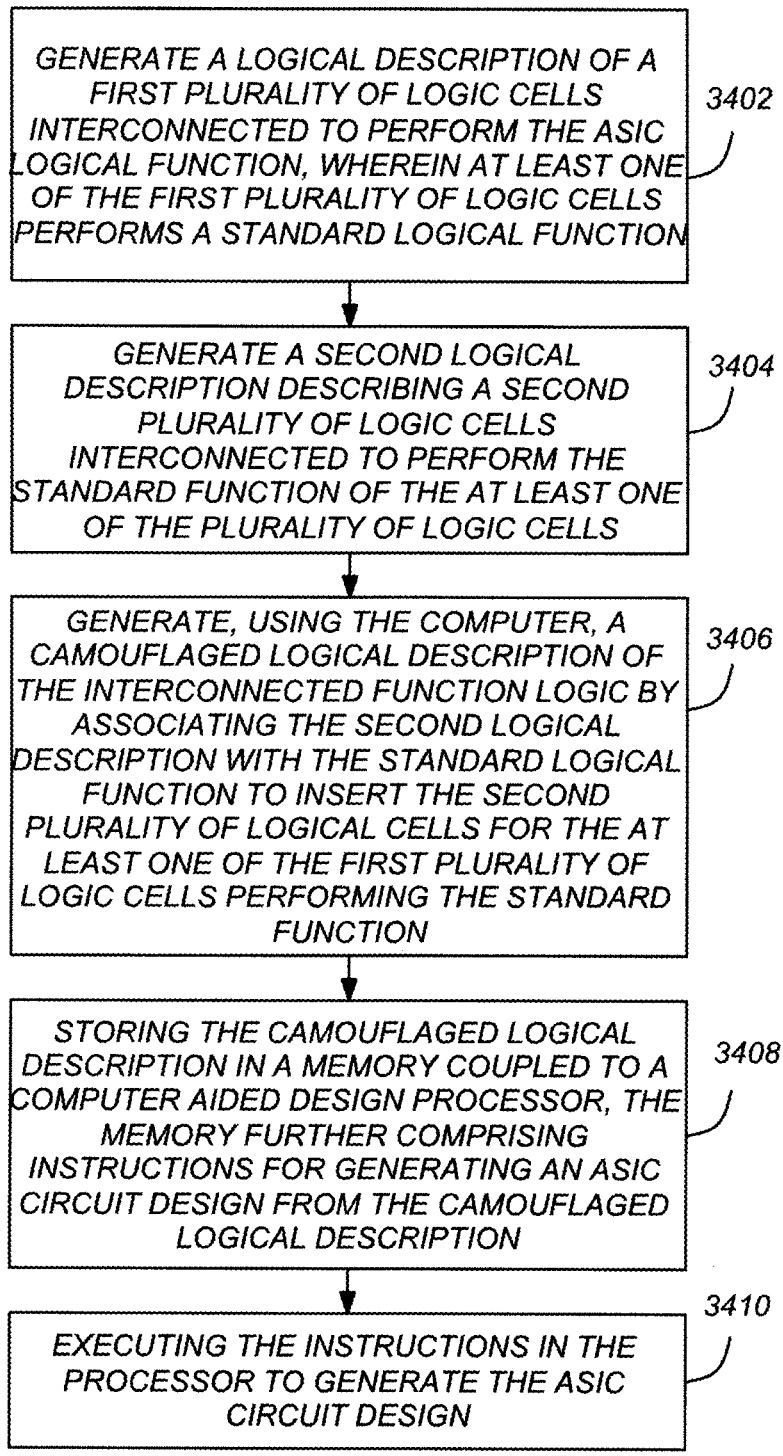
FIG. 34 is a diagram illustrating further exemplary method steps that can be used to camouflage a circuit.

FIG. 34 is a diagram illustrating further exemplary method steps that can be used to camouflage a circuit. First, a logical description of a first plurality of interconnected logical cells that performs the ASIC function is generated, as shown in block 3402. At least one of the plurality of logic cells performs a standard logical function such as a logical AND, OR, NOR, EXCLUSIVE OR, or DELAY. Next, as shown in block 3404, a second logical description is generated that describes a second plurality of logic cells that are interconnected to perform the standard function described above. The second logical description differs from that of the plurality of logic cells that are used to implement the same standard logical function by standard cells in the cell library. Then, in block 3406, a camouflaged description is generated by associating the second logical description with the standard logical function. Thus, when the computer assembles the logic cells together to create the circuit design of the ASIC, the computer will select and insert the second plurality of logic cells for the plurality of logic cells ordinarily associated with the standard function.

In block 3408, the camouflaged logical description is stored in a memory of the computer having instructions for generating an ASIC circuit design from the camouflaged logical description. The instructions are then executed to generate the ASIC circuit design, as shown in block 3410. The ASIC circuit design defines the topology of the layers which physically realize the ASIC.

Figure 35:
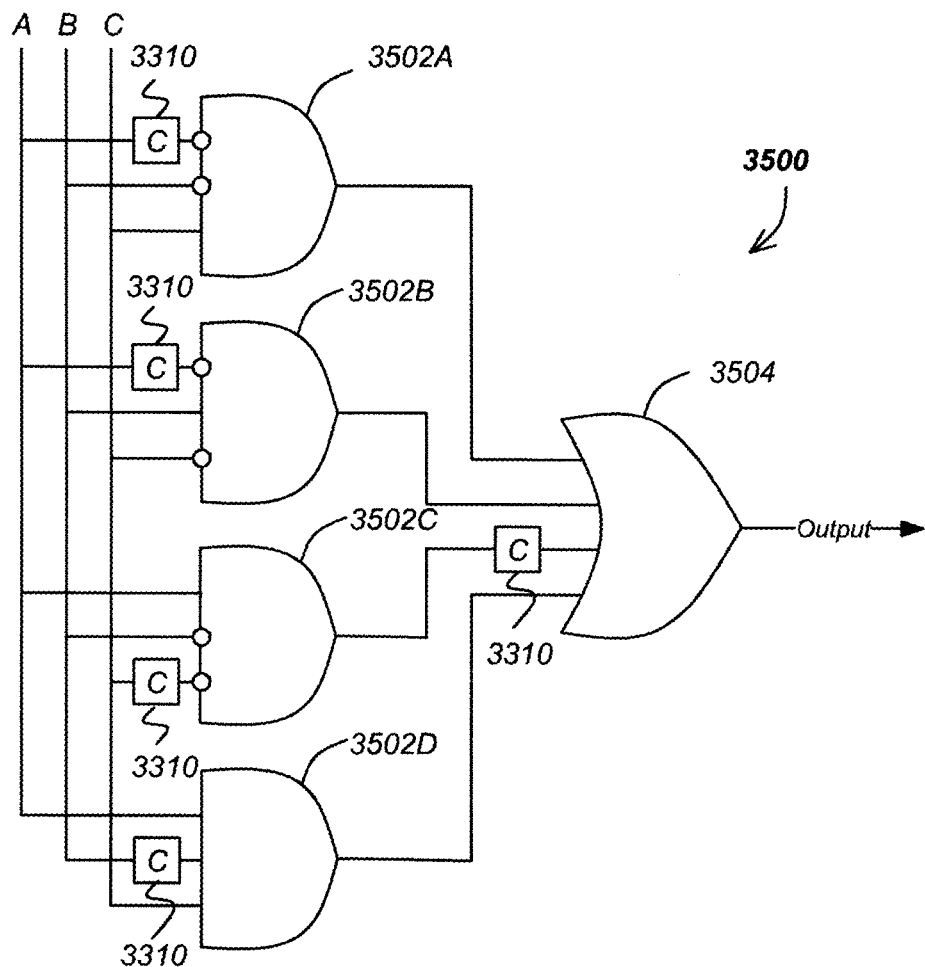
FIG. 35 is a drawing illustrating an example of the camouflaging technique described in FIG. 34.

FIG. 35 is a drawing illustrating an example of this camouflaging technique. The logic circuit 3500 is an implementation of a three-input logical "exclusive or" (XOR) gate, that provides the result A XOR (B XOR C). However, since this is logically equivalent to $\overline{ABC} \oplus \overline{ABC} \oplus A\overline{BC} \oplus ABC$, logic circuit 3500 implements an equivalent logical functionality using a plurality of interconnected AND gates 3502A-2702D, inverters, and OR gate 3504. Karnaugh mapping and other methods can be used to determine logically equivalent circuits for camouflaging. The function of the logic circuit 3500 can be further camouflaged by insertion of camouflaging elements 3310 described above.

This embodiment may be implemented as follows. First, the netlist or logical description of the plurality of cells performing the desired function is given a cell name that can be associated with its true logic function (in the illustrated example, the function A XOR (B XOR C) can be associated with the interconnected cells that implement AND gates 3202A-2402D and OR gate 3204). The computer automated design (CAD) system is then instructed insert this netlist instead of the usual logic function single cell where appropriate. The CAD system may insert the netlist implementing $\overline{ABC} \oplus \overline{ABC} \oplus A\overline{BC} \oplus ABC$ for all instances of A XOR (B XOR C) or may do so randomly for each instance of the logic function in the circuit.

Figure 36:
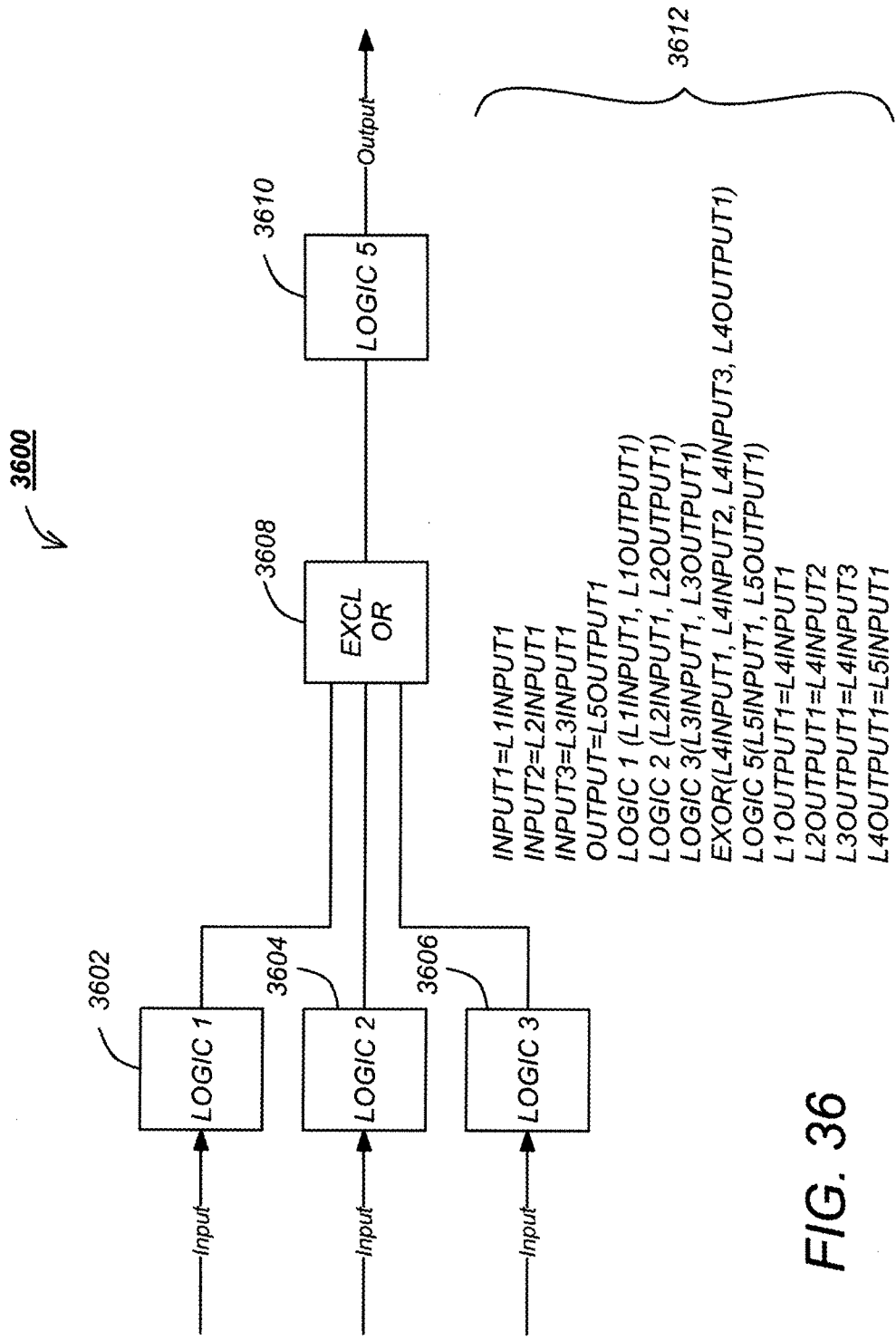
FIGS. 36 and 37 are diagrams further illustrating the camouflaging technique described in FIG. 34.
Figure 37:
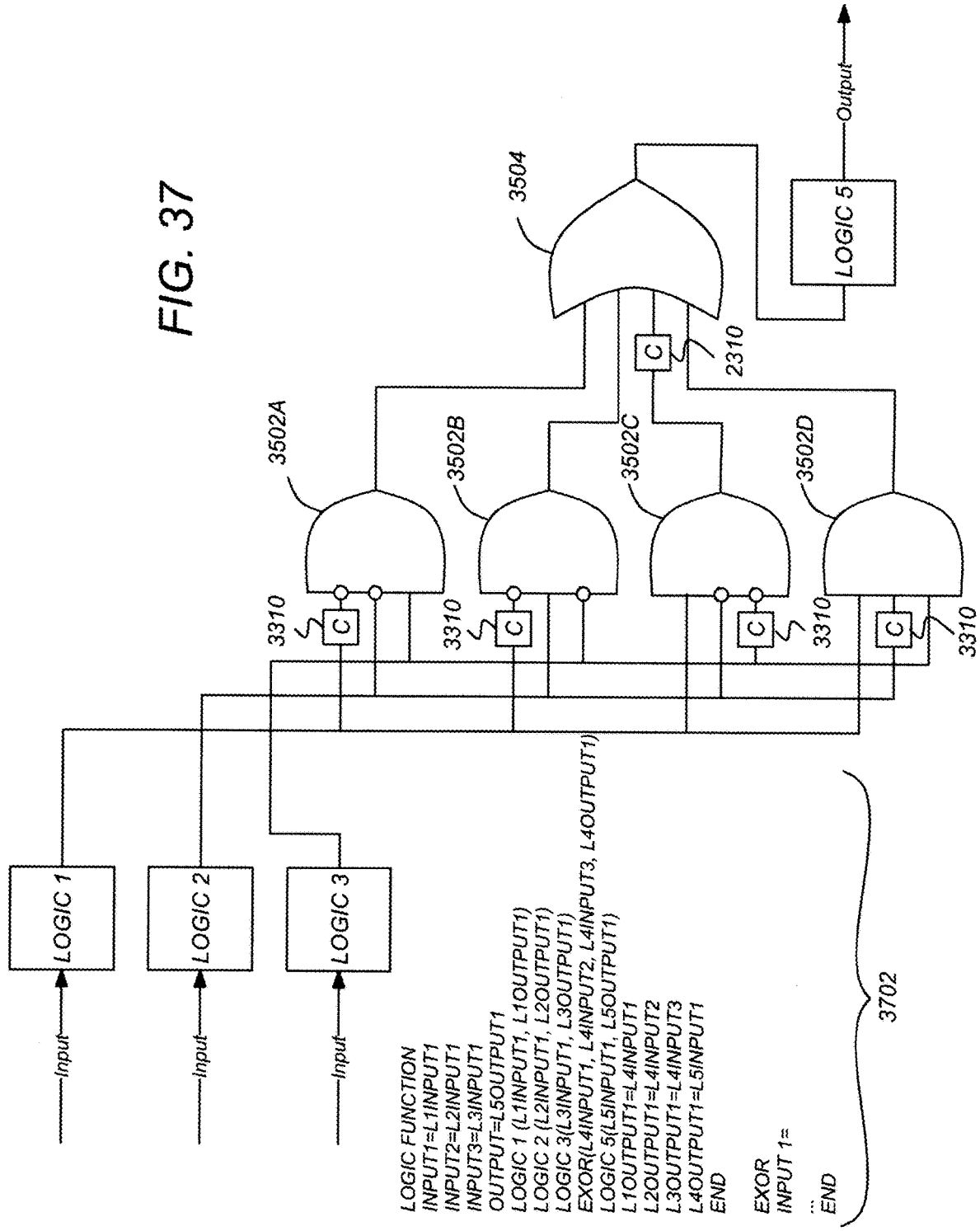

FIGS. 36 and 37 are diagrams further illustrating the foregoing technique. FIG. 36 is a diagram describing an interconnection of logical cells 3600, including cells 3602-2810. Logical cell 3608 provides an EXCLUSIVE OR function, which is one of many standard functions available in the cell library. An exemplary logical description or netlist 3612 of the interconnection of the logical cells 3600 is also shown.

FIG. 37 is a diagram illustrating a camouflaged interconnection of logic cells 3700. In this embodiment, the alternate implementation of the EXCLUSIVE OR function shown in FIG. 35 has been inserted for the EXCLUSIVE OR block 3608 shown in FIG. 36. This can be accomplished by defining a logical function EXOR(*) as a the combination of gates shown in FIG. 35 and including a call to the newly redefined EXOR circuit element shown in the logical description 3702. Alternatively, a second EXCLUSIVE OR function can be defined (e.g. EXOR2), and the second EXCLUSIVE OR function can be recited in the logical description.

Micro Circuits

Camouflage elements may serve to protect an ASIC from reverse engineering attack in a number of ways. For example, the filler cells or combination of filler cells can comprise cells that perform none of the ASIC logical functions, or perform some one or more of the ASIC logical functions, but do not affect the ASIC logical function implemented by the standard (non-filler) cells. Or, the routed filler cells can together perform a camouflage logical function that reproduces at least one of the ASIC logical functions for the purposes of mimicking or spoofing that function, yet still does not interfere with any of the ASIC logical functions. For example, the ASIC logical functions may include a binary counter that is output to a NAND gate. The filler cells can be used to define an identical binary counter, but with the counter output coupled to another circuit element such that the ASIC logical function itself remains unaffected.

The combination of filler cells placed in the gap may also include a plurality of filler cells that include a (1) a first cell having a physical design layout modified from that of a corresponding first library cell so as to perform no logical function (e.g. an AND library cell modified to perform no logical function by alteration of its physical layout) (2) a second cell having a physical design layout modified from the corresponding second library cell to perform a modified logical function (e.g. an AND library cell modified to perform the OR function or an OR library cell modified to perform the AND function), and (3) a third cell having a physical design layout unmodified from the corresponding third library cell (e.g. an unmodified AND, OR or NOR library cell).

Importantly, taken together, the camouflage elements (e.g. logical cells and interconnections) are functionally inert to the logical function(s) of the ASIC (they do not alter the logical function(s) of the ASIC). However, the one or more of the filler cells—in fact, even the combination of all of the interconnected camouflage cells—may be functionally active (perform a logical function), yet still be functionally inert to the logical function of the ASIC. For example, the filler cells may (1) be functionally inert (e.g. perform no logical function) (2) be functionally active (perform a logical function) but either (a) unconnected with cells performing the actual ASIC logical function or (b) connected with the cells performing the ASIC logical function, but connected in a way so that ASIC logical function is not altered. Functional or inert camouflage cells and/or traces may also be interconnected to other functional or inert camouflage cells and/or traces, or to extraneous (not used to perform the logical function of the ASIC) but standard logic cells, and placed in an ASIC in such a way that the logical function of the ASIC is not altered.

Accordingly, the camouflage elements may comprise one or more circuits having one or more interconnected camouflage elements that can be either functionally inert or functionally active. Such functional elements such as filler cells, can be described, placed, and routed using CAD software in the gaps between the ASIC cells that are necessary to perform the ASIC logical function. To further conceal the functionally inert status of these filler circuits, some or all of the nodes of these circuits may optionally be connected to extraneous metal traces.

One benefit of using active camouflage elements is that if a filler cell is subjected to physical probe and measurement, it will demonstrate a logical function, which may be different from the logical function that the reverse engineer would expect to find. This raises the attacker's uncertainty and makes reverse engineering more difficult.

Another benefit of this technique is that it makes enables the introduction of time-varying logic behavior of the filler cell and metal fill network. Dynamic signals in the camouflage network make camouflaged components more difficult to distinguish from the original ASIC components, and provide additional resistance to voltage contrast attacks. For example, inputs of functionally active filler cells may be connected to the outputs of functional cells in the ASIC. The functionally active filler cells would be routed with functionally inert filler cells and/or extraneous functional cells in such a way that the ASIC function is not altered. The outputs of the functionally active filler cells would switch as the ASIC's functional cells switch. The outputs of the functionally active cells could also be attached to extraneous metal traces, as disclosed, for example, using the metal fill process of U.S. Pat. No. 6,924,552.

Secure Logic Locking and Configuration with Camouflaged Programmable Micro Netlists Overview The camouflage technique described herein introduces programmed configuration inputs to Micro Netlists, creating Programmable Micro Netlists (PMNLs). PMNLs are a group of camouflaged and non-camouflaged cells that may be configured to perform one of several possible logic functions. They retain all the protective properties of non-programmable MNLs, but also allow for secure post-manufacture configuration of their aggregate logic function. The configuration data resides in the IC's non-volatile memory (NVM) block. PMNLs may be used to implement logic locking, requiring the correct key to configure the circuit for correct operation. They may also be used to securely hide cryptographic key data within the logic area of the IC, or to configure regional options to differentiate logic functions between fabricated devices.

The security of PMNLs is based on the difficulty of reverse engineering camouflaged cell designs, and the contents of the IC's NVM. For a device secured with PMNLs to be successfully cloned, the functions of every camouflaged cell must be successfully identified and the contents of the NVM must be extracted. Selection of a secure, tamper-proof NVM subsystem is a preferred security consideration for this approach, and acceptable secure tamper-proof NVM subsystems are known. However, even if the secure NVM is compromised or a non-secure NVM is used, extraction of a working model from silicon is still not possible unless each camouflaged cell instance is identified and its function is ascertained.

Programmable Micro Netlist

Figure 38:
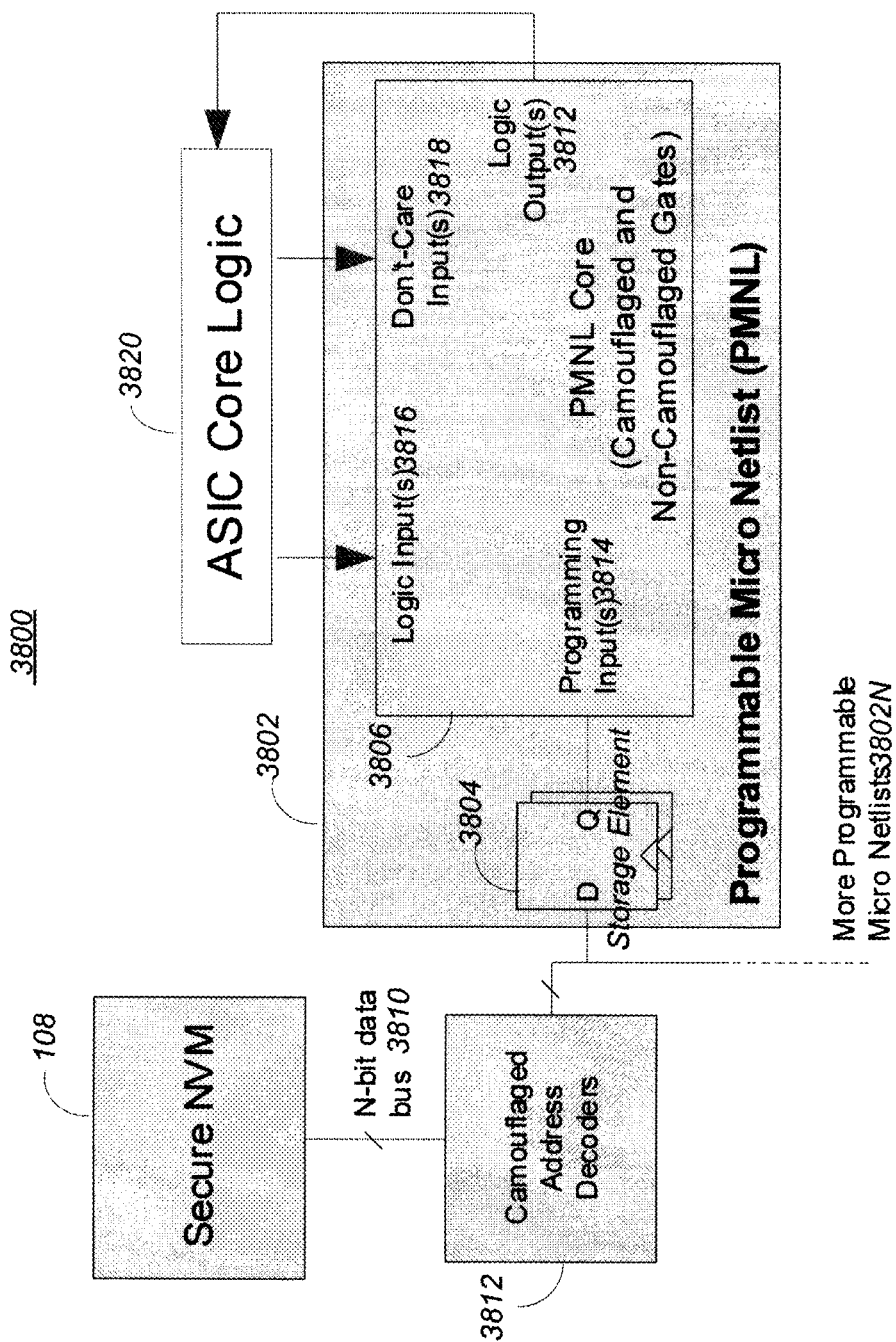
FIG. 38 is a diagram illustrating one embodiment of an ASIC.

FIG. 38 is a diagram illustrating one embodiment of an ASIC 3800 comprising one or more programmable micro netlists (PMNLs) 3802A-102N (hereinafter referred to simply as PMNL(s) 3802) communicatively coupled to a non-volatile memory (NVM) 3808, a secure NVM in this embodiment, and to ASIC core logic 3820.

The one or more PMNLs 3802 form an active part of the logical function of the ASIC 3800. Preferably, the PMNLs 3802 are disposed in physical locations within the PMNL 3802 that are scattered throughout the layout of the ASIC 3800 and mingled with other components, including camouflaged and uncamouflaged logic gates. Such scattering of the PMNLs 3802 may be random or pseudorandom.

Each PMNL 3802 comprises a plurality of interconnected functional logic cells that together comprise one or more logical inputs 3816, one or more programming inputs 3814, and zero or more optional don't care inputs 3818. Together, the plurality of interconnected functional logic cells perform one or more PMNL functions. In the illustrated embodiment, each PMNL 3802 also includes one local storage element 3804 for each bit of configuration data, and a PMNL core 3806 having a small number (i.e. 1-10) of camouflaged and non-camouflaged functional logic cells that perform an aggregate logic function that is different from their apparent function.

For the purposes of the approach described herein, the NVM 3808 can be any on-chip non-volatile memory technology, including rewritable flash memory, or one-time programmable (OTP) memory based on flash or gate oxide breakdown technologies. Secret data will be stored in this memory, so selection of a secure, tamper-proof NVM 3808 subsystem is a preferred security consideration for this approach, particularly if one is using a rewritable NVM 3808 to store secrets.

The storage elements 3804 are communicatively coupled to the secure non-volatile memory 3808. The storage elements 3804 provide configuration programming data stored therein to at least one of the programming inputs 3814 to configure the PMNL core 3806 to perform the PMNL function. Typically, the storage elements 3804 are initialized at boot time from a communicatively coupled secure NVM 3808.

In the illustrated embodiment, the secure NVM 3808 is communicatively coupled to each PMNL 3802 via an N-bit data bus 3810. Before provision to the storage elements 3804 of the PMNL 3802, the data stored in secure NVM 3808 may be optionally processed by one or more communicatively coupled address decoders 3812. The address decoders 3812 may also be camouflaged, for example, by being constructed using one or more camouflaged functional logic cells. The use of these address decoders 3812, particularly when implemented using one or more camouflaged functional logic cells, further increases the security of the ASIC 3800 by adding additional uncertainty to a reverse engineer in associating the data stored in the secure NVM 3808 with the programming data provided to the PMNLs 3802.

Configuration programming data obtained from the secure NVM 3808 upon boot-up is stored in the local storage elements 3804 upon device initialization. This configuration programming data is applied to the PMNL core 3806 to program the PMNL 3802. Configuration data cannot be read or written without suitable authorization, and typically does not change during normal function of the ASIC 3800.

The ASIC core logic 3820 includes a plurality of interconnected logic cells for performing the core logic's functions that form a part of the functions of the ASIC 3800. In one embodiment, the ASIC core logic 3820 includes one or more camouflaged functional logic cells, as further described below. The PMNL core 3806, ASIC core logic 3820, and the configuration programming data provided from the storage elements 3804 together combine to perform one or more of the functions of the ASIC 3800.

The PMNL core 3806 of each PMNL 3802 includes one or more camouflaged logic cells, which are designed to resist reverse engineering analysis. Accordingly, a reverse engineer is likely to extract an incorrect logical function for each camouflaged cell, and therefore is likely to extract an incorrect function for each PMNL 3802, and hence, the ASIC 3800.

In embodiments where the ASIC 3800 is secured with a plurality of PMNLs 3802, each of the plurality of PMNLs 3802 may comprise a different and unique PMNL core 3806 design. In such embodiments, for a reverse engineer to successfully clone an ASIC 3800, the correct logical function for each PMNL 3802 must be extracted and all secret programming input bits from storage elements 3804 must be correctly applied for such extraction to be successful. As this is unlikely, the use of multiple PMNLs 3802, each with a different PMNL core 3806 design further increases the security of the ASIC 3800.

Figure 39:
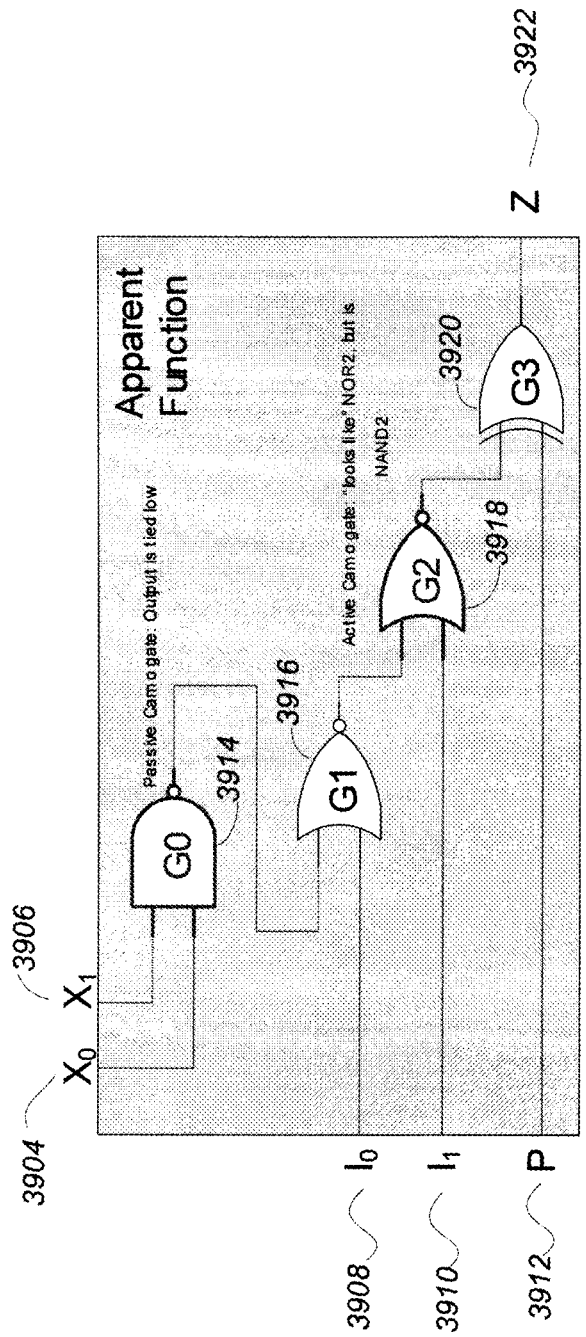
FIG. 39 is a diagram illustrating one embodiment of a PMNL core logic implementing an apparent function implemented by a second plurality of interconnected logic cells or gates.
Figure 40:
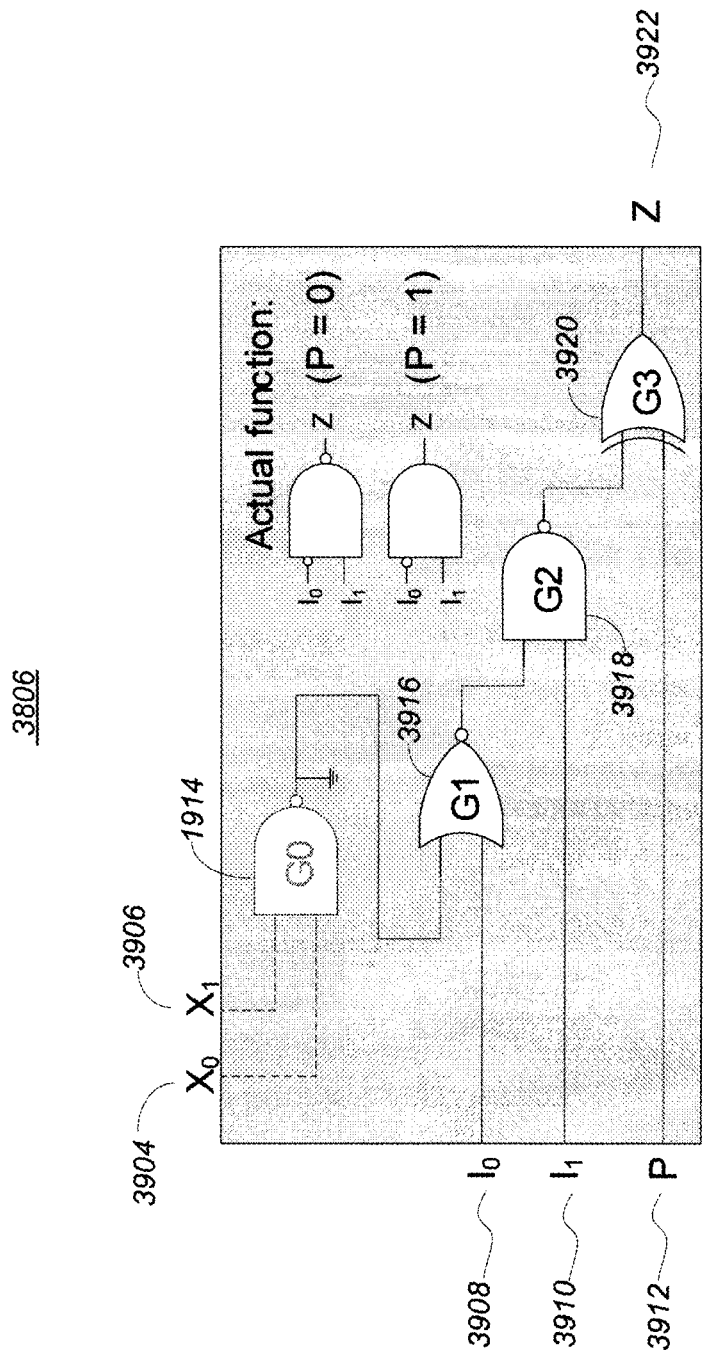
FIG. 40 is a diagram illustrating the actual functionality of the PMNL core illustrated in FIG. 39.

FIGS. 39 and 40 are diagrams illustrating the camouflaging of the plurality of interconnected logic gates used in the PMNL core logic 3806. Similar techniques can be used to camouflage the plurality of interconnected logic gates used in the ASIC core logic 3820 or address decoder 3812 circuitry. Camouflaging is attained by use of one or more uncamouflaged functional logic cells performing a first functional logic cell function and having a first physical layout as well as one or more camouflaged functional logic cells performing a second functional logic cell function but having a second physical layout substantially indistinguishable from the first physical layout.

FIG. 39 is a diagram illustrating one embodiment of a PMNL core 3806 logic implementing a function implemented by a plurality of interconnected logic cells or gates 3914-3920. Like the ASIC core logic 3820, the PMNL core 3806 includes one or more camouflaged functional logic cells, as further described below.

The actual function implemented is (as shown) that of a logical NAND gate having an inverted input $I_0$ when the programming data P=0, and a logical AND gate having inverted input $I_0$ when the programming data P=1.

However, instead of simply implementing this functionality with a simple NAND or AND gate, the functionality is implemented as illustrated, using gates G0-G3 3914-3920. Gate G0 3914 is a NAND gate having inputs $X_0$ 3904 and $X_1$ 3906. The output of gate G0 3914, while appearing to be communicatively coupled to the input of NOR gate G1 3916, is in fact tied to a logical zero using the foregoing camouflage techniques. Thus, the output of gate G0 3914 is always logical zero, and this output is provided as an input into NOR gate G1 3916. Accordingly, gate G0 3914 is a camouflaged functional logic cell. Gate G2 3918 is also a camouflaged cell, with the apparent layout of a 2-input NOR gate and an actual function of a 2-input NAND gate. The functional logic cells G1 3916 and G3 3920 are uncamouflaged functional logic cells. Since one input to NOR gate G1 3916 is always a logical zero, the gate G1 3916 simply inverts input $I_0$ 3908.

The output of NOR gate G1 3916 is supplied as an input to NAND gate G2 3918, and the other input to NAND gate G2 is input L 3910. The output of NAND gate G2 3918 is provided as an input to XOR gate G3 3920, and the programming input P 3912 is provided as the other input to XOR gate G3 3920, with the output of XOR gate G3 provided as output Z 3922.

FIG. 40 is a diagram illustrating the actual functionality of the PMNL core 3806 illustrated in FIG. 39. The apparent functionality, shown in FIG. 39 is likely to be extracted by a reverse engineer because the layouts of the camouflaged cells for gates G0-G3 3914-3920 and their interconnections suggest this logical function. However, as described earlier in FIG. 39, the actual function of this PMNL core 3806 is, a two-input NAND gate (NAND2) with one inverted input when P=0 and a two-input AND gate (AND2) with one inverted input when P=1.

The secret configuration programming data used to configure the PMNL 3802 is stored in the secure NVM 3808 of the ASIC 3800, and it may be programmed after manufacture of the ASIC 3800 or the device it is used in. Whether using one time programmable (OTP) or rewritable memory, it is preferable, for increased security, to use a secure, tamper-proof programming methodology to store these configuration secrets in the NVM 3808. Also, the circuit may be designed to prevent unauthorized reads or writes of the secret configuration programming data.

Design Methodology

The following section describes design and integration methodologies for using PMNLs in ASIC 3800 fabrication processes.

Logic Design and Integration

In digital circuit design, register-transfer level (RTL) is a design abstraction which models a synchronous digital circuit in terms of the flow of digital signals (data) between hardware registers, and the logical operations performed on those signals. Register-transfer-level abstraction is used in hardware description languages (HDLs) like Verilog and VHDL to create high-level representations of a circuit, from which lower-level representations and ultimately actual wiring can be derived. Design at the RTL level is typical practice in modern digital design.

PMNLs 3802A-102N may be integrated within the ASIC 3800 either manually or automatically. A manual approach by instantiation in the ASIC's RTL allows for repeatability across synthesis runs and gives designers the most control over how to protect the design. An automatic approach gives designers some control while automating the process of PMNL 3802 instantiation and connection. PMNLs 3802A-102N are designed to mimic the functions of logic gates that are used in the design. The process of PMNL 3802 integration becomes a matter of swapping a logic gate from the original design with an equivalent PMNL 3802, and connecting additional don't-care inputs.

Figure 41:
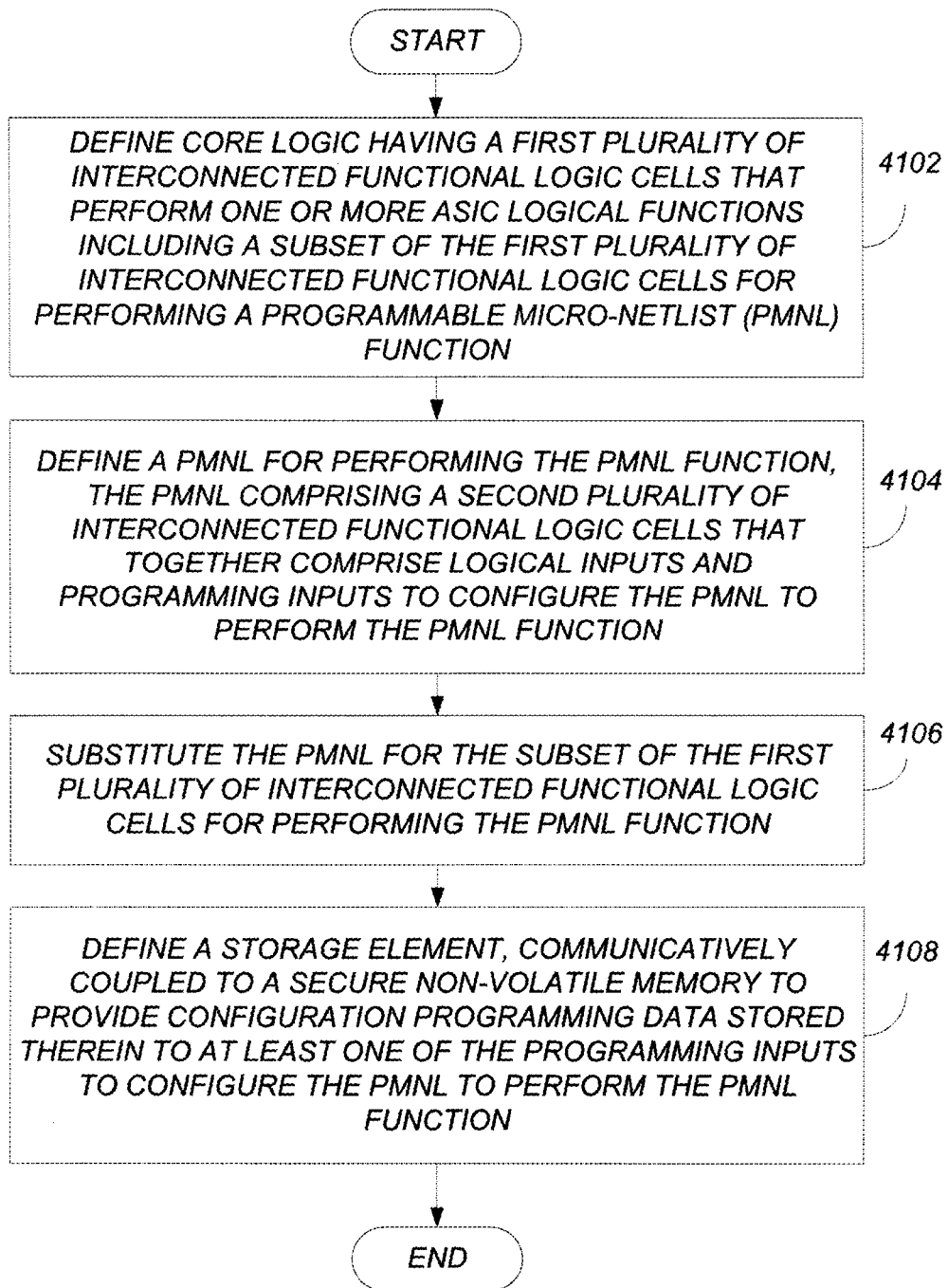
FIG. 41 is a diagram illustrating exemplary operations that can be used to define and produce an ASIC having PMNLs.

FIG. 41 is a diagram illustrating exemplary operations that can be used to define and produce an ASIC having PMNLs. FIG. 41 will be discussed in connection with FIGS. 42A and 42B, which present the original and camouflaged circuit using the PMNL 3802 shown in FIGS. 39 and 40.

Figure 42B:
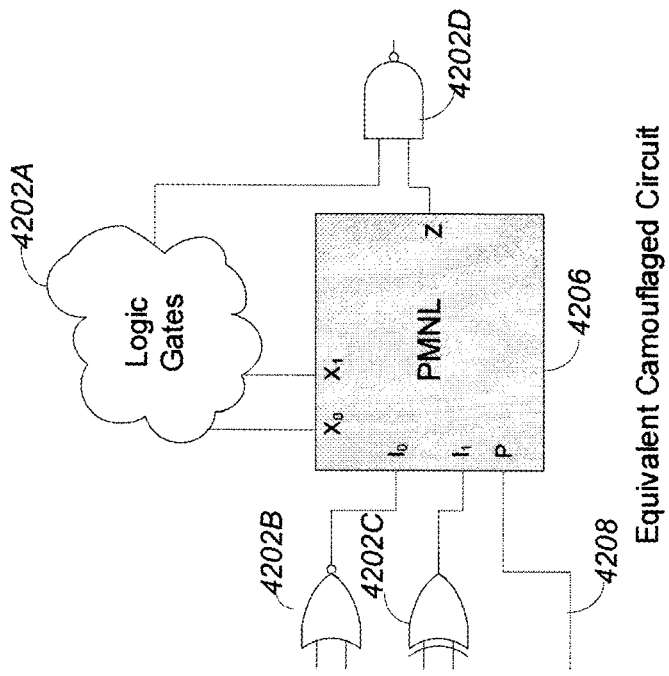
FIG. 42B presents a summary depiction of the same portion of the circuit of the ASIC after the application of the PMNLs.
Figure 42A:
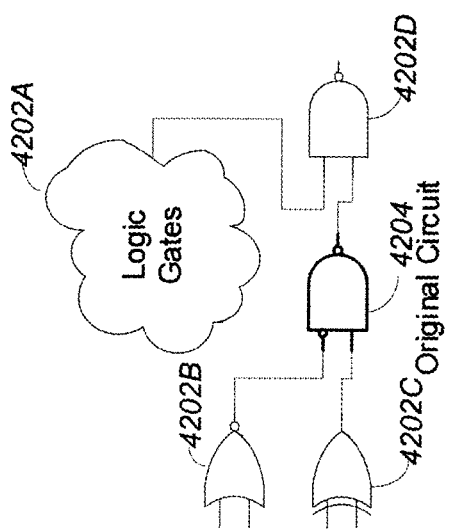
FIG. 42A is a diagram presenting a summary depiction of a portion of the circuit of an ASIC before application of PMNLs.

FIG. 42A is a diagram presenting a summary depiction of a portion of the circuit of an ASIC 3800 before application of PMNLs 3802 (the original circuit), while FIG. 42B presents a summary depiction of the same portion of the circuit of the ASIC 3800 after the application of the PMNLs 3802 (the camouflaged circuit). The circuit of FIG. 42A is functionally equivalent to the circuit of FIG. 42B only if the correct programming input P is provided.

Turning first to FIG. 41, and with reference to FIG. 42A, block 4102 defines ASIC core logic having a first plurality of interconnected functional logic cells 4202A-502D that perform one or more ASIC logical functions including a subset of the first plurality of interconnected functional logic cells for performing a PMNL function. In the example illustrated in FIG. 42A, the PMNL function is that of a NAND gate 4204 with one inverted input.

In block 4104, a PMNL 3802 is defined. The PMNL 3802 performs a PMNL function, and comprises one or more interconnected functional logic cells that together comprise logical inputs and programming inputs to configure the PMNL 3802 to perform the PMNL function.

In block 4106, the PMNL 3802 is substituted for the subset of the first plurality of logic cells for performing the PMNL function. This is illustrated in FIG. 42B with PMNL 4206 being substituted for the NAND gate 4204 with the inverted input.

In block 4108, one or more storage elements are defined. The storage elements are communicatively coupled to a secure NVM to provide configuration programming data stored therein to at least one of the programming inputs to configure the PMNL 4206 to perform the PMNL function. For simplicity, the storage elements and NVM are not depicted in FIG. 42B, but are configured analogously to their depiction (e.g. storage elements 3804 and NVM 3808) shown in FIG. 38. Further, an address decoder such as is connected to the NVM and serves to provide programming inputs for the PMNLs as shown earlier in FIG. 38. Loading configuration data into the PMNLs 3802 occurs after power-up. The ASIC core logic 3820 should be reset following the loading of configuration data into PMNLs.

Figure 43:
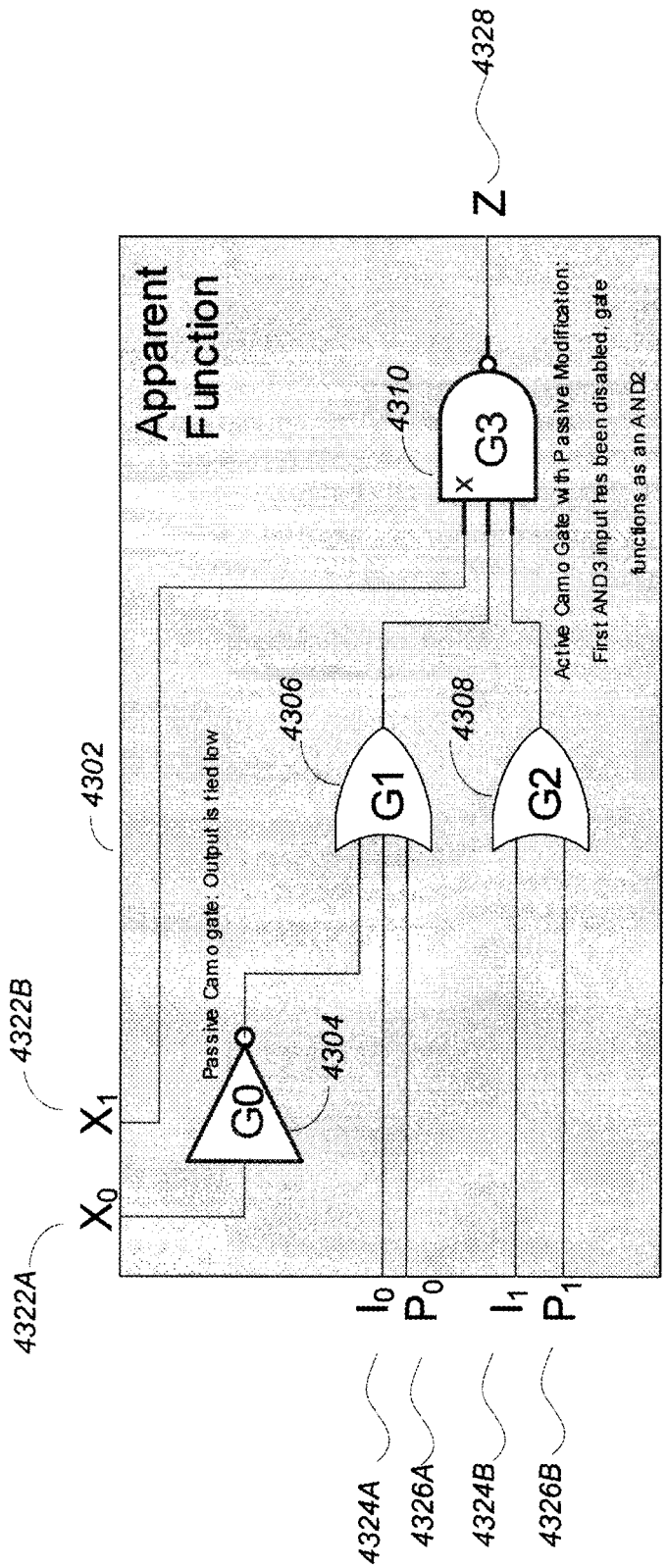
FIG. 43 is a diagram depicting the apparent logical cell configuration of the PMNL.
Figure 44:
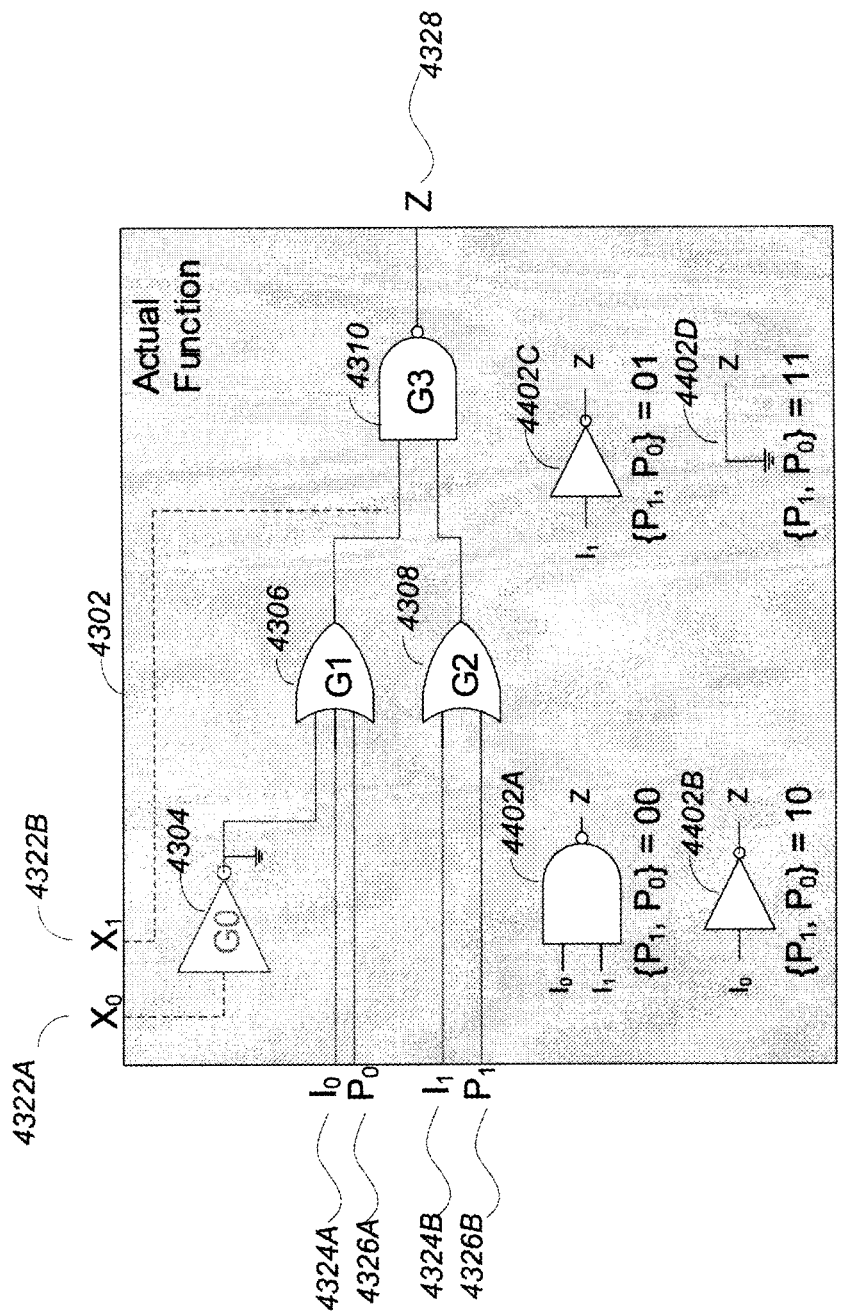
FIG. 44 is a diagram depicting the actual function of the PMNL of FIG. 43.

FIGS. 43 and 44 are diagrams illustrating an embodiment wherein the PMNL 4302 includes multiple programming inputs.

FIG. 43 is a diagram depicting the apparent logical cell configuration (and hence, function) of the PMNL 4302 (e.g. the function that would be likely ascertained by a reverse engineer), while FIG. 44 is a diagram depicting the actual function of the PMNL 4302.

The PMNL 4302 illustrated in FIG. 43 includes an inverter gate G0 4304, OR gate G1 4306, OR gate G2 4308, and NAND gate G3 4310. The input to inverter gate G0 4304 is communicatively coupled with input $X_0$ 4322A, and the output of the inverter gate G0 4304 is communicatively coupled with one of three inputs to OR gate G1 4306. Another input to OR gate G1 4306 is communicatively coupled to first input $I_0$ 4324A, and the third input to OR gate G1 4306 is communicatively coupled with first programming input $P_0$ 4326A. OR gate G2 4308 has two inputs, one communicatively coupled to input $I_1$ 4324B and the other communicatively coupled to programming input $P_1$ 4326B. The output of OR gate G1 4306 and OR gate G2 is provided to a three input NAND gate G3 4310. The first input to NAND gate G3 input $X_1$ 4322B, while the second and third inputs are provided by OR gate G1 4306 and OR gate G2 4308. The output of NAND gate G3 4310 is provided as output Z 4328.

However, in the PMNL 4302 illustrated in FIG. 43, the output of inverter gate G0 4304 is tied to a logical low, and the input $X_1$ 4322B has been disabled and is not provided to NAND gate G3. Accordingly, the third input to OR gate G1 4306 is always a logical low, and NAND gate G3 4310 functions as a two-input NAND gate with its inputs communicatively coupled to OR gate G1 4306 and OR gate G2 4308. Hence, the actual function of the PMNL 4302, when applied to inputs $I_0$ 4324A, $I_1$ 4324B, $X_0$ 4322A and $X_1$ 4322B differ from the apparent function.

FIG. 44 is a diagram depicting the actual function of the PMNL 4302 illustrated in FIG. 43. This actual function also depends on programming inputs P0 4326A and P1 4326B. Specifically, if $\{P_1,P_0\}=00$, the PMNL 4302 has the function of a two-input NAND gate 4402A. Further, if $\{P1,P0\}=01$, the PMNL 4302 has the function inverter gate 4402C. Similarly, if $\{P_1,P_0\}=10$, the PMNL 4302 also has the function of an inverter gate 4402B. Finally, if $\{P_1,P_0\}=11$, the PMNL 4302 has the logical zero (shown by item 4402D) regardless of the inputs $I_0$ 4324A and $I_1$ 4324B, $X_0$ 4322A, and $X_1$ 4322B.

In addition to the multiple programming input embodiment shown in FIGS. 43 and 44, PMNL designs may accept multiple inputs and drive multiple outputs, using the techniques shown above.

Logic Verification

Logic verification of the camouflaged circuit may be performed with functional tests. Formal equivalence checking tools may be used to verify programmable camouflaged circuits.

Physical Design and Verification

As with traditional MNLs, the designer should constrain physical design tools to refrain from altering the logic gates and connections within PMNLs. The place tool will decide placement of the PMNL based on circuit connectivity.

Timing Analysis

Unlike MNLs containing static outputs, PMNLs 3802 can be used perform switching logic functions in the ASIC 3800. Timing analysis of the PMNL 3802 blocks is performed in the same way as other logic on the ASIC 3800.

Testability

If a scannable flip-flop is used as the PMNL storage element 3804, the PMNL 3802 is fully scan-testable. Note that scan chains introduce numerous security risks to a device, including the ability for an attacker to read out programmed configuration secrets, so scan chains are usually securely disabled before releasing a programmed part into an insecure environment.

A more secure implementation would be to use a non-scannable storage element (latch or flip-flop) for the PMNL storage element 3804. This would reduce the test coverage of the PMNL 3802, but if this is a concern, additional test vectors may be used to achieve the desired test coverage.

Camouflaged Cell Types

PMNLs 3802 are comprised of "foundry" standard cells and camouflaged cells. The designer may choose what styles of camouflaged cells may be used, based on project schedule and security requirements. Table I summarizes the camouflaged cell types available for use in PMNLs 3802.

Inclusion of some camouflage cell types may require a test chip for cell qualification, at the designer's discretion.

| Camo Cell Type | Description | Test Chip? |
|---|---|---|
| Passive | Non-switching cell with static output | No |
| Active | Resembles foundry library cell but performs a different logic function | Yes |
| Active w/Passive Mod | Resembles foundry library cell with one or more inputs disables | No |
| Composite | A combination of a standard cell and camouflaged cell | No |

Passive Camouflaged Cells

Passive Camouflaged cells resemble foundry library cells, but their outputs are static (e.g. they do not change with time). Passive Camouflaged cells have outputs that are statically driven to power or ground with camouflaged techniques. These cells have low design risk, and may be used without conducting a formal qualification using a test chip.

Active Camouflaged Cells

Figures 45A, 45B:
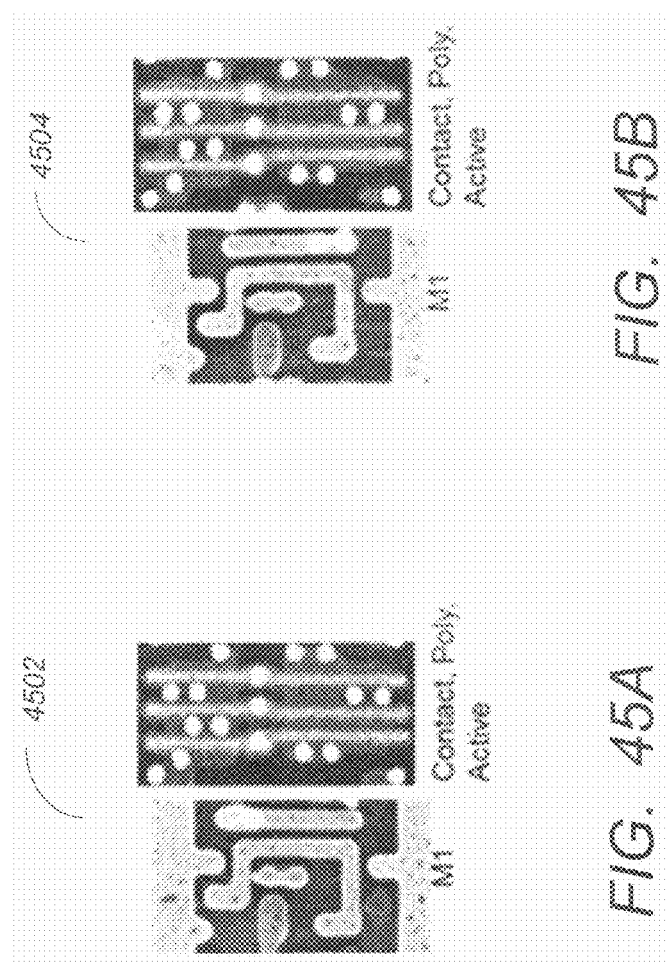
FIG. 45A is a diagram of a foundry library cell comprising a two-input AND gate and performing an AND function.
FIG. 45B is a diagram of an active camouflaged lookalike cell 4504 that performs a different logical function than that of FIG. 45A.

Active Camouflaged cells resemble foundry library cells, but perform different logic functions. FIG. 45A is a diagram of a foundry library cell comprising a two-input AND gate 4502 and performing an AND function. FIG. 45B is a diagram of an active camouflaged look-alike cell 4504 that performs a different logical function, in this case, a two-input OR function.

Active cells may require a test chip for qualification, at the designer's discretion.

Active Camouflaged Cells with Passive Modifications

Active Camouflaged Cells with Passive Modifications resemble foundry library cells, but one or more logic inputs have been disabled or inverted with camouflage circuit design techniques. Disabled logic inputs appear to perform a logic function, but in fact they do not affect the cell's primary output. The extraneous disabled inputs are connected to active nodes in the design, which will lead a reverse engineer to extract the wrong function for these camouflaged cells.

FIG. 46 is a diagram illustrating an example two-input NAND gate (NAND2) active camouflaged cell with passive modification. This example active camouflaged cell with passive modification resembles a normal NAND3 gate 4602 (left) but performs a NAND2 function (right) shown for gate 4604. The camouflaged gate's C input has been disabled. A reverse engineer would mistakenly interpret this cell as a NAND3 foundry library cell. Active camouflaged cells with passive modifications have low design risk, and may be used without conducting a formal qualification using a test chip.

Composite Camouflaged Cells

Composite camouflaged cells are typically comprised of two cells, a foundry library logic cell and a camouflaged cell. The Composite Camouflaged cell is typically either a Passive Camouflaged cell or an Active Camouflaged Cell with Passive Modification.

FIG. 47 is a diagram of a composite camouflaged AND2 gate comprising a normal AND3 gate (the foundry library logic cell) 4702 communicatively coupled to a passive camouflaged cell 4704 with an output tied to high to VDD. Since the output of the passive camouflaged cell 4704 is tied to a logical high, the normal AND3 gate and camouflaged cell operate like an AND 2 gate 4706.

Composite camouflaged cells have low design risk, and may be used without conducting a formal qualification using a test chip.

Hardware Environment

Figure 48:
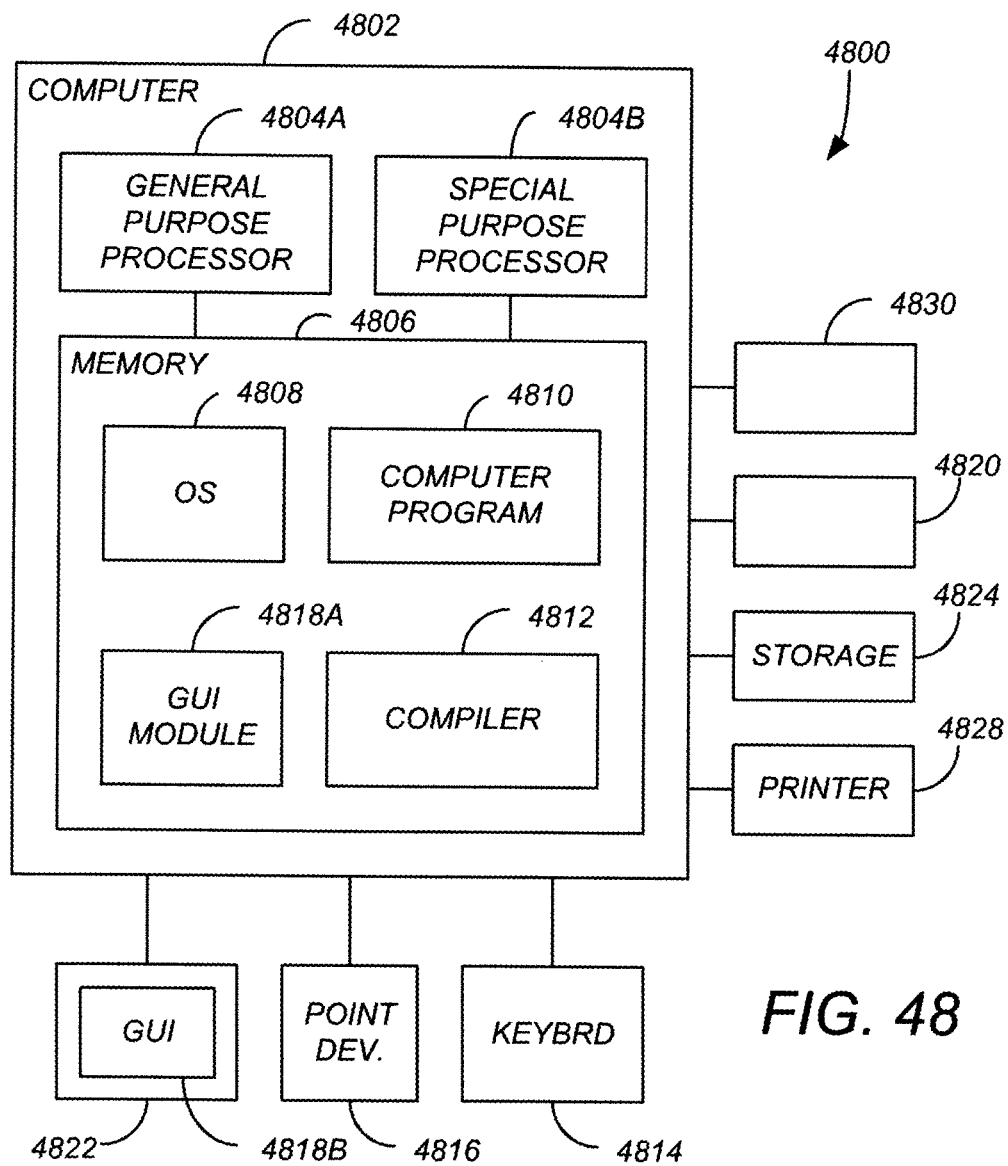
FIG. 48 illustrates an exemplary computer system that could be used to implement processing elements of the above disclosure, including the definition and layout of the normal and camouflaged cells.

FIG. 48 illustrates an exemplary computer system 4800 that could be used to implement processing elements of the above disclosure, including the definition and layout of the normal and camouflaged cells. The computer 4802 comprises at least one of a general purpose processor 4804A and a special purpose processor 4804B (hereinafter referred to as processor(s) 4804) and a memory, such as random access memory (RAM) 4806. The computer 4802 is operatively coupled to a display 4822, which presents images such as windows to the user on a graphical user interface 4818B. The computer 4802 may be coupled to other devices, such as a keyboard 4814, a mouse device 4816, a printer 4828, etc. Of course, those skilled in the art will recognize that any combination of the above components, or any number of different components, peripherals, and other devices, may be used with the computer 4802.

Generally, the computer 4802 operates under control of an operating system 4808 stored in the memory 4806, and interfaces with the user to accept inputs and commands and to present results through a graphical user interface (GUI) module 4818A. Although the GUI module 4818B is depicted as a separate module, the instructions performing the GUI functions can be resident or distributed in the operating system 4808, the computer program 4810, or implemented with special purpose memory and processors. The computer 4802 also implements a compiler 4812 which allows an application program 4810 written in a programming language such as COBOL, C++, FORTRAN, or other language to be translated into processor 4804 readable code. After completion, the application 4810 accesses and manipulates data stored in the memory 4806 of the computer 4802 using the relationships and logic that was generated using the compiler 4812. The computer 4802 also optionally comprises an external communication device such as a modem, satellite link, Ethernet card, or other device for communicating with other computers.

In one embodiment, instructions implementing the operating system 4808, the computer program 4810, and the compiler 4812 are tangibly embodied in a computer-readable medium, e.g., data storage device 4820, which could include one or more fixed or removable data storage devices, such as a zip drive, floppy disc drive 4824, hard drive, CD-ROM drive, tape drive, etc. Further, the operating system 4808 and the computer program 4810 are comprised of instructions which, when read and executed by the computer 4802, causes the computer 4802 to perform the operations herein described. Computer program 4810 and/or operating instructions may also be tangibly embodied in memory 4806 and/or data communications devices 4830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A semiconductor chip comprising:
a plurality of interconnected logic cells for performing a core logic function of the chip;
at least a portion of non-volatile memory (NVM) for storing at least configuration data for the chip;
a programmable micro netlist (PMNL) circuit, including at least one programming input, wherein:
the PMNL circuit is constructed using at least one uncamouflaged logic gate and at least one camouflaged logic gate;
the programming input is operationally coupled to the configuration data stored in the NVM; and
wherein an operational function of the PMNL circuit contributes to the core logic function of the chip when the programming input is in a first logical state, and does not contribute to the core logic function when the programming input is in a second logical state.

2. The chip of claim 1, wherein the camouflaged logic gate performs a first logical cell function and has a physical layout substantially indistinguishable from a physical layout of an uncamouflaged logic gate performing a second logical cell function.

3. The chip of claim 1, wherein a physical layout of the camouflaged logic gate differs from a physical layout of the uncamouflaged logic gate by an eliminated structure.

4. The chip of claim 1, wherein a physical layout of the camouflaged logic gate differs from a physical layout of the uncamouflaged logic gate by an additional structure.

5. The chip of claim 1, wherein an input of the camouflaged logic gate is connected to at least one of another of the plurality of interconnected logic cells.

6. The chip of claim 1, wherein the PMNL circuit comprises a storage element communicatively coupled between the NVM and the programming input to store the configuration data for the chip.

7. The chip of claim 6, wherein the storage element is initialized at boot time from the NVM.

8. The chip of claim 7, wherein the configuration data is secret and cannot be read or written without permission.

9. The chip of claim 1, further comprising an address decoder, communicatively coupled between the NVM and a storage element, wherein the address decoder further comprises another camouflaged logic cell.

10. The chip of claim 1, wherein at least a portion of the configuration data comprises programming data for programming the camouflaged logic gate.

11. A method of fabricating a semiconductor chip, comprising:
defining core logic having a plurality of interconnected logic cells that perform a core logic function of the chip;
defining a programmable micro netlist (PMNL) circuit, the PMNL circuit having a plurality of interconnected logic gates, the PMNL comprising:
an uncamouflaged logic gate, and a camouflaged logic gate;
a programming input communicatively coupleable to a non-volatile memory (NVM) to receive configuration data to configure the PMNL to perform an operational function of the PMNL that contributes to the core logic function of the chip when the programming input is in a first logical state, and does not contribute to the core logic function of the chip when the programming input is in a second logical state;
substituting the PMNL for a subset of the plurality of interconnected logic cells.

12. The method of claim 11, wherein the camouflaged logic gate performs a first logical cell function and has a physical layout substantially indistinguishable from a physical layout of an uncamouflaged logic gate performing a second logical cell function.

13. The method of claim 11, wherein a physical layout of the camouflaged logic gate differs from a physical layout of the uncamouflaged logic gate by an eliminated structure.

14. The method of claim 11, wherein a physical layout of the camouflaged logic gate differs from a physical layout of the uncamouflaged logic gate by an additional structure.

15. The method of claim 11, wherein an input of the camouflaged logic gate is connected to at least one of the plurality of interconnected logic cells.

16. The method of claim 11, wherein the PMNL circuit comprises a storage element communicatively coupled between the NVM and the programming input to store the configuration data for the chip.

17. The method of claim 16, wherein the storage element is initialized at boot time from the NVM.

18. The method of claim 17, wherein the configuration data is secret and cannot be read or written without permission.

19. The method of claim 11, further comprising an address decoder, communicatively coupled between the NVM and a storage element, wherein the address decoder further comprises another camouflaged logic cell.

20. A semiconductor chip manufactured by performing steps comprising the steps of:
defining core logic having a plurality of interconnected logic cells that perform a core logic function of the chip;
defining a programmable micro netlist (PMNL) circuit, the PMNL circuit having a plurality of interconnected logic gates, the PMNL comprising:
an uncamouflaged logic gate, and a camouflaged logic gate;
a programming input communicatively coupleable to a non-volatile memory (NVM) to receive configuration data to configure the PMNL to perform an operational function of the PMNL that contributes to the core logic function of the chip when the programming input is in a first logical state, and does not contribute to the core logic function of the chip when the programming input is in a second logical state;
substituting the PMNL for a subset of the plurality of interconnected logic cells, wherein the plurality of interconnected logic gates comprise:
an uncamouflaged logic gate for performing a first logic gate function and having a first physical layout; and
a camouflaged logic gate for performing a second logic gate function and having a second physical layout substantially indistinguishable from the first physical layout.

* * * * *